US010638661B2

(12) United States Patent
Kawai et al.

(10) Patent No.: US 10,638,661 B2
(45) Date of Patent: May 5, 2020

(54) RIDING TYPE VEHICLE

(71) Applicant: Kanzaki Kokyukoki Mfg. Co., Ltd., Amagasaki, Hyogo (JP)

(72) Inventors: Ryoichi Kawai, Hyogo (JP); Hirohiko Kawada, Hyogo (JP); Seishi Kosegawa, Hyogo (JP); Koga Yamane, Hyogo (JP); Etsuo Miyake, Hyogo (JP); Masaki Watanabe, Hyogo (JP); Koji Sakata, Hyogo (JP); Kenji Shiba, Hyogo (JP); Kosuke Onoda, Hyogo (JP); Hiroki Maehara, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 186 days.

(21) Appl. No.: 15/473,024

(22) Filed: Mar. 29, 2017

(65) Prior Publication Data

US 2017/0280621 A1   Oct. 5, 2017

(30) Foreign Application Priority Data

Mar. 31, 2016 (JP) ................. 2016-070103
Mar. 31, 2016 (JP) ................. 2016-071091
(Continued)

(51) Int. Cl.
*B62D 11/04* (2006.01)
*A01D 34/64* (2006.01)
(Continued)

(52) U.S. Cl.
CPC ........... *A01D 34/64* (2013.01); *A01D 34/828* (2013.01); *B62D 11/001* (2013.01); *B62D 11/04* (2013.01); *A01D 75/185* (2013.01)

(58) Field of Classification Search
CPC ........ A01D 34/64; B62D 11/02; B62D 11/04; B62D 11/06
(Continued)

(56) References Cited

U.S. PATENT DOCUMENTS 5,507,138 A   4/1996 Wright et al.
6,148,939 A * 11/2000 Brookhart ............ B62D 11/183
                                                  180/333
(Continued)

FOREIGN PATENT DOCUMENTS

JP   59096700 U   6/1984
JP   H04045108 A  4/1992
(Continued)

OTHER PUBLICATIONS

JPO Notice of Grounds for Rejection corresponding to Application No. 2016-070103; dated Jun. 4, 2019.
(Continued)

*Primary Examiner* — Tony H Winner
(74) *Attorney, Agent, or Firm* — Cantor Colburn LLP

(57) ABSTRACT

A riding type vehicle has a driving source, a left wheel and a right wheel, a transmission configured to receive power from the driving source to independently operate and drive the left wheel and the right wheel with regard to a rotation direction and a rotation speed, and caster wheels separately provided in a front-rear direction with respect to the left wheel and the right wheel, the riding type vehicle including two first sensors arranged on both left and right sides more to a front side than a rear end of the vehicle, the two first sensors configured to detect an obstacle target located on a rear side, the obstacle target being a target becoming an obstacle at the time of reversing or turning.

10 Claims, 37 Drawing Sheets

(30) Foreign Application Priority Data

Mar. 31, 2016 (JP) .................................. 2016-071132
Mar. 31, 2016 (JP) .................................. 2016-071163

(51) Int. Cl.
*B62D 11/00* (2006.01)
*A01D 34/82* (2006.01)
*A01D 75/18* (2006.01)

(58) Field of Classification Search
USPC ............................................. 180/6.28, 6.48
See application file for complete search history.

(56) References Cited

U.S. PATENT DOCUMENTS

| | | | | |
|---|---|---|---|---|
| 6,808,032 B2* | 10/2004 | Wuertz | ................. | B62D 11/04 180/6.48 |
| 7,565,937 B2* | 7/2009 | Deguchi | ............. | B60L 15/2036 180/6.28 |
| 7,931,099 B2* | 4/2011 | Yamada | ............... | B62D 11/001 180/306 |
| 8,544,570 B2* | 10/2013 | Ishii | ....................... | A01D 34/64 180/6.5 |
| 2004/0134175 A1 | 7/2004 | Osborne | | |
| 2006/0172857 A1 | 8/2006 | Eavenson, Sr. et al. | | |
| 2006/0175098 A1 | 8/2006 | Sutherland | | |
| 2011/0127093 A1 | 6/2011 | Koga et al. | | |

FOREIGN PATENT DOCUMENTS

| | | |
|---|---|---|
| JP | H08104211 A | 4/1996 |
| JP | H08205661 A | 8/1996 |
| JP | H0947136 A | 2/1997 |
| JP | H09135606 A | 5/1997 |
| JP | 2003341519 A | 12/2003 |
| JP | 2004123014 A | 4/2004 |
| JP | 2006507789 A | 3/2006 |
| JP | 2011115006 A | 6/2011 |
| JP | 2013031389 A | 2/2013 |
| JP | 2006273286 A | 10/2016 |

OTHER PUBLICATIONS

JPO Notice of Grounds for Rejection corresponding to Application No. 2016-071091; dated Jun. 18, 2019.
JPO Notice of Grounds for Rejection corresponding to Application No. 2016-071132; dated Jun. 18, 2019.
JPO Notice of Grounds for Rejection for corresponding JP2016-070103 dated Dec. 10, 2019.

* cited by examiner

RIDING TYPE VEHICLE

CROSS REFERENCE TO RELATED APPLICATION(S)

The entire disclosures of Japanese Patent Application No. 2016-070103, Japanese Patent Application No. 2016-071091, Japanese Patent Application No. 2016-071132, and Japanese Patent Application No. 2016-071163, filed on Mar. 31, 2016 including the specification, claims, drawings, and abstract are incorporated herein by reference in their entirety.

BACKGROUND OF THE INVENTION

1. Field of the Invention

The present invention relates to a riding type vehicle that includes a driving source, a left wheel and a right wheel capable of being independently driven with regard to a rotation direction and a rotation speed, and caster wheels separately provided in a front-rear direction with respect to the left wheel and the right wheel.

2. Description of the Related Art(s)

Lawnmower vehicles that include a lawnmower driven for performing lawn mowing work are conventionally known. Moreover, lawnmower vehicles that include a left wheel and a right wheel, which are main driving wheels independently travel-driven by respective motors such as electric motors or hydraulic motors, and caster wheels, can also be considered in such lawnmower vehicles.

Moreover, as lawnmower vehicles, there are lawnmower vehicles capable of self-travel that perform travelling and control of lawn mowing on the vehicle ridden by a driver, and these are called riding lawnmower vehicles. For example, as lawnmowers there are propeller-type rotation blade type and rotation winding blade type lawnmower rotating tools or the like.

A riding lawnmower vehicle is used entirely in a so-called off-road situation such as in a garden, and moves on the ground surface for lawn mowing work.

For example, National Publication of International Patent Application No. 2006-507789 describes a hybrid power device equipped with an engine-dynamo combined unit that connects a rotor to an engine shaft of an internal combustion engine. A lawnmower vehicle illustrated as a power device is described as having independent electric motors respectively connected to multiple driving wheels, the respective driving wheels can be independently controlled at variable speeds, and smooth starting, stopping, speed variation, and direction switching can be performed for such a lawnmower vehicle. FIG. 4 and the description of FIG. 4 in National Publication of International Patent Application No. 2006-507789 describe a riding lawnmower vehicle capable of turning with a zero rotation radius.

In the case of the vehicle described in FIG. 4 and the description of FIG. 4 in National Publication of International Patent Application No. 2006-507789, a turn is made possible by having the speeds of the left and right rear wheels differ. In such a vehicle, a rapid turn can be performed with a small rotation radius. In this case, a driver performs a turn to the rear while looking back to the rear. However, in the case where there is an obstacle target in a region that becomes a blind spot with respect to the driver's visual field, there is a possibility that this obstacle target will not be able to be confirmed. In particular, at the time when there is an obstacle target, which is a person or object on the outer side in the left-right direction, there is a possibility that this obstacle target will not be able to be confirmed, more to the rear than the driver's seat of the vehicle and more to the front than the rear end of the vehicle. As a result, it is desirable to implement a configuration where it is easy to automatically detect an obstacle target, at the time of turning travel to the rear. Moreover, in a configuration of a vehicle capable of a rapid turn, where only one of the left wheel and the right wheel rotates around a turn center position, or the left wheel and the right wheel rotate in opposite directions, it will become easy for the vehicle to approach an obstacle target, which is a person or object positioned in a difficult-to-confirm position in a surrounding part, at the time of a rapid turn to the rear. Also, considerable attention is required by the driver in order to avoid colliding with an obstacle target. As a result, it is desirable to implement a configuration where it is easy to automatically avoid a collision with an obstacle target at the time of a rapid turn to the rear.

If an obstacle target can be automatically detected at the time of turning travel to the rear, for example, it will be easy to avoid colliding with the obstacle target. Moreover, in a lawnmower vehicle, there is the possibility that an obstacle target will be wound around the lawnmower, by having the obstacle target be near the lawnmower at the time of turning travel to the rear. If an obstacle target can be automatically detected at the time of turning travel to the rear, it will be easy to avoid the obstacle target being wound around the lawnmower at the time of turning travel to the rear.

Moreover, in the vehicle described in FIG. 4 and the description of FIG. 4 in National Publication of International Patent Application No. 2006-507789, a rapid turn with a small rotation radius is possible by causing only one of the left wheel and the right wheel to rotate, or causing the left wheel and the right wheel to rotate in opposite directions. However, in the case where rapidly turning, it is possible for unstable turning to be performed, where the behavior of the vehicle becomes unstable due to a high turning speed or the like, by the operation of a driver. While such an unstable turn is based on the operation by the driver, it is not desirable from the viewpoint of safe travelling of the vehicle. As a result, a structure is desirable that can automatically suppress an unstable turn of the vehicle.

SUMMARY OF THE INVENTION

At least one advantage of the present invention, in a configuration of a riding type vehicle where left and right wheels are capable of being independently driven with regard to a rotation direction and a rotation speed, is that it is possible to implement a configuration where it is easy to automatically detect an obstacle target that approaches the vehicle at the time of turning travel to the rear.

At least one advantage of the present invention, in a configuration of a riding type vehicle where left and right wheels are capable of being independently driven with regard to a rotation direction and a rotation speed, is that it is possible to implement a configuration where it is easy to automatically avoid colliding with an obstacle target at the time of a rapid turn to the rear.

At least one advantage of the present invention, in a configuration of a riding type vehicle where left and right wheels are capable of being independently driven with regard to a rotation direction and a rotation speed, is it is possible to implement a configuration where an unstable turn may be automatically suppressed.

A first riding type vehicle according to the present invention has a driving source, a left wheel and a right wheel, a transmission configured to receive power from the driving source to independently operate and drive the left wheel and the right wheel with regard to a rotation direction and a rotation speed, and caster wheels separately provided in a front-rear direction with respect to the left wheel and the right wheel, the first riding type vehicle including two first sensors arranged on both left and right sides more to a front side than a rear end of the vehicle, the two first sensors configured to detect an obstacle target located on a rear side, the obstacle target being a target becoming an obstacle at the time of reversing or turning.

A second riding type vehicle according to the present invention has a driving source, a left wheel and a right wheel, a transmission configured to receive power from the driving source to independently operate and drive the left wheel and the right wheel with regard to a rotation direction and a rotation speed, and caster wheels separately provided in a front-rear direction with respect to the left wheel and the right wheel, wherein the second riding type vehicle is capable of a rapid turn where only one of the left wheel and the right wheel rotates around a turn center position, or the left wheel and the right wheel rotate in opposite directions, the second riding type vehicle including a sensor, arranged on the vehicle, capable of detecting an obstacle target on a rear side, the obstacle target being a target becoming an obstacle at the time of reversing or turning, and a control device for causing a rapid turn to the rear to stop, or causing a stop of a rapid turn to be maintained, at the time when the obstacle target has been detected by the sensor.

A third riding type vehicle according to the present invention has a driving source, a left wheel and a right wheel, a transmission configured to receive power from the driving source to independently operate and drive the left wheel and the right wheel with regard to a rotation direction and a rotation speed, and caster wheels separately provided in a front-rear direction with respect to the left wheel and the right wheel, wherein the third riding type vehicle is capable of a rapid turn where only one of the left wheel and the right wheel rotates around a turn center position, or the left wheel and the right wheel rotate in opposite directions, the third riding type vehicle including a sensor, arranged on the vehicle, capable of detecting an obstacle target on a rear side, the obstacle target being a target becoming an obstacle at the time of reversing or turning, and a control device for causing a turn to decelerate, at the time when the obstacle target has been detected by the sensor and a rapid turn is performed to the rear, and causing a turn to stop prior to the vehicle colliding with the obstacle target.

A fourth riding type vehicle according to the present invention has a driving source, a left wheel and a right wheel, a transmission configured to receive power from the driving source to independently operate and drive the left wheel and the right wheel with regard to a rotation direction and a rotation speed, and caster wheels separately provided in a front-rear direction with respect to the left wheel and the right wheel, wherein the fourth riding type vehicle is capable of a rapid turn where only one of the left wheel and the right wheel rotates, or the left wheel and the right wheel rotate in opposite directions, the fourth riding type vehicle including a rapid turn detection section for detecting the vehicle performing a rapid turn, and a turning speed suppression section for suppressing a turning speed when a rapid turn is being performed and a turning stability relationship amount, which is a physical quantity related to turning stability, is equal to or higher than a threshold.

BRIEF DESCRIPTION OF THE DRAWING(S)

Embodiment(s) of the present disclosure will be described based on the following figures, wherein.

Figure 4A:
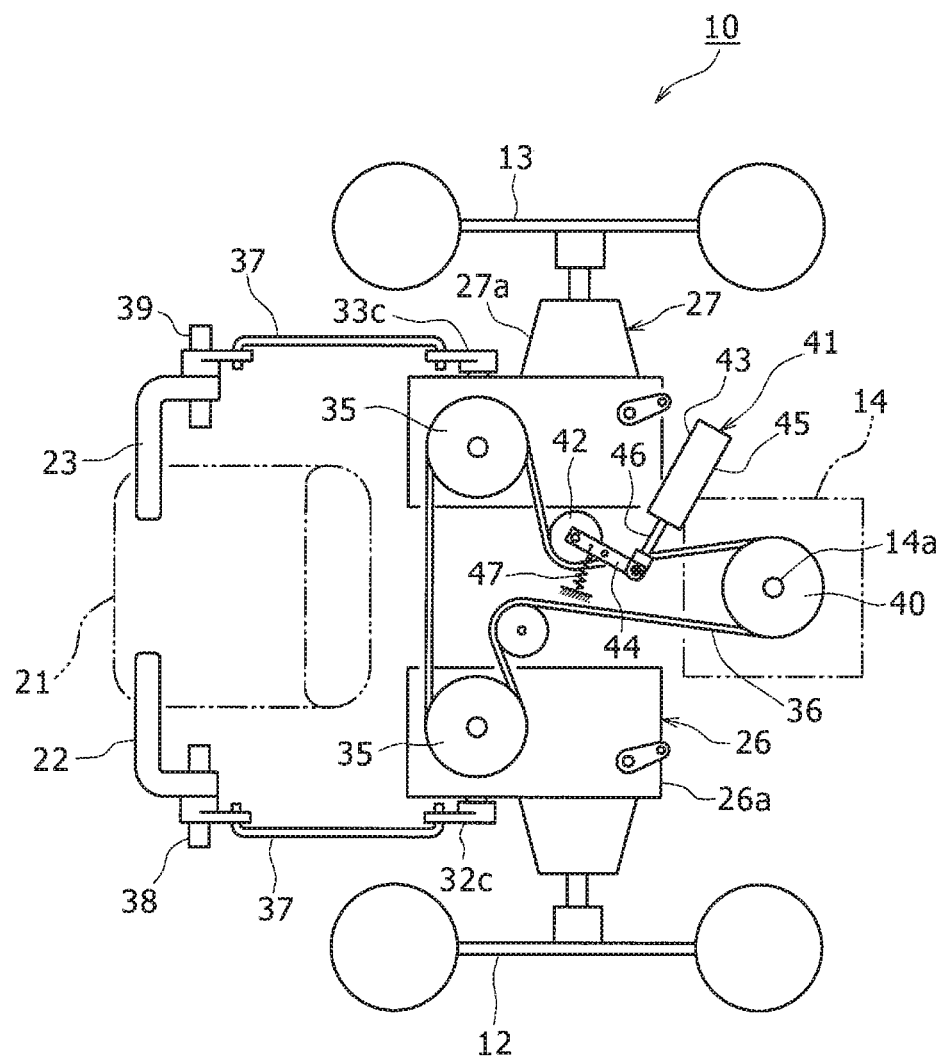
FIG. 4A is a view, seen from the upper side of the vehicle, of a power transmission structure between power generation units for the left wheel and the right wheel, and an engine, in an embodiment.
Figure 4B:
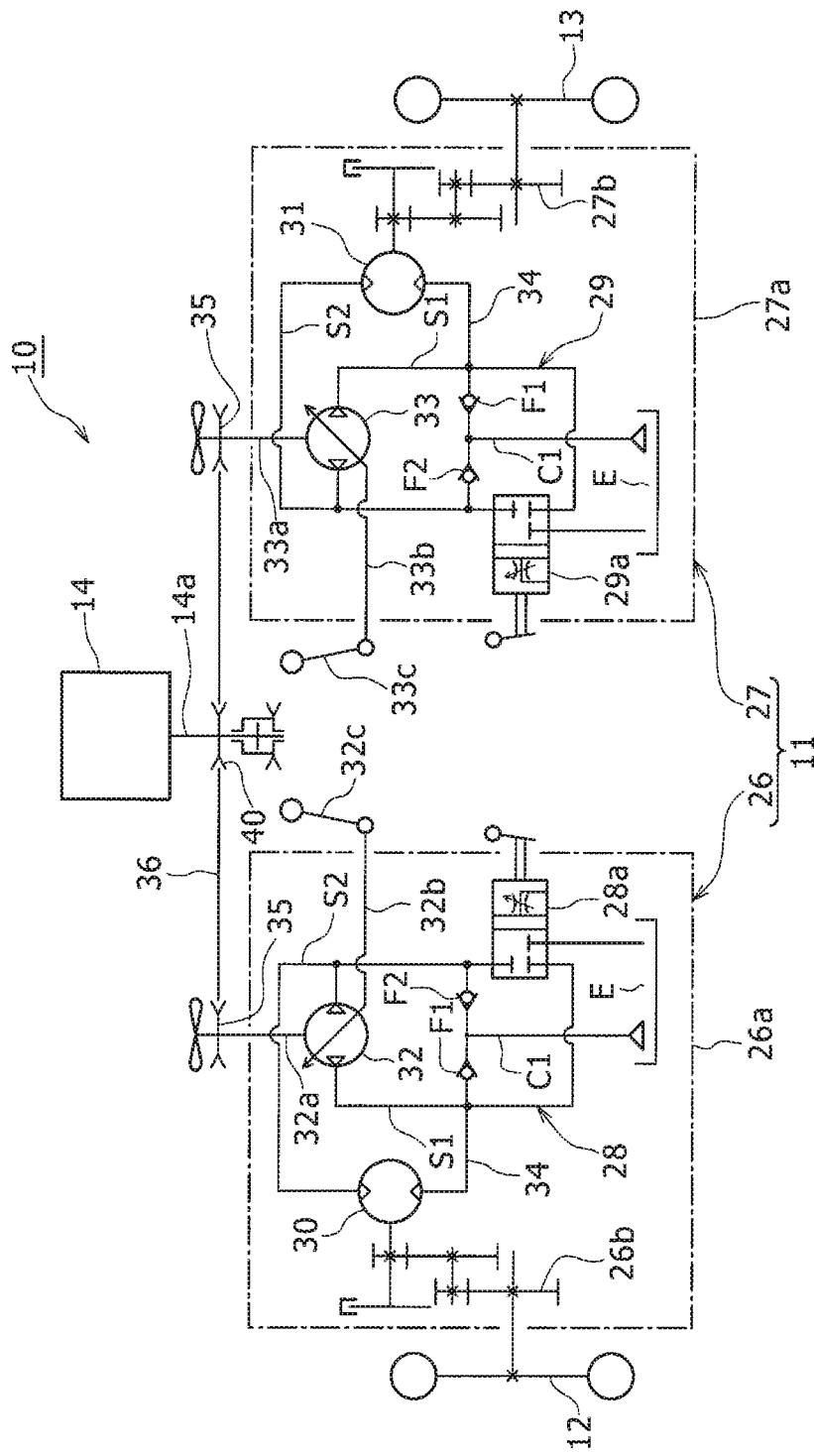
FIG. 4B is a view of the vehicle showing hydraulic circuits of the power generation units for the left wheel and the right wheel, in an embodiment.
Figure 34:
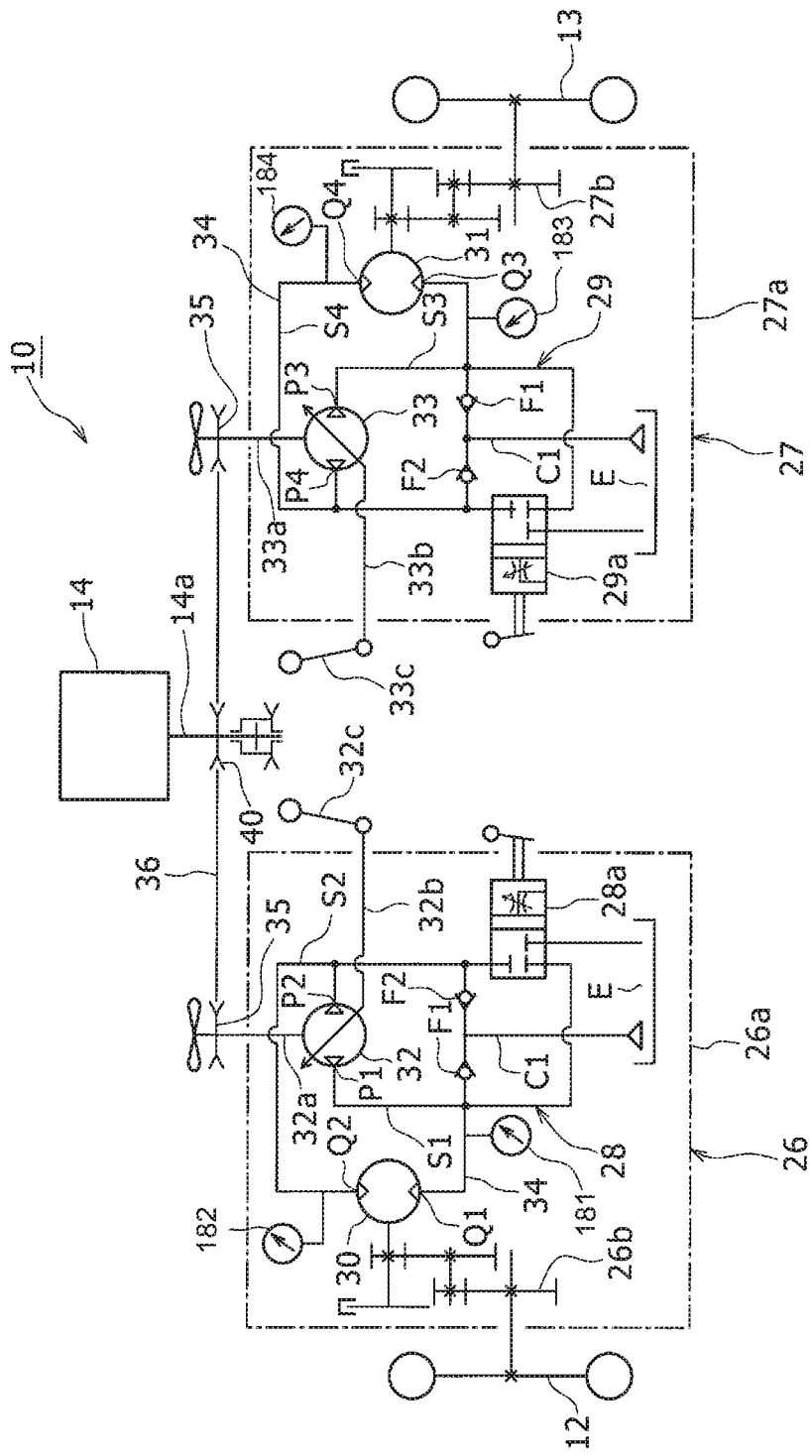
FIG. 34 is a view corresponding to FIG. 4B, in a riding type vehicle in another example of an embodiment of the present invention.
Figure 35A:
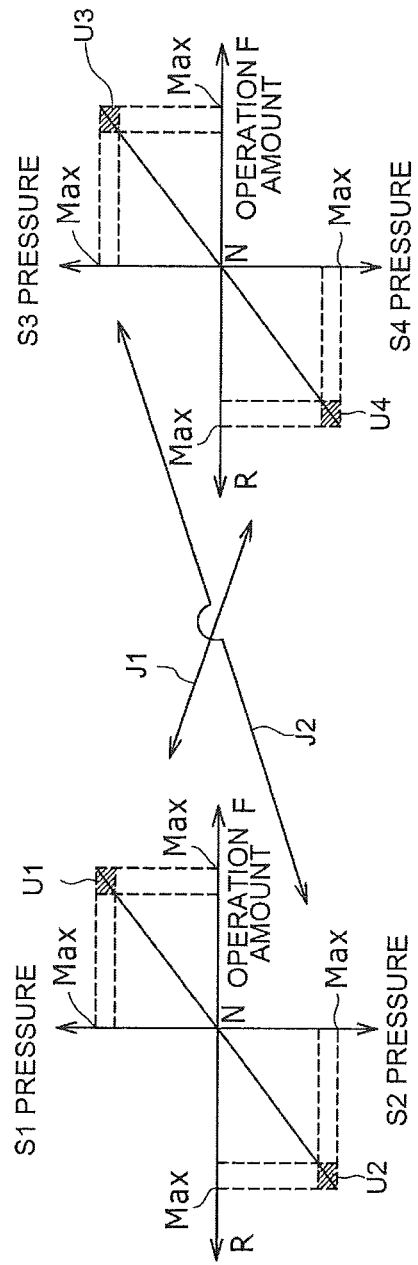
Figure 35B:
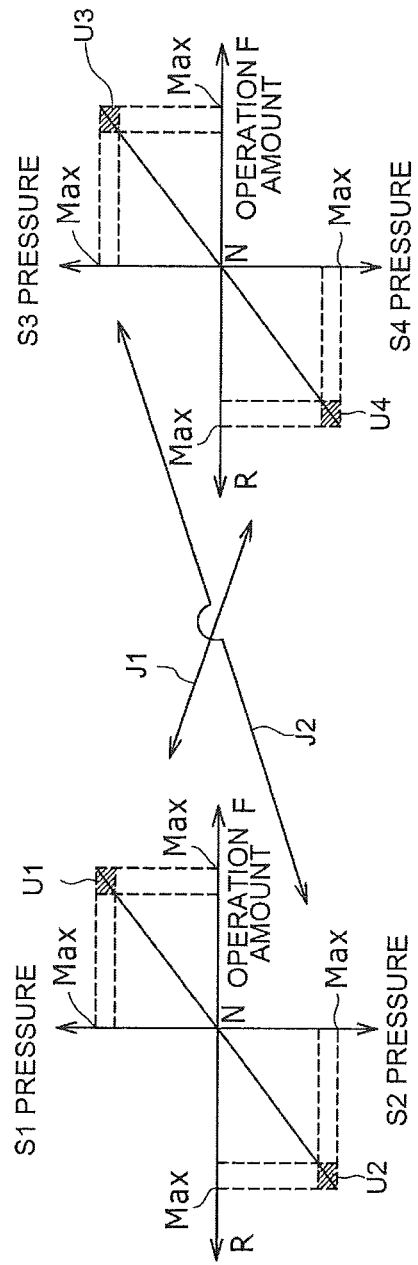
Figure 36B:
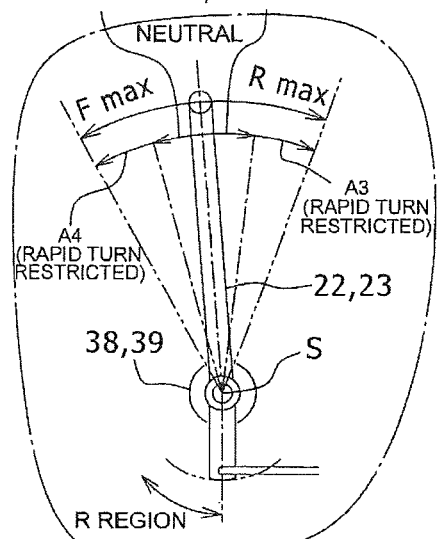
Figure 36A:
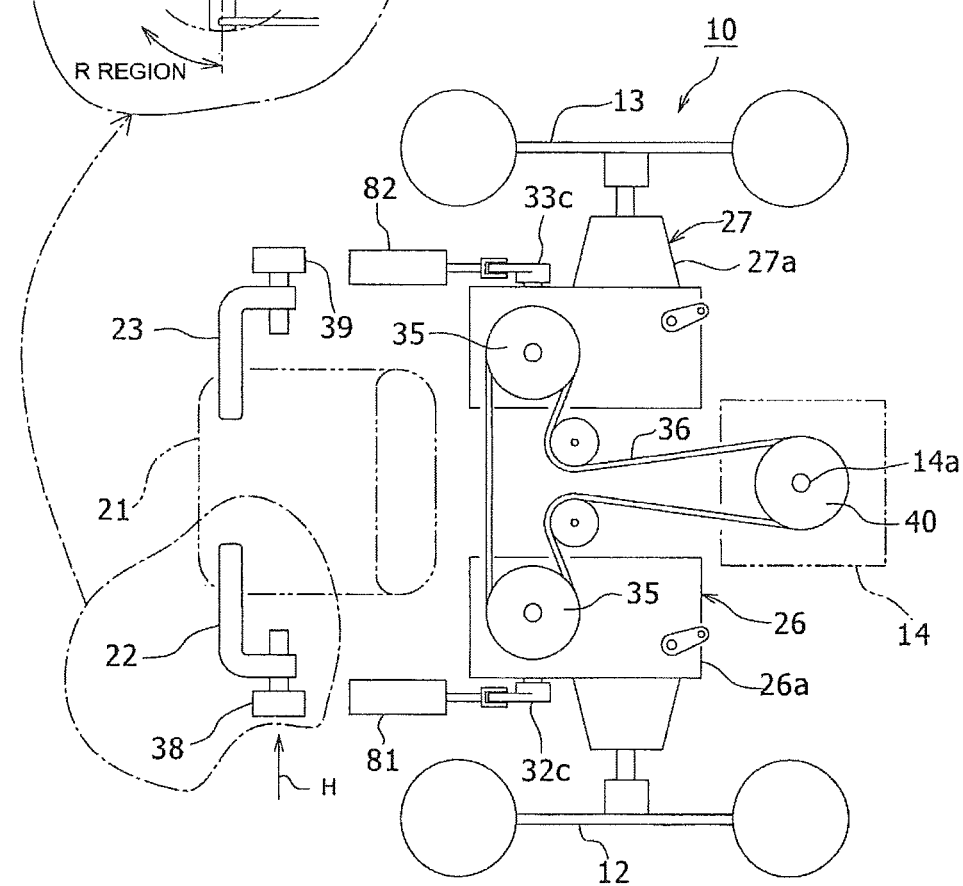

FIG. 35A is a view showing two of the conditions for suppressing the turning speed by using a relationship between an operation amount of a left operation lever and pressure detection values of a first oil path and a second oil path, in the configuration shown in FIG. 34, and FIG. 35B is a view showing two of the conditions for suppressing the turning speed by using a relationship between an operation amount of a right operation lever and a pressure detection values of a third oil path and a fourth oil path; and FIG. 36A is a view corresponding to FIG. 4B, in a riding type vehicle in another example of an embodiment of the present invention, and FIG. 36B is a view seen from an arrow H direction of FIG. 36A.

DETAILED DESCRIPTION OF THE PREFERRED EMBODIMENT(S)

Hereinafter, embodiments according to the present invention will be described in detail using the figures. Note that hereinafter, while a configuration will be mainly described where left and right wheels of a riding lawnmower vehicle are driven by hydraulic motors as motors for travelling, the motors for travelling may be other motors, such as electric motors. Hereinafter, while a case will be described where the wheels are arranged on the rear side as left and right main driving wheels, and caster wheels are arranged on the front side, the wheels may be on the front side and the caster wheels may be on the rear side.

The shape, number, and the arrangement relationships of parts or the like stated hereinafter are illustrations for the description, and arbitrary changes are possible, in accordance with the specifications or the like of the riding lawnmower vehicle. Moreover, hereinafter, the same reference numerals will be attached to similar elements in all of the figures, and overlapping descriptions will be omitted or simplified.

Figure 1:
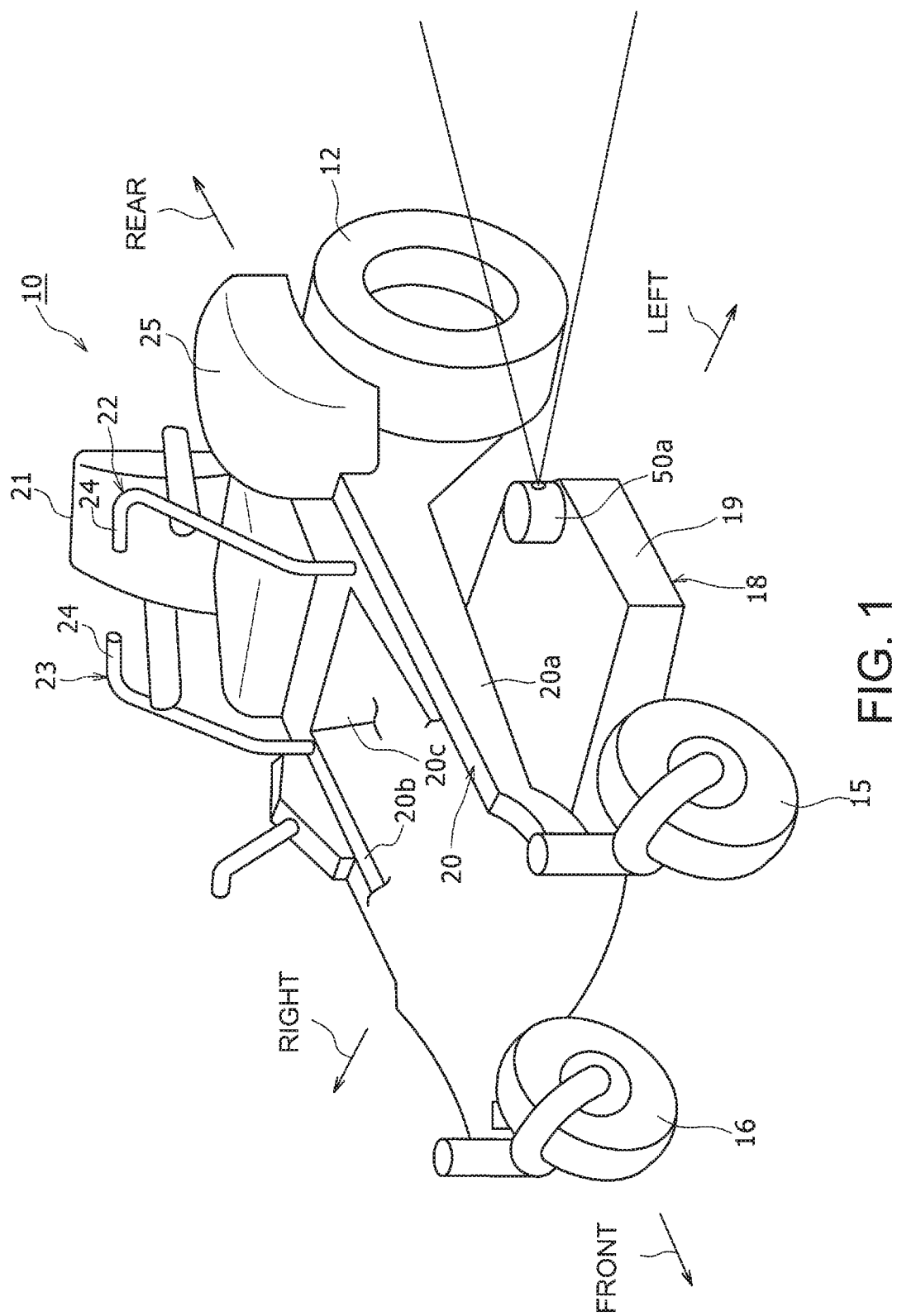
FIG. 1 is a perspective illustration of a riding type vehicle in an embodiment according to the present invention.
Figure 2:
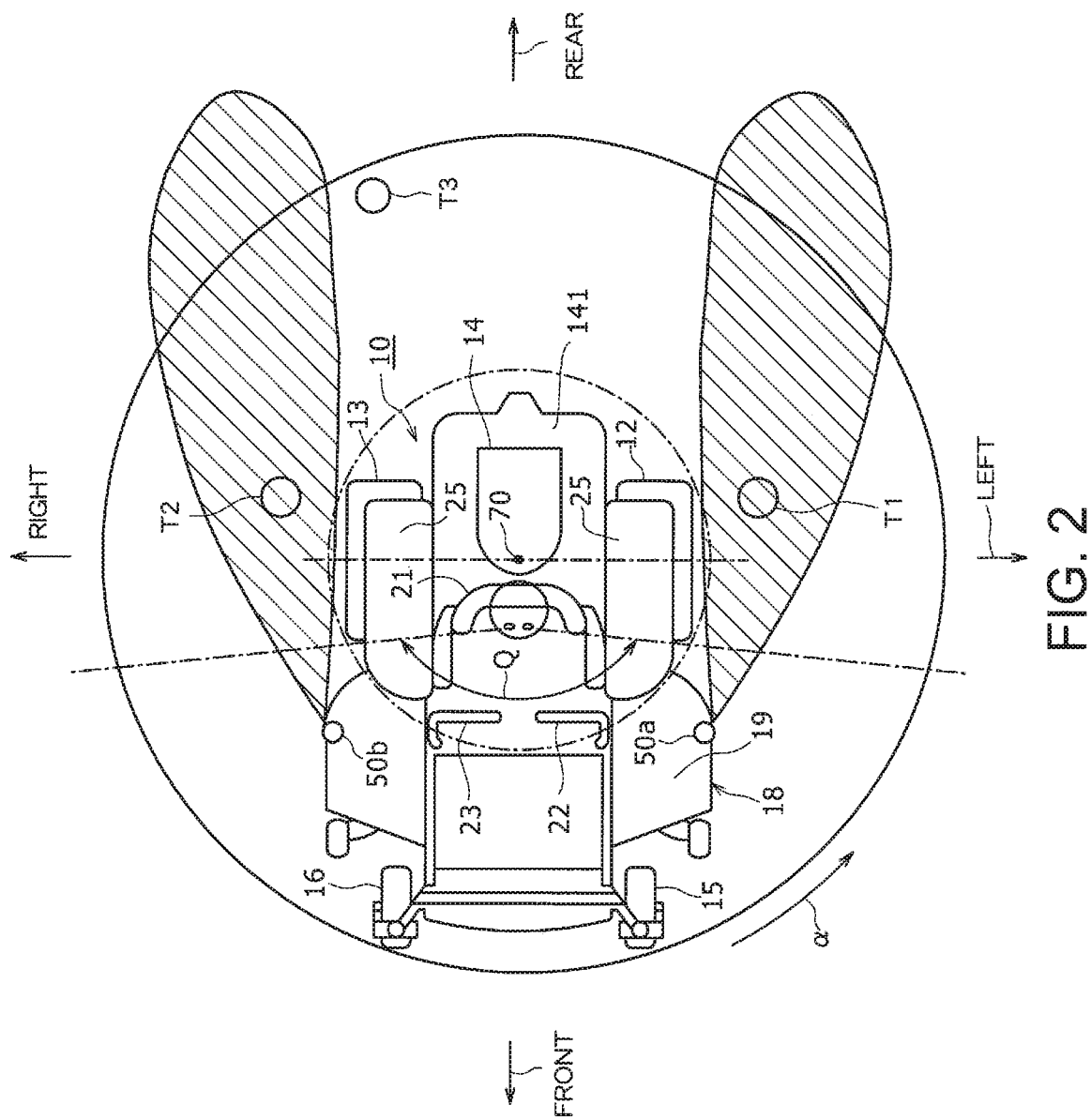
FIG. 2 is a view, when the vehicle is seen from above, showing detection ranges of first sensors in an embodiment.
Figure 3:
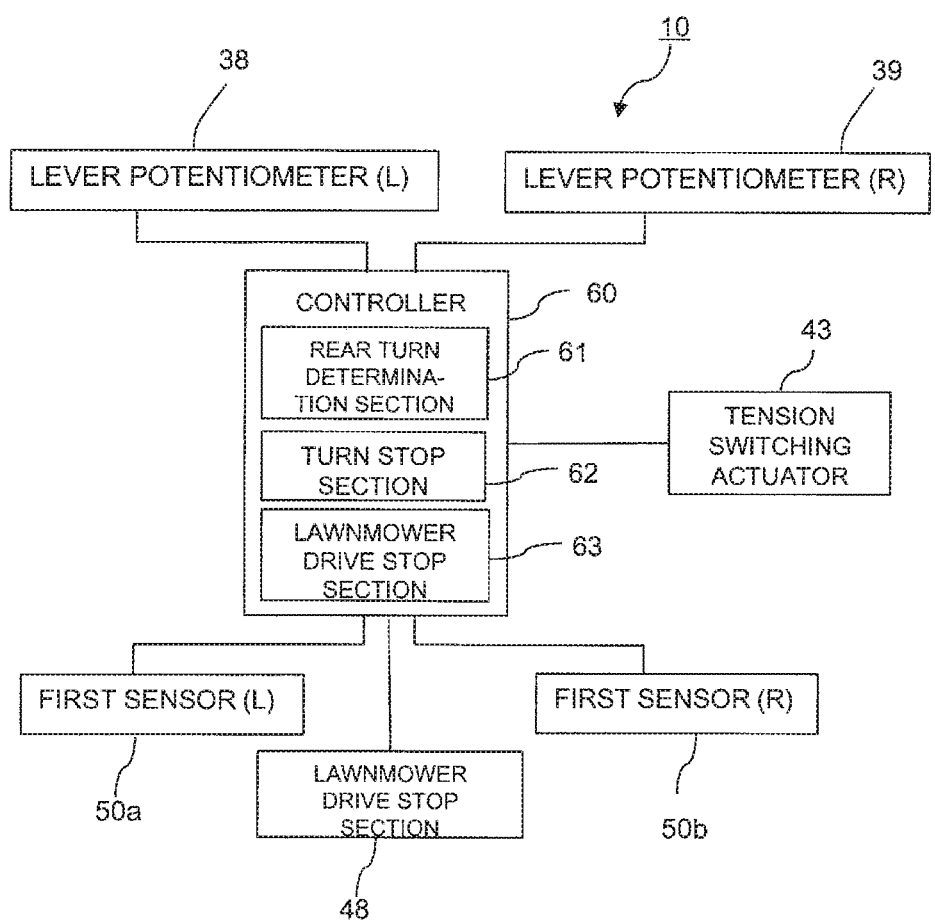
FIG. 3 is a block diagram showing the characteristic configuration of the vehicle in an embodiment.

FIG. 1 to FIG. 9 show a riding lawnmower vehicle that is a riding type vehicle according to an embodiment. Hereinafter, a riding lawnmower vehicle 10 will be described as a vehicle 10. FIG. 1 is a perspective illustration of the vehicle 10. FIG. 2 is a view, when the vehicle 10 is seen from above, showing detection ranges of first sensors 50a, 50b. FIG. 3 is a block diagram showing the characteristic configuration of the vehicle 10. FIG. 4A is a view, seen from the upper side of the vehicle 10, of a power transmission structure between power generation units 26, 27 for a left wheel 12 and a right wheel 13, and an engine 14. FIG. 4B is a view of the vehicle 10 showing hydraulic circuits 28, 29 of the power generation unit 26, 27 for the left wheel 12 and the right wheel 13.

The vehicle 10 is a self-propelled type off-road vehicle suitable for lawnmowing. The vehicle 10 includes a left wheel 12 and a right wheel 13, caster wheels 15, 16, a lawnmower 18, two first sensors 50a, 50b, a tension switching actuator 43 (FIG. 3, FIG. 4A), and a controller 60, which is a control device (FIG. 3).

The left wheel 12 and the right wheel 13 are rear wheels supported on both the left and right sides of the rear side of a main frame 20, which is a vehicle body, and are main driving wheels. The main frame 20 is formed in a beam structure or the like, by a metal such as steel. The main frame 20 includes side plate parts 20a, 20b extending in an approximately front-rear direction at both the left and right ends, and a connection part 20c that connects the side plate parts 20a, 20b of both the left and right sides. A driver's seat 21, on which a driver sits, is fixed on the upper side between the rear end parts of the left and right side plate parts 20a, 20b.

Left and right operation levers 22, 23 are supported, on the main frame 20, so as to project from the front side floor of the driver's seat 21. The tip part of each of the operation levers 22, 23 is gripped by the driver, and is used for indicating the rotation direction and rotation speed of the left wheel 12 and the right wheel 13. Each of the operation levers 22, 23 is approximately L-shaped, and has a gripping part 24 formed extending in the left-right direction on the upper end part. The gripping part 24 is gripped and operated by the driver. Each of the operation levers 22, 23 is capable of swinging, centered on an axis in position of the lower end part along the left-right direction.

The left wheel 12 and the right wheel 13 protrude more on the outer side than the left-right direction outer end of the side plate parts 20a, 20b of the main frame 20. The upper side of each of the wheels 12, 13 has at least one part covered by a wheel cover 25, and the left-right direction inner side end parts of the wheel covers 25 are fixed to the side plate parts 20a, 20b.

The two left and right caster wheels 15, 16 are steering control wheels supported on the front end part of the main frame 20, and are front wheels. The left wheel 12 and the right wheel 13 are independently travel-driven by a left hydraulic motor 30 (FIG. 4B) and a right hydraulic motor 31 (FIG. 4B), described below, which are two motors for travelling. As a result, each of the caster wheels 15, 16 is separately provided in the front-rear direction with respect to the left wheel 12 and the right wheel 13, in the front-rear direction of the vehicle 10. Each of the caster wheels 15, 16 is capable of freely rotating through 360 degrees or more centered on a vertical axis (the up-down direction of FIG. 1). Note that the caster wheels are not limited to the configuration where two are arranged on the vehicle, and one, or three or more, may be arranged on the vehicle. Hereinafter, the left wheel 12 and the right wheel 13 will sometimes be described as the left and right wheels 12, 13.

As shown in FIG. 4B, the left wheel 12 and the right wheel 13 are capable of being independently driven, with regard to a rotation direction and a rotation speed, by a transmission 11. For example, the transmission 11 is constituted to be capable of independently operating and driving the left wheel 12 and the right wheel 13 receiving power from a driving source, with regard to a rotation direction and a rotation speed. The transmission 11 includes left and right power generation units 26, 27. Power of the engine 14, as a driving source, is input to the transmission 11, and outputs of the left and right hydraulic pumps 32, 33 are output, via deceleration gear mechanisms 26b, 27b, to drive shafts of the left and right wheels 12, 13. As a result, the transmission 11 is constituted to be capable of independently driving the left wheel 12 and the right wheel 13, which receive power from the engine 14, with regard to a rotation direction and a rotation speed. Left and right fixed capacity type hydraulic motors 30, 31 respectively constitute the left and right power generation units 26, 27. The left and right hydraulic motors 30, 31 are respectively connected to the drive shafts of the left wheel 12 and the right wheel 13. The power generation units 26, 27 generate power for a wheel, and include cases 26a, 27a, and hydraulic circuits 28, 29 on the inner side, respectively. The hydraulic circuits 28, 29 respectively have variable-capacity swash-plate type hydraulic pumps 32, 33, and hydraulic motors 30, 31 driven by having pressurized oil supplied from the hydraulic pumps 32, 33, and oil paths 34 connecting the hydraulic pumps 32, 33 and the hydraulic motors 30, 31. The hydraulic motors 30, 31 are, for example, fixed capacity type motors. Driven pulleys 35 are respectively fixed to drive shafts 32a, 33a of the hydraulic pumps 32, 33, and are driven, via a belt 36, by the engine 14 as a power source, described below. The hydraulic pumps 32, 33 function as input sections of the transmission 11.

Each of the hydraulic pumps 32, 33 includes a left swash plate operation shaft 32b, which is a left adjustment shaft, and a right swash plate operation shaft 33b, which is a right adjustment shaft, for changing a tilting angle and orientation of a movable swash plate by rotation, and a swash plate operation lever 32c, 33c connected to the swash plate operation shaft 32b, 33b. The left swash plate operation shaft 32b adjusts a pressurized oil discharge amount of the left hydraulic pump 32. The right swash plate operation shaft 33b adjusts a pressurized oil discharge amount of the right hydraulic pump 33. The lower end parts of the operation levers 22, 23 of left and right corresponding sides are respectively connected, via a link 37, to the swash plate operation levers 32c, 33c. As a result, by having the operation levers 22, 23 swing in the front-rear direction, the swash plate operation shafts 32b, 33b will rotate. Also, the tilting angles and orientations of the movable swash plates of the hydraulic pumps 32, 33 will change. The discharge amounts of the hydraulic pumps 32, 33 change, in accordance with the change of tilting angles of the movable swash plates. By lowering the operation levers 22, 23 significantly to the front or the rear, the discharge amounts of the hydraulic pumps 32, 33 will increase. The left hydraulic motor 30 is driven by a pressurized oil supply from the left hydraulic pump 32. The right hydraulic motor 31 is driven by a pressurized oil supply from the right hydraulic pump 33. By lowering the operation levers 22, 23 more to the front than a neutral state, discharge directions will be prescribed so that the hydraulic pumps 32, 33 cause the hydraulic motors 30, 31 to rotate to one side. By having the operation levers 22, 23 fall more to the rear than a neutral state, discharge directions will be prescribed so that the hydraulic pumps 32, 33 cause the hydraulic motors 30, 31 to rotate to the other side. A neutral state is a state where there is no discharge of oil at a position the operation levers 22, 23 automatically return to in a state not gripped by the driver. For the rotation directions of the hydraulic motors 30, 31, one side corresponds to the rotation of a forward direction of the wheels 12, 13 and the other side corresponds to the rotation of a backward direction of the wheels 12, 13. Moreover, swing angle positions of the operation levers 22, 23 are detected by lever potentiometers 38, 39, which are swing angle detection sections. Detection signals of the lever potentiometers 38, 39 are transmitted to a controller 60 (FIG. 3), described below.

Moreover, in the hydraulic circuits 28, 29 of FIG. 4B, a charge oil path C1 is connected to two main oil paths S1, S2, which connect the hydraulic pumps 32, 33 and the hydraulic motors 30, 31. The charge oil path C1 connects each of the main oil paths S1, S2, and an oil reservoir E, via check valves F1, F2. The charge oil path C1 is for replenishing oil from the oil reservoir E to the main oil path of a low pressure side, from among the main oil paths S1, S2. Moreover, bypass valves 28a, 29a are connected between each of the main oil paths S1 S2, and the oil reservoir E. The bypass valves 28a, 29a are configured to be capable of switching the connection and disconnection between the main oil paths S1, S2, and the oil reservoir E, manually. In the example of FIG. 4B, in the case where each of the bypass valves 28a, 29a has been switched to an opened side, the main oil paths S1, S2 will be connected to the oil reservoir E, via throttles, and the throttles may be omitted.

The left and right wheels 12, 13 are respectively connected to the output shafts of the left and right hydraulic motors 30, 31, to be capable of transmitting power via the deceleration gear mechanisms 26b, 27b, which constitute the power generation units 26, 27. As will be described below, the vehicle 10 is capable of straight travel and turning travel by independent control of the left and right wheels 12, 13.

The engine 14 is arranged, in the vehicle 10, on the rear side of the driver's seat 21 (FIG. 1). As shown in FIG. 4A, the engine 14 has a drive shaft 14a, along the vertical direction (the front-back direction of the paper surface of FIG. 4A), that rotates centered on the vertical direction. A drive pulley 40 is fixed to the drive shaft 14a, and a belt 36 is suspended between the drive pulley 40 and the two driven pulleys 35 provided in the power generation units 26, 27. The drive pulley 40 and the two driven pulleys 35 correspond to shaft pulleys. As a result, by driving the engine 14, the hydraulic pumps 32, 33 will be driven, via the drive pulley 40, the belt 36, and the driven pulleys 35. Pressurized oil is discharged from the hydraulic pumps 32, 33, and the hydraulic motors 30, 31 rotate, by operations of the operation levers 22, 23. Moreover, the vehicle 10 is controlled so that the engine 14 is driven at a constant rotation speed determined beforehand, by having a start switch (not illustrated) set to ON by a user. Electric motors may be provided as the driving sources of the hydraulic pumps 32, 33.

By rotating the left and right wheels 12, 13 in mutually opposite directions at the same speed, such as described below, it will be possible for the vehicle 10 to rapidly turn around a turn center position 70 (FIG. 2), which is a position in the middle of the left wheel 12 and the right wheel 13.

Moreover, as shown in FIG. 4A, the belt 36 can include a belt tension switching mechanism 41, to function as a clutch arranged between an output section of the driving source and an input section of the transmission 11, and as a result, the presence or absence of tension can be switched. The belt tension switching mechanism 41 includes a pressing force pulley 42, which presses the belt 36 from an outer circumference side, and a tension switching actuator 43, which switches the presence or absence of the pressing force applied to the belt 36 from the pressing force pulley 42. The pressing force pulley 42 is supported on one end (the left end of FIG. 4A) of a swinging plate part 44. The swinging plate part 44 is supported to be capable of swinging centered on a vertical axis, which is positioned at the middle part of the swinging plate part 44, in the main frame 20 (FIG. 1). The tension switching actuator 43 includes a cylinder member 45, a rod 46 supported on the cylinder member 45 to be capable of being displaced in an axial direction, and a linear-type solenoid (not illustrated) for changing the projection length of the rod 46 from the cylinder member 45.

The solenoid is arranged surrounding the rod 46 on the inner side of the cylinder member 45, and operates so as to cause the rod 46 to project from the cylinder member 45 as a result of energizing the solenoid. The tip part of the rod 46 is joined to the other end part (the right end part of FIG. 4A) of the swinging plate part 44. A spring 47 is attached to the swinging plate part 44, and the spring 47 applies an elastic force in a direction that presses the pressing force pulley 42 against an outer circumference surface of the belt 36. As a result, the swinging plate part 44 will swing in a direction that separates the pressing force pulley 42 from the belt 36, as the projection length of the rod 46 increases by having the solenoid energized. Accordingly, since the tension of the belt 36 becomes zero, and the power transmission from the engine 14 to the hydraulic pumps 32, 33 (FIG. 4B) is blocked, the discharge amounts of the hydraulic pumps 32, 33 will become zero or extremely small, and the rotation of the hydraulic motors 30, 31 (FIG. 4B) will stop. At this time, power transmission in the clutch, between the engine 14 and the transmission 11, will be cut. Therefore, the rotation of the left and right wheels 12, 13, connected to be capable of transmitting the power of the hydraulic motors 30, 31, will also stop. As a result of this, travelling of the vehicle 10 is stopped, and turning, in the case where the vehicle 10 is turning, is also stopped. The tension switching actuator 43 is controlled by the controller 60 (FIG. 3), described below, and engages/disengages the clutch. At the time when at least one of obstacle targets T1, T2, and T3 (FIG. 2) has been detected by the first sensors 50a, 50b, described below, the controller 60 causes turning of the vehicle 10 to stop, by operating the tension switching actuator 43. As a result, it will become difficult for the vehicle 10 to collide with the obstacle target at the time of a turn. In the case where the solenoid is not energized, tension is generated in the belt 36, and power is transmitted from the engine 14 to the hydraulic pumps 32, 33, and therefore power transmission in the clutch, between the engine 14 and the transmission 11, will be in a connected state.

Returning to FIG. 1, the lawnmower 18 is supported on the lower side of the longitudinal direction middle part of the main frame 20. The lawnmower 18 is arranged between the caster wheels 15, 16 and the left and right wheels 12, 13, in the front-rear direction. The lawnmower 18 includes a lawnmowing blade (not illustrated), which is a lawnmower rotating tool arranged on the inner side of a mower deck 19, which is a cover. The lawnmowing blade is covered on the upper side by the mower deck 19. The lawnmowing blade has multiple blade components (not illustrated) that rotate around a shaft facing in a vertical direction (the up-down direction of FIG. 1). As a result, mowing is possible by having the blade elements rotate and cut grass. The lawnmowing blade is rotatably driven by a lawnmower drive motor 48 (FIG. 3) controlled by the controller 60 (FIG. 3), described below. Note that the lawnmower may be configured to be capable of being driven by receiving power from the engine 14, by suspending a belt between the drive pulley fixed to the drive shaft of the engine 14 and a driven pulley fixed to the drive shaft of the lawnmowing blade or the like. The mowed grass is discharged to one side in the left-right direction of the vehicle 10 through a discharge port, which is not illustrated, provided on one side (the left side of FIG. 1) in the left-right direction of the mower deck 19. A grass collection duct can be connected to the mower deck 19, and mowed grass can be collected in a grass collection tank connected to the grass collection duct.

Moreover, both end parts in the left-right direction of the mower deck 19 respectively project to the outer side from both the left and right ends, in a front-rear direction middle part of the side plate parts 20a, 20b on both the left and right sides, which constitute the main frame 20. Moreover, the left and right wheels 12, 13 are respectively arranged more to the rear than the portion where the mower deck 19 projects to the outer side, and more on the outer side than the outer end in the left-right direction, on the side plate parts 20a, 20b of the main frame 20.

As shown in FIG. 2, the two first sensors 50a, 50b are arranged separated on both the left and right sides of the vehicle 10. Specifically, the two first sensors 50a, 50b are arranged separately fixed on both the left and right end parts projecting to the outer side from the side plate parts 20a, 20b of the main frame 20, on the upper side portion of the upper surface or the like of the mower deck 19. As a result, the two first sensors 50a, 50b are arranged on both the left and right sides more to the front than the rear end of the vehicle 10. Each of the first sensors 50a, 50b is constituted so as to detect the presence or absence of an obstacle or person, which is an obstacle target positioned on the rear side. An obstacle target is a target, positioned on the rear side of the vehicle, for example, that will be an obstacle at the time of reversing or at the time of turning. A millimeter wave radar is used, for example, as such first sensors 50a, 50b. At this time, the millimeter wave radar can detect the presence of an obstacle target in a detection region determined beforehand, by having electrical waves transmitted from a transmission section reflected by the obstacle target, and receiving this reflection using a reception section. Moreover, it is preferable for the first sensors 50a, 50b to have directivity to one direction, in order to prevent the vehicle 10 itself being detected. In addition, it is preferable for the first sensors 50a, 50b to be capable of measuring a distance up to an obstacle target. For example, the first sensors 50a, 50b are capable of measuring the distance up to an obstacle target, by receiving electrical waves transmitted from one transmission section, in the millimeter wave radar, with two reception sections provided at different positions. In FIG. 2, the detection regions of each of the first sensors 50a, 50b are shown by shaded regions. The detection regions extend to the rear, and do not cross the vehicle 10. Detection signals of the first sensors 50a, 50b are transmitted to the controller 60 (FIG. 3). Laser radars, ultrasonic wave sensors, infrared sensors or the like may be used as the first sensors 50a, 50b.

As shown in FIG. 3, the controller 60 includes an operation section such as a CPU and a storage section such as a memory, and is constituted, for example, by a microcomputer. The controller 60 has a rear turn determination section 61, a turn stop section 62, and a lawnmower drive stop section 63. The rear turn determination section 61 determines whether or not the vehicle 10 is turning to the rear from detection signals of the left and right lever potentiometers 38, 39. For example, the rotation directions and rotation angles of the left and right wheels 12, 13 are calculated from these detection signals. In the case where the left and right wheels 12, 13 rotate to the rear, and the rotation speeds of the left and right wheels 12, 13 differ, it is determined that the vehicle 10 is turning to the rear. Moreover, in the case where one wheel of the left and right wheels rotates to the front, and the other wheel rotates to the rear, and in the case where an absolute value of the rotation speed of the other wheel is larger than an absolute value of the rotation speed of the one wheel, it is determined that the vehicle 10 is rapidly turning to the rear. Moreover, in the case where only one wheel of the left and right wheels 12, 13 rotates in a backward direction, it is also determined that the vehicle 10 is rapidly turning to the rear. Such a rapid turn will be described afterwards using FIG. 8 and FIG. 9. At the time when the respective absolute values of ground movement speeds of a rear rotating wheel, which is a wheel rotating to the rear, and a front rotating wheel, which is a wheel rotating to the front, are larger than zero, and a difference between both absolute values is zero, the rapid turn will be a zero-turn.

At the time when an obstacle target has been detected by at least one of the first sensors 50a, 50b, in the case where it is determined that the vehicle 10 is turning to the rear by the rear turn determination section 61, the turn stop section 62 causes the rear turn of the vehicle 10 to stop. At this time, by having the turn stop section 62 control the driving of the tension switching actuator 43, the driving of the left and right hydraulic motors 30, 31 is stopped by making the tension of the belt 36 zero, namely, by cutting the clutch. As a result, the left and right wheels 12, 13 stop, and therefore the turn to the rear stops. Moreover, at the time when an obstacle target has been detected by at least one of the first sensors 50a, 50b, in the case where it is determined that the vehicle 10 is stopped, the turn stop section 62 causes the stop of the turn to the rear of the vehicle 10 to be maintained. At this time, the stopping of straight travel to the rear may be maintained, along with maintaining a stop of a turn to the rear of the vehicle 10.

In addition, at the time when the lawnmower drive motor 48 is driving, at the time when an obstacle target has been detected by any one of the first sensors 50a, 50b, the lawnmower drive stop section 63 causes the driving of the lawnmower drive motor 48 to stop. At this time, the lawnmower drive stop section 63 causes rotation to stop by controlling the driving of the lawnmower drive motor 48. Moreover, at the time when the lawnmower drive motor 48 is drive-stopped, at the time when an obstacle target has been detected by any one of the first sensors 50a, 50b, the lawnmower drive stop section 63 causes the drive stop of the lawnmower drive motor 48 to be maintained.

Figure 5:
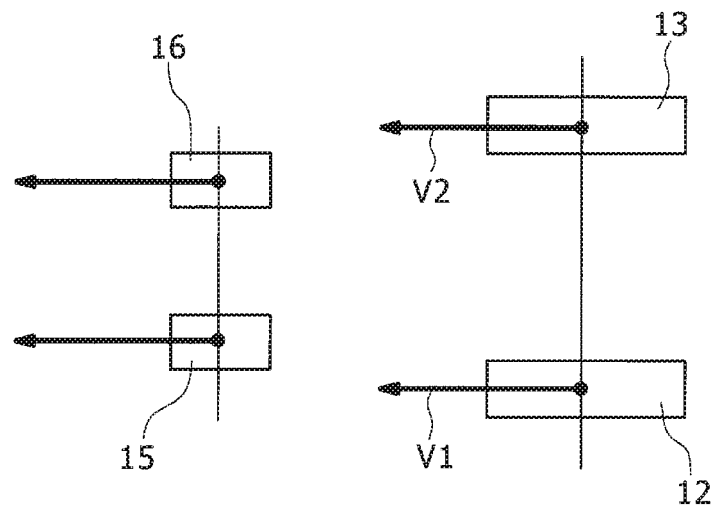
FIG. 5 is a schematic illustration showing a state of straight travel of the vehicle in an embodiment.

FIG. 5 is a schematic illustration showing a state of straight travel of the vehicle 10. In FIG. 5, a positional relationship of the left and right wheels 12, 13 and the caster wheels 15, 16 is shown. As shown in FIG. 5, straight travel of the vehicle 10 is possible by causing the rotation speeds of the left and right wheels 12, 13 to match, using the left and right hydraulic motors 30, 31 (FIG. 4B). At this time, ground movement speeds V1, V2, which are the movement speeds of the ground position with respect to the ground surface of the left and right wheels 12, 13, will match. The power source is not connected to the left and right caster wheels 15, 16, and the caster wheels 15, 16 are rotated in a following manner from the ground surface in accordance with the travelling of the vehicle 10 by the driving of the left and right wheels 12, 13. On the other hand, turning travel of the vehicle 10 is possible by generating a rotation speed difference between the left and right wheels 12, 13.

Figure 6A:
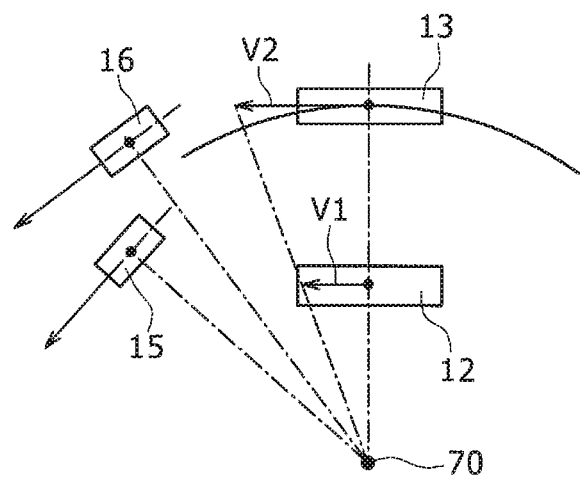
FIG. 6A is a schematic illustration showing a state of turning travel of the vehicle to the front, in an embodiment.
Figure 6B:
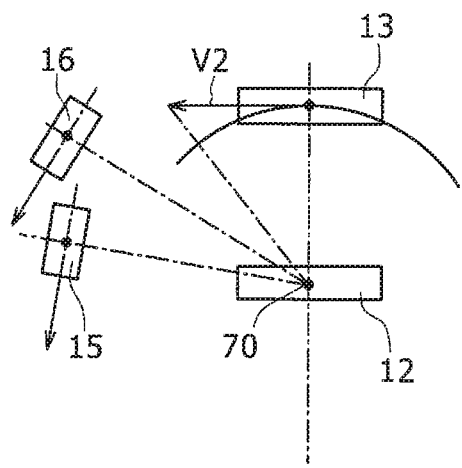
FIG. 6B is a schematic illustration showing a state of turning of the vehicle, centered on one wheel of the left and right wheels, in an embodiment.
Figure 6C:
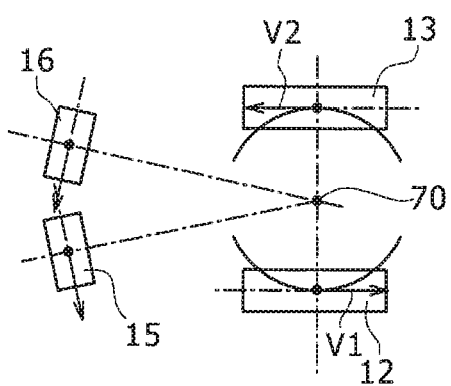
FIG. 6C is a schematic illustration showing a state of turning of the vehicle, centered on the center between the left and right wheels, in an embodiment.

FIG. 6A, FIG. 6B, and FIG. 6C show three examples of turning travel of the vehicle. Also in FIG. 6A, FIG. 6B, and FIG. 6C, similar to FIG. 5, a positional relationship of the left and right wheels 12, 13 and the caster wheels 15, 16 is shown. FIG. 6A is a schematic illustration showing a state of turning travel of the vehicle 10 to the front. In FIG. 6A, a turn center position 70, at the time when seen from above, is the outer side of the left wheel 12 on an extension line of a wheel axis direction of the left and right wheels 12, 13. At this time, the vehicle 10 turns in a comparatively gradual manner.

FIG. 6B is a schematic illustration showing a state of turning of the vehicle 10, centered on the one wheel 12 of the left and right wheels 12, 13. In FIG. 6B, the turn center position 70 is the ground position of the one wheel 12. Such a turn is called a pivot turn, and the vehicle 10 turns more rapidly than in the case of FIG. 6A.

FIG. 6C is a schematic illustration showing a state of turning of the vehicle 10, centered on the center between the left and right wheels 12, 13. In FIG. 6C, the turn center position 70, when seen from above, is a center position between the left and right wheels 12, 13 on an extension line in a wheel axis direction of the left and right wheels 12, 13. Moreover, while the absolute values of the speeds V1, V2 of the left and right wheels 12, 13 are the same, the direction of the speed V1 of the one wheel 12 is opposite to the direction of the speed V2 of the other wheel 13. In this case, the vehicle 10 additionally turns more rapidly than in the case of FIG. 6B. Such a turn is called an ultra-pivot turn, a spin turn, or a zero turn radius (ZTR) turn, where a turn radius is zero.

Figure 7:
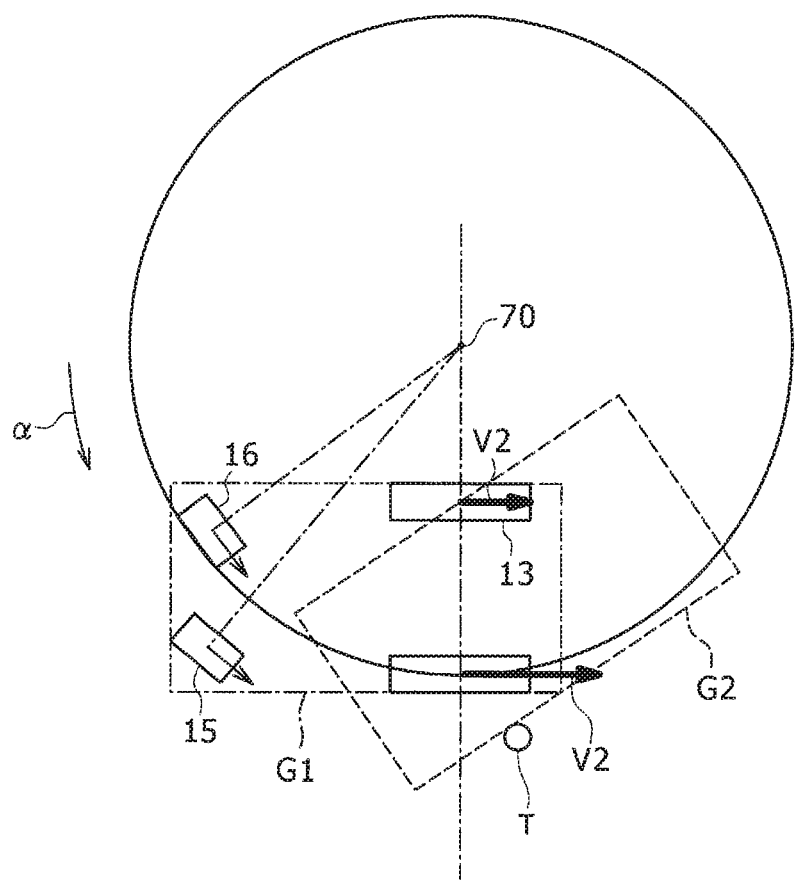
FIG. 7 is a schematic illustration showing the inconvenience for the vehicle, when turning to the rear, in an embodiment.

FIG. 7 is a schematic illustration showing the inconvenience for the vehicle 10, when turning to the rear. In FIG. 7, for ease of understanding, the vehicle 10 is shown by a dash-dotted line G1 rectangle and a dotted line G2 rectangle. From a state where the vehicle 10 is the dash-dotted line G1, the ground movement speeds of the left and right wheels 12, 13 are V1, V2 in the backward direction, and there will be cases where an absolute value of the ground movement speed V1 of the left wheel 12 is larger than an absolute value of the ground movement speed V2 of the right wheel 13. In this case, as shown by the dotted line G2, the vehicle 10 turns to the rear as shown by the arrow α direction. Also, in the state of the dash-dotted line G1, there will be cases where there is an obstacle target, shown by T, more to the front than the rear end of the vehicle 10, and nearer to the outer side than the left side surface. At this time, there will be times where the obstacle target T cannot be seen by the driver in the driver's seat 21, or the driver fails to notice the obstacle target T. At this time, since the vehicle 10 continues to turn while extending in the left-right direction outer side at the front side, the vehicle 10 will collide with the obstacle target T, in the state of the dotted line G2. In the vehicle 10 of an embodiment shown from FIG. 1 to FIG. 9, even in the case where obstacle targets, such as shown by T1 and T2 in FIG. 2, are positioned on the left-right direction outer sides of the vehicle 10, the obstacle targets can be detected at an early stage by at least one of the first sensors 50a, 50b, from among the two first sensors 50a, 50b. In this state, a turn to the rear of the vehicle 10 is stopped, or a stop of a turn is maintained. Moreover, driving of the lawnmower 18 is stopped, or a drive stop is maintained.

Moreover, in order to release these stop and stop maintenance states, after a turn to the rear and the driving of the lawnmower 18 are stopped, or a stop maintenance is performed, for example, the driver causes the vehicle 10 to travel to the front or the like, and the obstacle targets will fall outside the detection regions of the first sensors 50a, 50b. Also, in this state, the controller 60 may be configured to perform a reset, for example, by returning the left and right operation levers 22, 23 to a neutral state. This reset causes the controller 60 to permit a turn to the rear of the vehicle, or driving of the lawnmower.

According to the above described vehicle 10, in a configuration where the left and right wheels 12, 13 are independently travel-driven by the hydraulic motors 30, 31, it will be easy to automatically detect an obstacle target that approaches the vehicle 10 in a relative manner at the time of turning travel to the rear. For example, the visual field of the driver riding in the driver's seat is the range shown by arrow Q in FIG. 2. At the time when there is an obstacle target at a position falling outside this range, in particular, when being obstructed by an engine bonnet 141, it may be necessary for the driver to confirm by changing the orientation of his or her body to the rear or alighting from the vehicle 10. In particular, the two first sensors 50a, 50b are respectively arranged on both the left and right sides, more to the front than the rear end of the vehicle 10, and are constituted so as to detect an obstacle target positioned comparatively near the ground surface of the rear side. In this way, different to the case where sensors capable of detecting the rear are arranged only on the rear end of the vehicle 10, it will be easy to detect an obstacle target positioned more on an outer side than both the left and right ends of the vehicle 10 and more to the front than the rear end of the vehicle 10. Also, a turn of the vehicle 10 can be stopped at an early stage, by the detection of an obstacle target.

Figure 8:
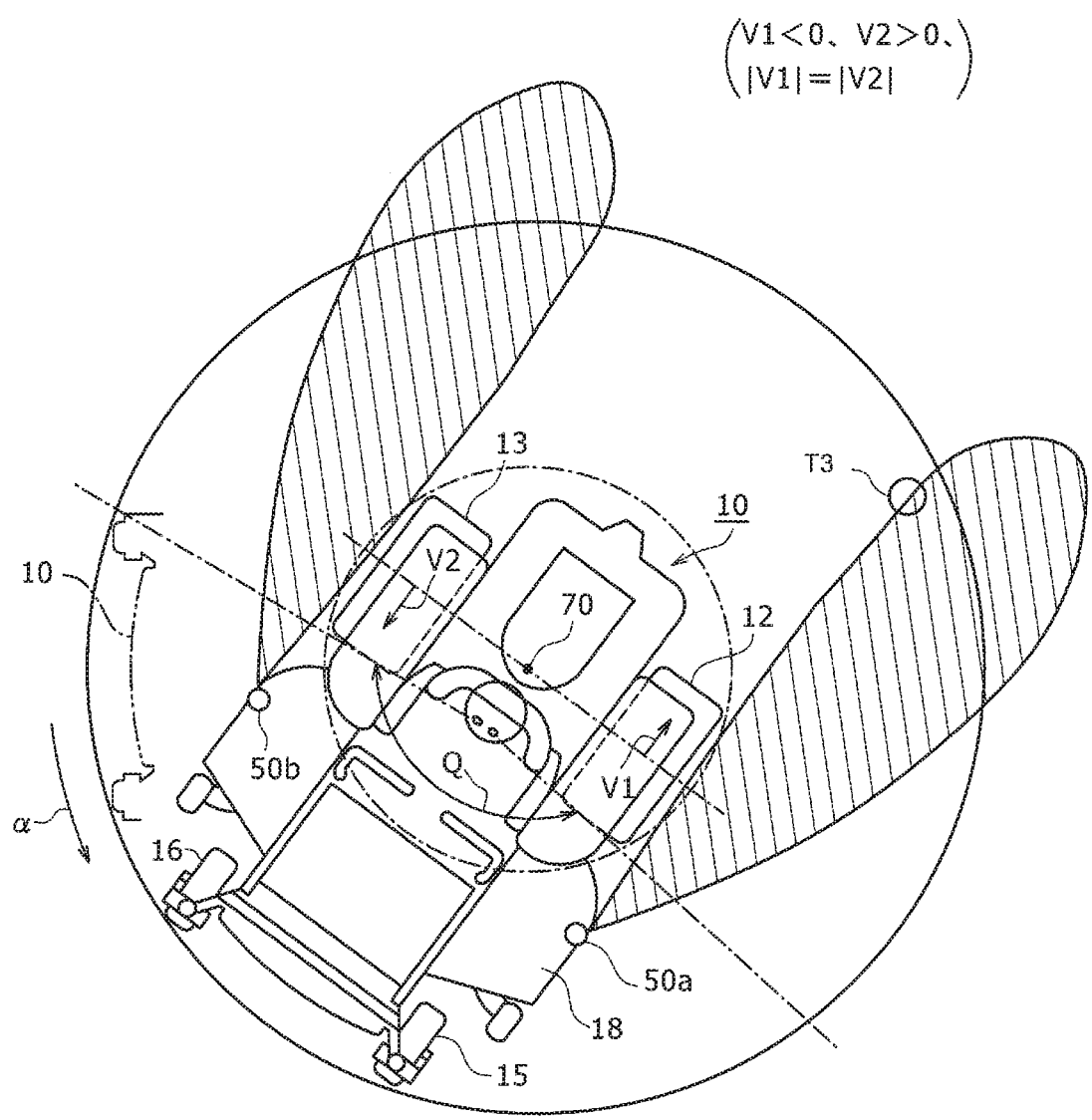
FIG. 8 is a view showing a state when the vehicle, from the state of FIG. 2, performs an ultra-pivot turn in an α direction, and the sensor detects an obstacle.

Moreover, as shown by T3 in FIG. 2, there will be cases where an obstacle target is not in either of the detection ranges of the left and right first sensors 50a, 50b. However, when the vehicle 10 turns, using a zero-turn or the like, to the rear in the arrow c direction, such as shown in FIG. 2 and FIG. 8, the obstacle target T3 will be detected by the first sensor 50b of the left side, in the state of FIG. 8. As a result, the turn of the vehicle 10 is stopped, and the vehicle 10 is prevented from colliding with the obstacle target T3. Moreover, since the driving of the lawnmower 18 is stopped when the obstacle target T3 has been detected, the obstacle target T3 is prevented from being wound around the lawnmower 18. Note that in FIG. 8, for the ground movement speeds V1, V2 of the left and right wheels 12, 13, the speed corresponding to the forward direction is shown as positive, and the speed corresponding to the backward direction is shown as negative.

Moreover, as shown in FIG. 8 or the like, at the time when the left and right wheels 12, 13 rotate in opposite directions, and an absolute value of the ground movement speed of the wheel rotating to the rear is equal to or higher than an absolute value of the ground movement speed of the wheel rotating to the front, a rapid turn to the rear of the vehicle 10 will occur. Moreover, at the time of a pivot turn to the rear, in the case where only one wheel of the left and right wheels 12, 13 rotates in the backward direction, and the other wheel is stopped, a rapid turn to the rear of the vehicle 10 will also occur. In this way, at the time when the vehicle 10 turns rapidly to the rear, it will become easy to approach an obstacle target positioned in a difficult-to-confirm position. Also, considerable attention is required by the driver in order to prevent the vehicle colliding with the obstacle target. In an embodiment, when performing such a rapid turn, the effect achieved with a configuration that includes the first sensors 50a, 50b will be remarkable.

Figure 9:
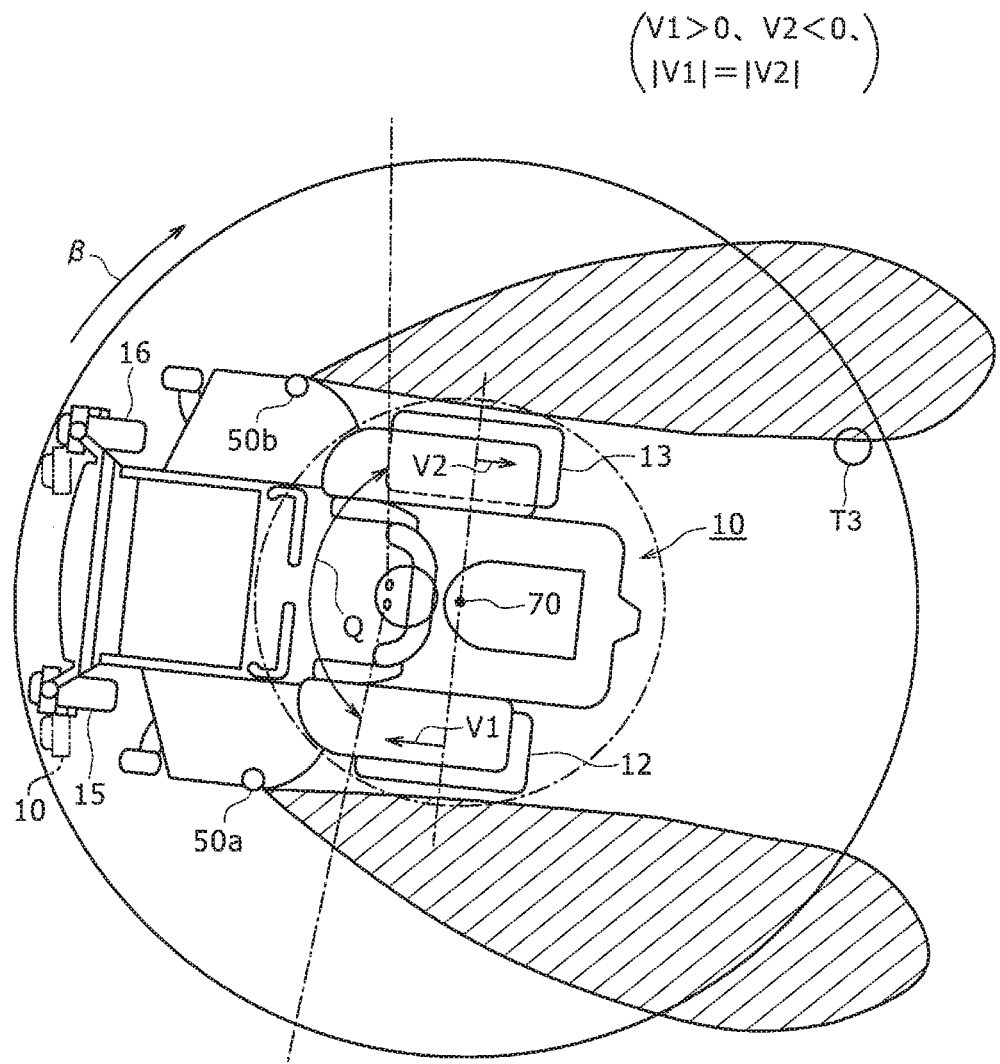
FIG. 9 is a view showing a state when the vehicle, from the state of FIG. 2, performs an ultra-pivot turn in a β direction, and the sensor detects an obstacle.

While a case has been described, in FIG. 8, where the vehicle 10 turns rapidly in the arrow α direction, there will be cases where the vehicle 10 turns rapidly to the rear using a zero-turn in an arrow β direction opposite to the arrow α, such as shown in FIG. 9. At this time, in the state shown in FIG. 9, the obstacle target T3 is detected by the first sensor 50b of the right side. As a result, the turn of the vehicle 10 is stopped, and the driving of the lawnmower 18 is also stopped.

Figure 10:
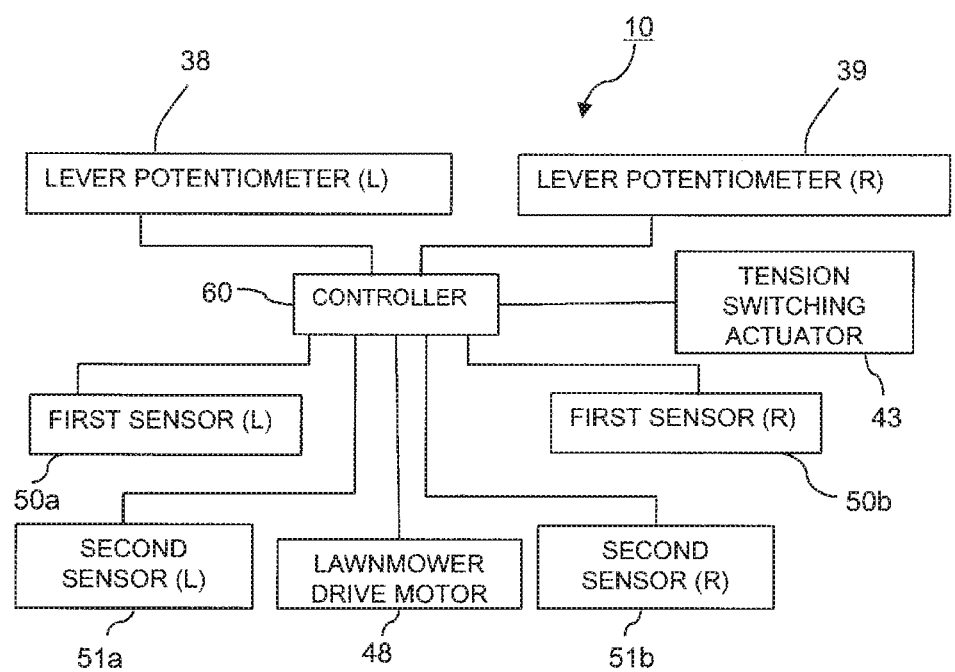
FIG. 10 is a block diagram showing the characteristic configuration of a riding type vehicle in another example of an embodiment according to the present invention.
Figure 11:
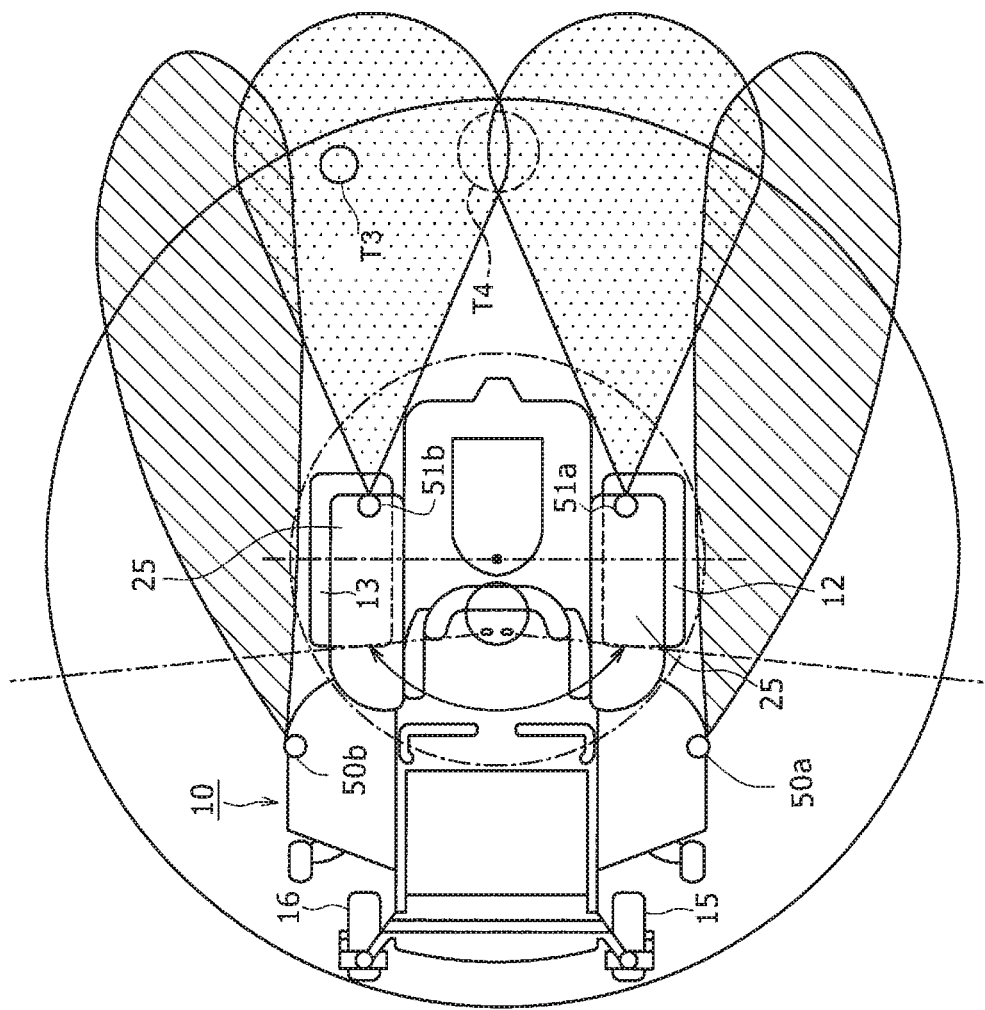
FIG. 11 is a view corresponding to FIG. 2, in the configuration shown in FIG. 10.

FIG. 10 is a block diagram showing the characteristic configuration of the vehicle 10 in another example of an embodiment. FIG. 11 is a view corresponding to FIG. 2, in the configuration shown in FIG. 10. In the configurations shown in FIG. 10 and FIG. 11, second sensors 51a, 51b are arranged more to the rear than the first sensors 50a, 50b of the vehicle 10, in the configurations from FIG. 1 to FIG. 9. Specifically, the two second sensors 51a, 51b are respectively fixed to the upper sides of the left and right wheel covers 25, which respectively cover the upper sides of the left and right wheels 12, 13. Similar to the first sensors 50a, 50b, each of the second sensors 51a, 51b is constituted so as to detect an obstacle target positioned on the rear side. In FIG. 11, the detection regions of each of the second sensors 51a, 51b are shown by dispersed dot-shaped regions. The detection regions extend to the rear, and do not cross the vehicle 10. Detection signals of the second sensors 51a, 51b are transmitted to the controller 60. In order to reduce undetectable regions, it is preferable for the detection regions of the two second sensors 51a, 51b to partially overlap, such as in FIG. 11. Moreover, in order to reduce undetectable regions, it is preferable for the detection regions of each of the second sensors 51a, 51b to partially overlap with the detection regions of the first sensors 50a, 50b.

The controller 60 has the turn stop section 62 (FIG. 3) and the lawnmower drive stop section 63 (FIG. 3). At the time when an obstacle target has been detected by at least one of the first sensors 50a, 50b and the second sensors 51a, 51b, the turn stop section 62 causes a turn to the rear of the vehicle 10 to stop, or causes a stop of a turn to be maintained.

In addition, at the time when an obstacle target has been detected by at least one of the first sensors 50a, 50b and the second sensors 51a, 51b, the lawnmower drive stop section 63 causes the driving of the lawnmower drive motor 48 to stop, or causes a drive stop to be maintained.

According to the above described configuration, since the range in which it is possible to detect an obstacle target is extended, it will be easier to automatically detect an obstacle target that approaches the vehicle 10 at the time of turning travel to the rear. For example, even when obstacle targets T3 and T4 are positioned near the vehicle 10 at the rear of the vehicle 10, and these obstacle targets cannot be detected by the first sensors 50a, 50b, it will be easy to detect the obstacle targets T3 and T4 with the second sensors 51a, 51b. Configurations and actions other than these will be the same as the configurations of FIG. 1 to FIG. 9.

Moreover, in the configurations of FIGS. 10 and 11, it will be easy to detect obstacle targets T3 and T4 more to the rear than the rear end of the vehicle 10. Accordingly, the controller 60 may configured as when the obstacle targets T3 and T4 are detected, and it is determined to be going straight to the rear, the controller 60 causes straight travel to the rear of the vehicle 10 to stop.

Figure 12:
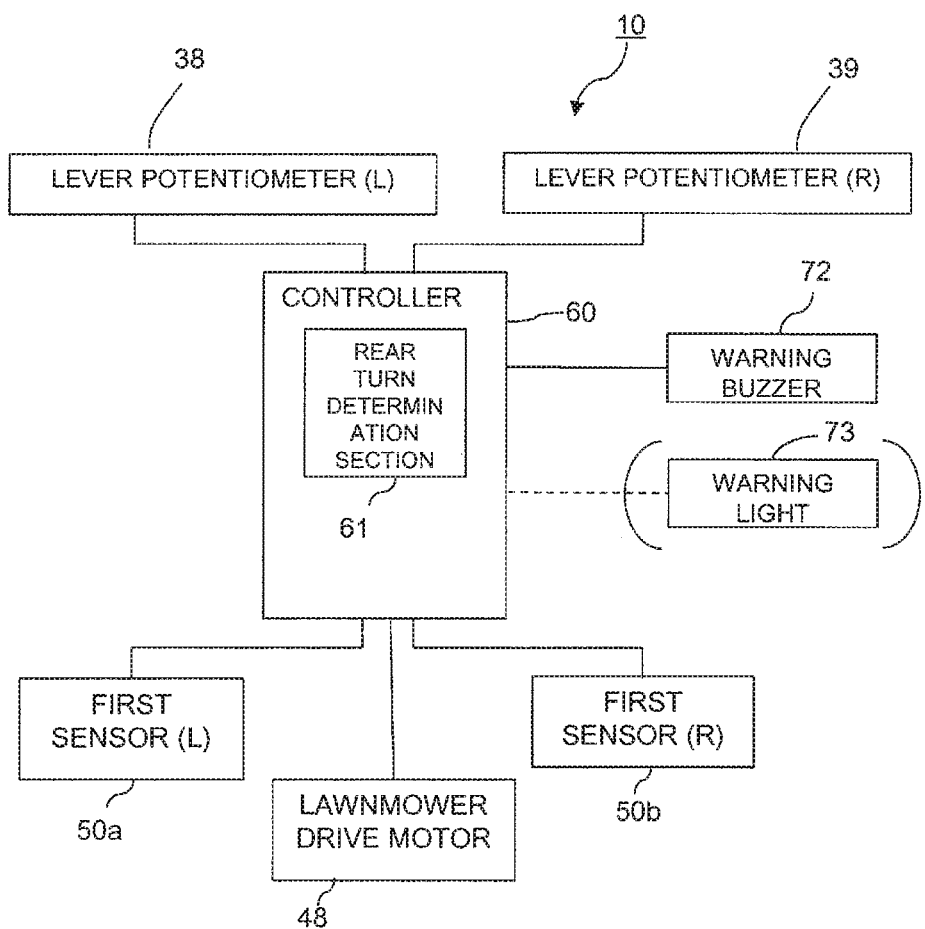
FIG. 12 is a block diagram showing the characteristic configuration of a riding type vehicle in another example of an embodiment according to the present invention.

FIG. 12 is a block diagram showing the characteristic configuration of the vehicle 10 in another example of an embodiment according to the present invention. In the configuration of FIG. 12, the tension switching actuator, in the configurations of FIG. 1 to FIG. 9, is not provided. In the configuration of FIG. 12, the vehicle 10 includes a warning buzzer 72 arranged near the driver's seat. The warning buzzer 72 corresponds to a warning section. The operation of the warning buzzer 72 is controlled by the controller 60, and warns of an approach to an obstacle target using a sound. At the time when an obstacle target has been detected by one or both of the left and right first sensors 50a, 50b, the controller 60 causes the warning buzzer 72 to operate. Since the driver can recognize an approach to an obstacle target, in response to the operation of the warning buzzer 72 the driver will cause a rear turn, or straight travel to the rear, to stop by returning the left and right operation levers 22, 23 to a neutral state, or will turn a switch (not illustrated) for the operation of the lawnmower 18 to OFF. Accordingly, safe securement of the vehicle will be carried out.

Moreover, in the configuration of FIG. 12, a warning light 73 can also be arranged near the driver's seat 21 of the vehicle, instead of the warning buzzer 72, or together with the warning buzzer 72. The warning light 73 also corresponds to a warning section. For example, the warning light 73 may be fixed near the feet of the driver's seat 21, in the vehicle. Moreover, the warning light 73 may be set above a supporting part of the caster wheels 15, 16 where it is easy to come into the visual field when turning to the front. The operation of the warning light 73 is controlled by the controller 60, and warns of an approach to an obstacle target by turning on or flashing a light. At the time when an obstacle target has been detected by one or both of the left and right first sensors 50a, 50b, the controller 60 causes the warning light 73 to operate. The driver can recognize an approach to an obstacle target by the operation of the warning light 73. Configurations and actions other than these will be the same as the configurations of FIG. 1 to FIG. 9.

Note that in the configuration of FIG. 12, the two second sensors 51a, 51b can be provided such as in the configurations of FIG. 10 and FIG. 11. Moreover, the configurations of FIG. 1 to FIG. 9, or the configurations of FIG. 10 and FIG. 11, may be configurations that include the tension switching actuator 43, and configurations where a warning section such as the warning buzzer 72 is provided. At this time, when an obstacle target has been detected by any one of the first sensors 50a, 50b and the second sensors 51a, 51b, the warning section is operated along with stopping of a turn and the driving of the lawnmower 18, or performing a stop maintenance. As a result, a warning can be issued to the driver, and the interruption of a rapid turn operation can be prompted.

While a case has been described, heretofore, where the controller 60 has both the turn stop section 62 and the lawnmower drive stop section 63, the controller may be configured to have only one of the turn stop section 62 and the lawnmower drive stop section 63. Moreover, reverse switches, which detect that the left and right operation levers 22, 23 are in a region indicating reversing, may be respectively provided, in the vehicle 10, near the left and right operation levers 22, 23. Detection signals of the reverse switches are transmitted to the controller 60. At this time, by using not only the lever potentiometers 38, 39, but also the detection signals of the reverse switches in an auxiliary manner, the controller 60 can more stably determine whether or not the vehicle 10 is turning to the rear.

Moreover, two left and right direction indication lights can be fixed at positions separated in the left-right direction on the front end part of the vehicle 10, such as at positions near a supporting part of the caster wheels 15, 16, for example, along with attaching direction indication switches to the left and right operation levers 22, 23. Each of the direction indication lights is constituted to be capable of flashing a light in the case were the direction indication switch of the side corresponding to the left or the right has been pressed. In such a configuration, since the vehicle 10 turning to the front or the rear side can be notified to a person nearby by the flashing of the direction indication lights, it becomes possible to perform safer travelling. Moreover, the direction indication lights may be used as the above described warning section. Specifically, when an obstacle target has been detected by one or both of the left and right first sensors 50a, 50b, the controller causes the left and right direction indication lights to turn on or flash at the same time.

Moreover, while a case has been described, heretofore, where a turn of the vehicle 10 is stopped by controlling the tension switching actuator 43, a turn of the vehicle 10 may be stopped by various methods other than this. For example, a throttle actuator that mechanically or electrically adjusts the opening of a throttle valve of the engine may be included, and a turn may be stopped by closing the throttle valve by having the controller 60 control the driving of the throttle actuator. Moreover, there may be a configuration that includes bypass valves 28a, 29a (FIG. 4B) arranged between the hydraulic circuits of the power generation units 26, 27 and an oil reservoir, and bypass actuators that open-close the bypass valves 28a, 29a at the same time. Also, a turn may be stopped by stopping the supply of oil to the hydraulic motors, by setting the bypass valves 28a, 29a to an opened state, namely, a state where the main oil paths S1, S2 and the oil reservoir are connected, by having the controller 60 control the driving of the bypass actuators. Moreover, there may be a configuration that includes actuators that drive the swash plate operation levers 32c, 33c connected to the swash plate operation shafts 32b, 33b of the hydraulic pumps 32, 33, and these actuators are controlled by the controller 60 by converting the operation amounts of each of the operation levers 22, 23 into electrical signals. Also, the supply oil to the hydraulic motors may be stopped, by setting the tilting angles of the movable swash plates to a neutral state by causing the swash plate operation shafts to rotate, and stopping the discharge of oil from the hydraulic pumps 32, 33. As a result, it becomes possible to stop a turn.

Figure 13:
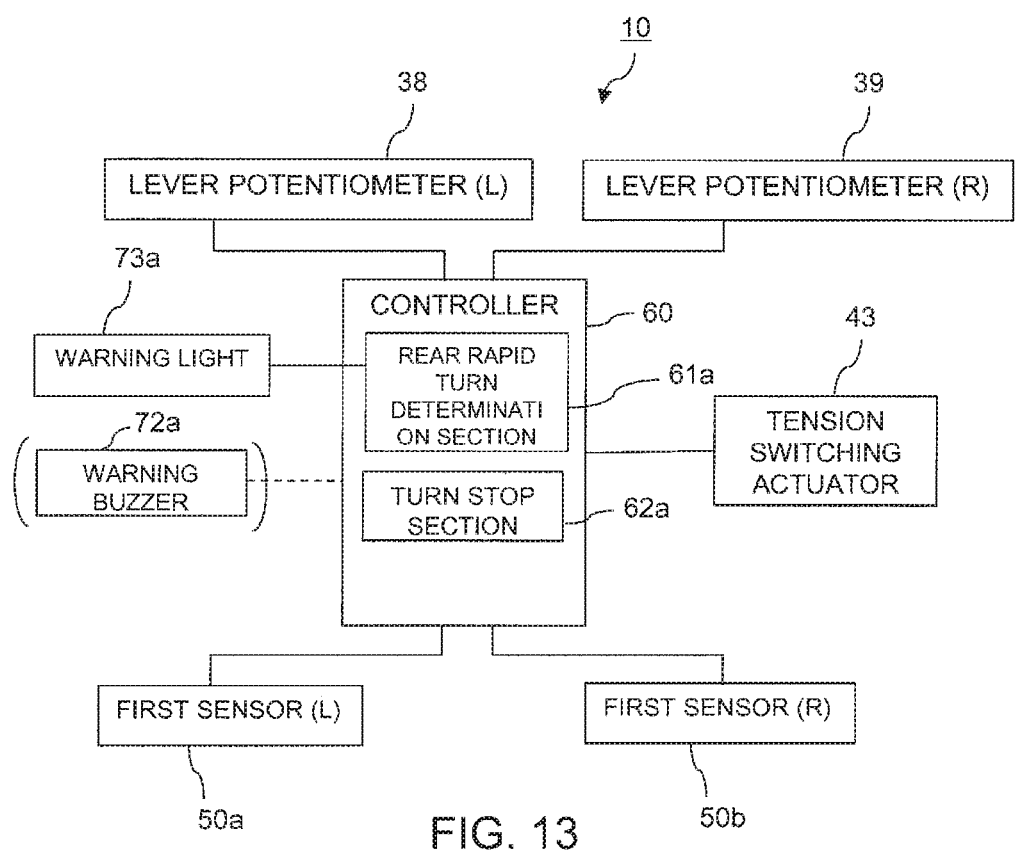
FIG. 13 is a block diagram showing the characteristic configuration of a riding type vehicle in another example of an embodiment of the present invention.

FIG. 13 is a block diagram showing the characteristic configuration of a riding type vehicle in another example of an embodiment according to the present invention. In the configuration of this example, the vehicle 10, in the configurations of FIG. 1 to FIG. 9, includes the warning light 73*a* (FIG. 13) arranged near the driver's seat 21 of the vehicle. The warning light 73*a* corresponds to a warning section. For example, the warning light 73*a* may be fixed near the feet of the driver's seat 21, in the vehicle. Moreover, the warning light 73*a* may be set above a supporting part of the caster wheels 15, 16 where it is easy to come into the visual field when turning to the front. Moreover, the operation of the warning light 73*a* is controlled by the controller 60, described later, and warns of an approach to an obstacle target by turning on or flashing a light.

As shown in FIG. 13, the controller 60 includes an operation section such as a CPU and a storage section such as a memory. The controller 60 has a rear rapid turn determination section 61*a*, and a turn stop section 62*a*. The rear rapid turn determination section 61*a* determines whether or not the vehicle 10 is rapidly turning to the rear from detection signals of the left and right lever potentiometers 38, 39. For example, the rotation directions and rotation angles of the left and right wheels 12, 13 are calculated from these detection signals. In the case where the left and right wheels 12, 13 rotate to the rear, and the rotation speeds of the left and right wheels 12, 13 differ, it is determined that the vehicle 10 is turning to the rear.

In addition, in the case where only one wheel of the left and right wheels 12, 13 rotates to the rear, it is determined that the vehicle 10 is rapidly turning to the rear. Moreover, in the case where the left and right wheels 12, 13 rotate in opposite directions, and an absolute value of a ground movement speed of a rear rotating wheel, which is the wheel rotating to the rear, is larger than an absolute value of a ground movement speed of a front rotating wheel, which is the wheel rotating to the front, it is also determined that the vehicle 10 is rapidly turning to the rear. Such a rapid turn will be described afterwards using FIG. 14. When the respective absolute values of the ground movement speeds of the rear rotating wheel and the front rotating wheel are larger than zero, and a difference of both absolute values is zero, the rapid turn will be a zero-turn.

When an obstacle target has been detected by at least one of the first sensors 50*a*, 50*b*, in the case where it is determined that the vehicle 10 is rapidly turning to the rear by the rear rapid turn determination section 61*a*, the turn stop section 62*a* causes the rapid turn to the rear of the vehicle 10 to stop. At this time, by having the turn stop section 62*a* control the driving of the tension switching actuator 43, the driving of the left and right hydraulic motors 30, 31 is stopped by making the tension of the belt 36 zero, namely, by cutting the clutch. As a result, the left and right wheels 12, 13 stop, and therefore the rapid turn to the rear stops. Moreover, when an obstacle target has been detected by at least one of the first sensors 50*a*, 50*b*, in the case where it is determined that the vehicle 10 is stopped, the turn stop section 62 causes the stop of a rapid turn to the rear of the vehicle 10 to be maintained. At this time, a straight travel stop to the rear may be maintained, along with maintaining a rapid turn stop to the rear of the vehicle 10.

Straight travel, turning travel, a pivot turn, and an ultra-pivot turn of the vehicle 10 are the same as the travelling or turning described using FIG. 5 and FIG. 6A to FIG. 6C.

Figure 14:
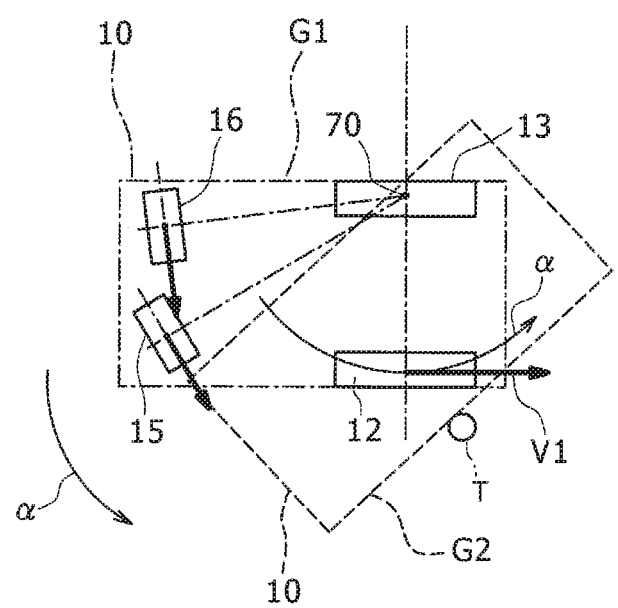
FIG. 14 is a schematic illustration showing the inconvenience for the vehicle, when rapidly turning to the rear, centered on one wheel of the left and right wheels, in an embodiment.

FIG. 14 is a schematic illustration showing the inconvenience for the vehicle 10, at the time when rapidly turning to the rear. In FIG. 14, for ease of understanding, the vehicle 10 is shown by a dash-dotted line G1 rectangle and a dotted line G2 rectangle. From a state where the vehicle 10 is the dash-dotted line G1, there will be cases where only the left wheel 12, which is one wheel of the left and right wheels 12, 13, rotates in the backward direction, and the stopping of the right wheel 13, which is the other wheel, is maintained. In this case, as shown by the dotted line G2, the vehicle 10 turns rapidly to the rear as shown by the arrow α direction, by setting the ground position of the right wheel 13 to the turn center position 70. Also, in the state of the dash-dotted line G1, there will be cases where there is an obstacle target, shown by T, more to the front than the rear end of the vehicle 10, and nearer to the outer side than the left side surface. At this time, there will be times where the obstacle target T cannot be seen by the driver in the driver's seat 21, or the driver fails to notice the obstacle target T. At this time, since the vehicle 10 continues to turn while extending in the left-right direction outer side at the front side, there is the possibility that the vehicle 10 will collide with the obstacle target T, in the state of the dotted line G2. In the vehicle 10 of an embodiment shown in FIG. 13, even in the case where obstacle targets, such as shown by T1 and T2 by referring to FIG. 2, are positioned on the left-right direction outer sides of the vehicle 10, the obstacle targets can be detected at an early stage by at least one of the first sensors 50*a*, 50*b*, from among the two first sensors 50*a*, 50*b*. In this state, a rapid turn to the rear of the vehicle 10 is stopped, or a stop of a turn is maintained.

Moreover, in order to release these stop and stop maintenance states, after a turn to the rear is stopped, or a stop maintenance is performed, for example, the driver causes the vehicle 10 to travel to the front or the like, and the obstacle targets will then fall outside the detection regions of the first sensors 50*a*, 50*b*. Also, in this state, the controller 60 may be configured to perform a reset, for example, by returning the left and right operation levers 22, 23 to a neutral state. This reset causes the controller 60 to permit a turn to the rear of the vehicle.

At the time when an obstacle target has been detected by at least one of the first sensors 50*a*, 50*b*, the controller 60 causes the warning light 73*a* to operate, along with causing a rapid turn to the rear of the vehicle 10 to stop, or causing a stop of a rapid turn to be maintained. As a result, the driver can recognize an approach to an obstacle target. Note that the warning buzzer 72*a* can be arranged near the driver's seat 21 of the vehicle, instead of the warning light 73*a*, or together with the warning light 73*a*. The warning buzzer 72*a* corresponds to a warning section. The operation of the warning buzzer 72*a* is controlled by the controller 60, and warns of an approach to an obstacle target using a sound. At the time when an obstacle target has been detected by one or both of the left and right first sensors 50*a*, 50*b*, the controller 60 causes the warning buzzer 72*a* to operate. The driver can recognize an approach to an obstacle target, by the operation of the warning buzzer 72*a*.

According to the above described vehicle 10, in a configuration where the left and right wheels 12, 13 are independently travel-driven by the hydraulic motors 30, 31, it will be easy to automatically avoid a collision with an obstacle target by the vehicle 10 at the time of rapid turning travel to the rear. In this case, different to the case where sensors capable of detecting the rear are arranged only on the rear end of the vehicle 10, similar to the configurations of FIG. 1 to FIG. 9, it will be easy to detect an obstacle target positioned more on the outer side than both the left and right ends of the vehicle 10 and more to the front than the rear end of the vehicle 10. Also, a turn of the vehicle 10 can be stopped at an early stage, by the detection of an obstacle target.

Moreover, when the vehicle 10 rapidly turns, using a zero-turn or the like, to the rear in the arrow α direction, as shown in FIG. 2 and FIG. 8, the obstacle target T3 will be detected by the first sensor 50*b* of the left side in the state of FIG. 8. As a result, the rapid turn of the vehicle 10 is stopped, and the vehicle 10 is prevented from colliding with the obstacle target T3.

Moreover, in the case where the vehicle 10 turns rapidly using a pivot turn to the rear, as in FIG. 14, there will be cases where an obstacle target is not in either of the detection ranges of the left and right first sensors 50*a*, 50*b*, in a stop state. Also in this case, it will be easy for an obstacle target to be detected by any one of the first sensors 50*a*, 50*b*, in a state where a rapid turn is continued. As a result, the rapid turn of the vehicle 10 is stopped, and the vehicle 10 is prevented from colliding with the obstacle target T. In this way, when the left and right wheels 12, 13 rotate in opposite directions, and an absolute value of the ground movement speed of the wheel rotating to the rear is equal to or higher than an absolute value of the ground movement speed of the wheel rotating to the front, a rapid turn to the rear of the vehicle 10 will occur. Moreover, in the case where only one wheel of the left and right wheels 12, 13 rotates in the backward direction, and the other wheel is stopped, a rapid turn to the rear will occur. In this way, when the vehicle 10 turns rapidly to the rear, it will become easy for the vehicle to approach an obstacle target positioned in a difficult-to-confirm position. Moreover, in the case where the vehicle turns rapidly using a zero-turn, the vehicle will significantly deflect in the left-right direction at this location, and therefore it will become easy for the vehicle to approach an obstacle target positioned in a difficult-to-confirm position. Also, considerable attention will be required by the driver in order to prevent the vehicle colliding with the obstacle target. In an embodiment, when the obstacle target has been detected by the first sensors 50*a*, 50*b*, the effect achieved with a configuration where the controller 60 causes a rapid turn to the rear to be stopped, or causes a stop of a rapid turn to be maintained, will be remarkable. Configurations and actions other than these will be the same as the configurations of FIG. 1 to FIG. 9.

By referring to FIG. 10 and FIG. 11, a vehicle in another example of an embodiment will be described. In the configuration of this example, the second sensors 51*a*, 51*b* are arranged more to the rear than the first sensors 50*a*, 50*b* of the vehicle, in the configuration of FIG. 13. Moreover, the controller 60 has the turn stop section 62*a* (FIG. 13). When an obstacle target has been detected by at least one of the first sensors 50*a*, 50*b* and the second sensors 51*a*, 51*b*, the turn stop section 62*a* causes a rapid turn to the rear of the vehicle 10 to stop, or causes a stop of a rapid turn to be maintained.

According to the above described configuration, since the range capable of detecting an obstacle target is extended, it will be easier to automatically detect an obstacle target that approaches the vehicle 10 at the time of turning travel to the rear. For example, even when obstacle targets T3 and T4 (FIG. 11) are positioned near the vehicle 10 at the rear of the vehicle 10, and these obstacle targets can not be detected by the first sensors 50*a*, 50*b*, it will be easy to detect the obstacle targets T3 and T4 with the second sensors 51*a*, 51*b*. As a result, it will be easy to automatically and effectively avoid a collision of the vehicle 10 with an obstacle target at the time of rapid turning travel to the rear. Configurations and actions other than these will be the same as the configurations of FIG. 1 to FIG. 9, the configurations of FIG. 10 and FIG. 11, or the configuration of FIG. 13.

Figure 15:
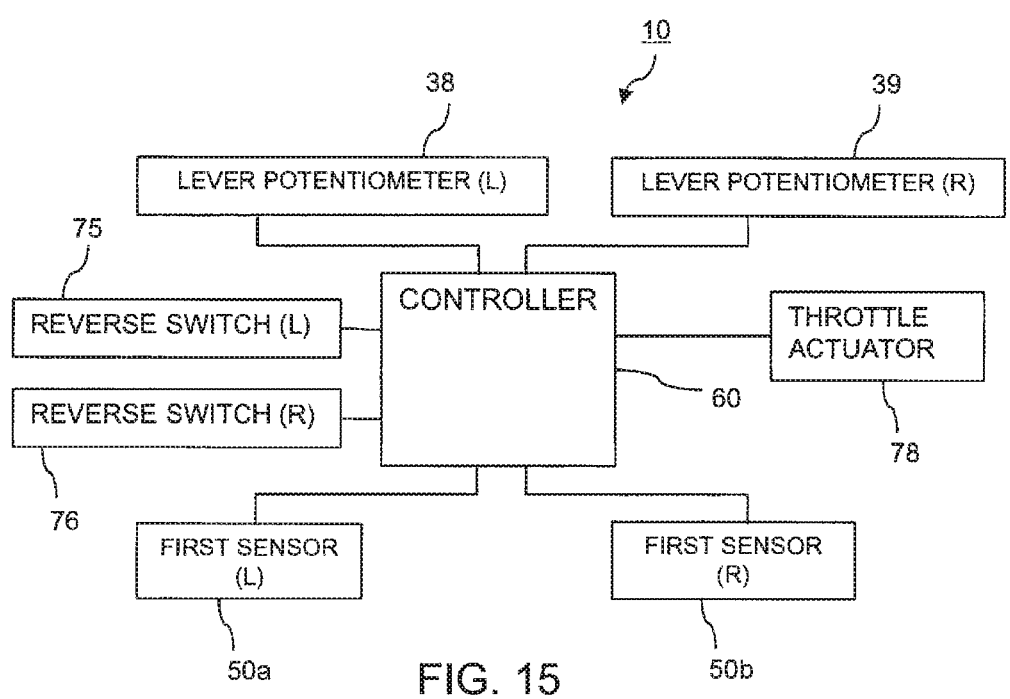
FIG. 15 is a block diagram showing the characteristic configuration of a riding type vehicle in another example of an embodiment of the present invention.
Figure 16:
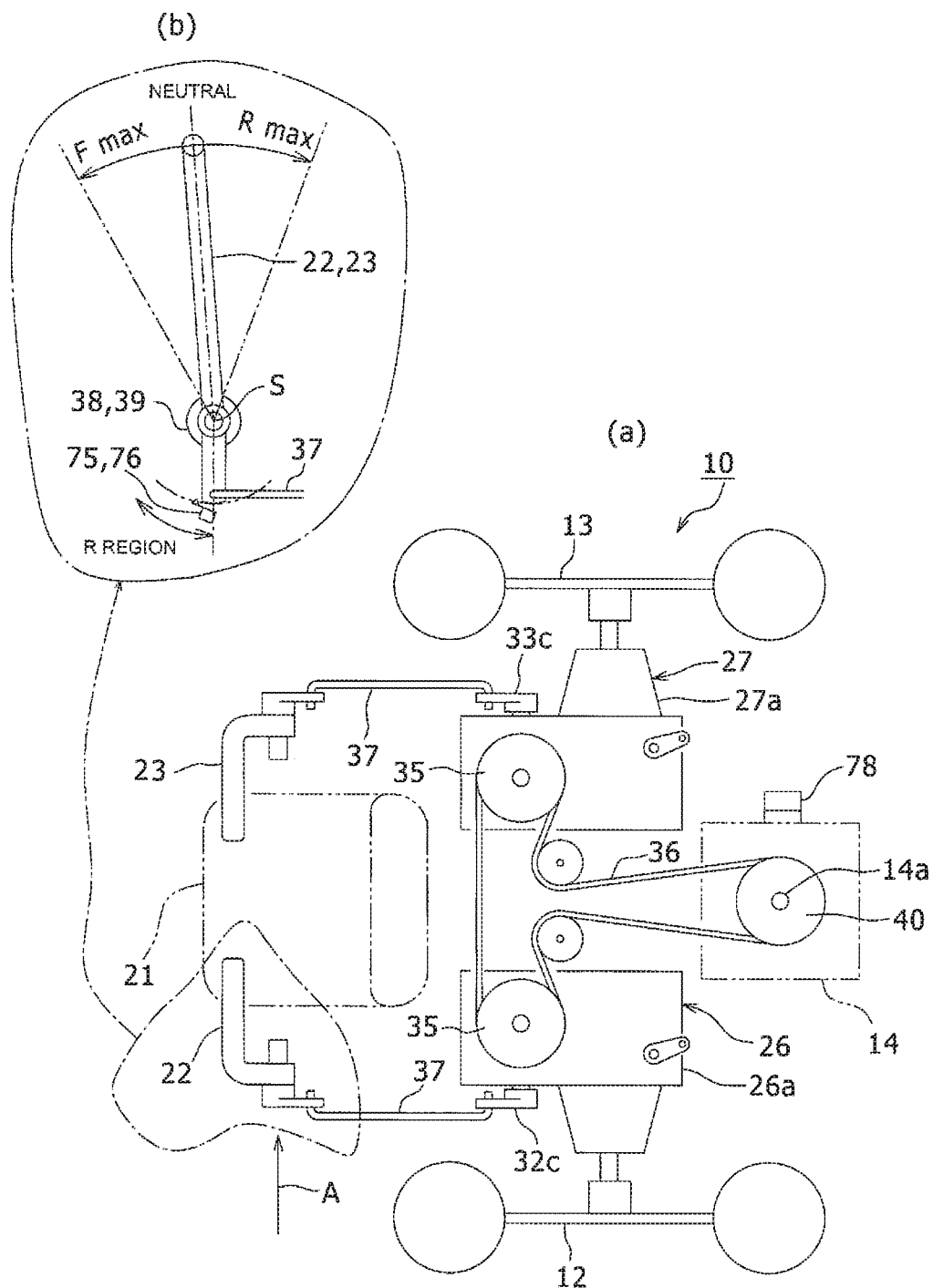
FIG. 16 (a) is a view corresponding to FIG. 4A, in the configuration shown in FIG. 15, and FIG. 16 (b) is a view seen from an arrow A direction of FIG. 16 (a)

FIG. 15 is a block diagram showing the characteristic configuration of the vehicle 10 in another example of an embodiment. FIG. 16 (*a*) is a view corresponding to FIG. 4A, in the configuration shown in FIG. 15, and FIG. 16 (*b*) is a view seen from an arrow A direction of FIG. 16 (*a*). By referring to FIG. 1 to FIG. 9, the vehicle 10 of FIG. 15 and FIG. 16 includes a left reverse switch 75 arranged in the surrounding part of the lower end part of the left operation lever 22, and a right reverse switch 76 arranged in the surrounding part of the lower end part of the right operation lever 23, in the configuration of FIG. 13. The left and right reverse switches 75, 76 detect whether or not the left and right operation levers 22, 23 have been swung to regions (the R regions of FIG. 16) indicating reversing, centered on shafts S in the left-right direction of the lower end part. Also, in the case where it is detected that the left and right operation levers 22, 23 have been swung to the regions for indicate reversing, the left and right reverse switches 75, 76 transmit these detection signals to the controller 60. For example, in the case where the front end parts of the reverse switches 75, 76 have been pressed downward, by the front end of the lower end parts of the operation levers 22, 23, it is detected that reversing has been instructed by the operation levers 22, 23 lowering from a neutral state to the rear. By using not only the left and right lever potentiometers 38, 39, but also the detection signals of the reverse switches 75, 76 as an assistance, the controller 60 will more stably determine whether or not the vehicle is rapidly turning to the rear. The left and right operation levers 22, 23 are capable of being displaced, from a maximum displacement position Fmax of a region indicating advancing to a maximum displacement position Rmax of a region indicating reversing, centered on the neutral position of FIG. 16. The left and right lever potentiometers 38, 39 are arranged near shafts S of the left and right operation levers 22, 23. An illustration of the left and right lever potentiometers 38, 39 is omitted in FIG. 16 (*a*).

Moreover, the vehicle 10 includes a throttle actuator 78 that mechanically or electrically adjusts the opening of a throttle valve of the engine 14. The throttle actuator 78 includes a motor (not illustrated) fixed to a rotating shaft (not illustrated) of the throttle valve. The controller 60 controls the motor of the throttle actuator 78, so that the engine 14 is driven at a constant rotation speed determined beforehand, by having a start switch (not illustrated) set to ON by a user. The controller 60 controls the throttle actuator 78 so as to cause the throttle valve to close, by having the start switch set to OFF by the user.

Moreover, when an obstacle target has been detected by at least one of the first sensors 50*a*, 50*b*, in the case where it is determined that the vehicle 10 is rapidly turning to the rear by the rear rapid turn determination section 61*a* (FIG. 13), the controller 60 causes the rapid turn to the rear of the vehicle 10 to stop. When an obstacle target has been detected by at least one of the first sensors 50*a*, 50*b*, in the case where it is determined that the vehicle is stopped, the controller 60 causes a stop of a rapid turn to the rear of the vehicle 10 to be maintained. At this time, by having the turn stop section 62*a* (FIG. 13) control the driving of the throttle actuator 78, the rapid turn to the rear of the vehicle is stopped, or the stop of the rapid turn is maintained, by closing the throttle value. Configurations and actions other than these will be the same as the configurations of FIG. 1 to FIG. 9, or the configuration of FIG. 13.

Figure 17:
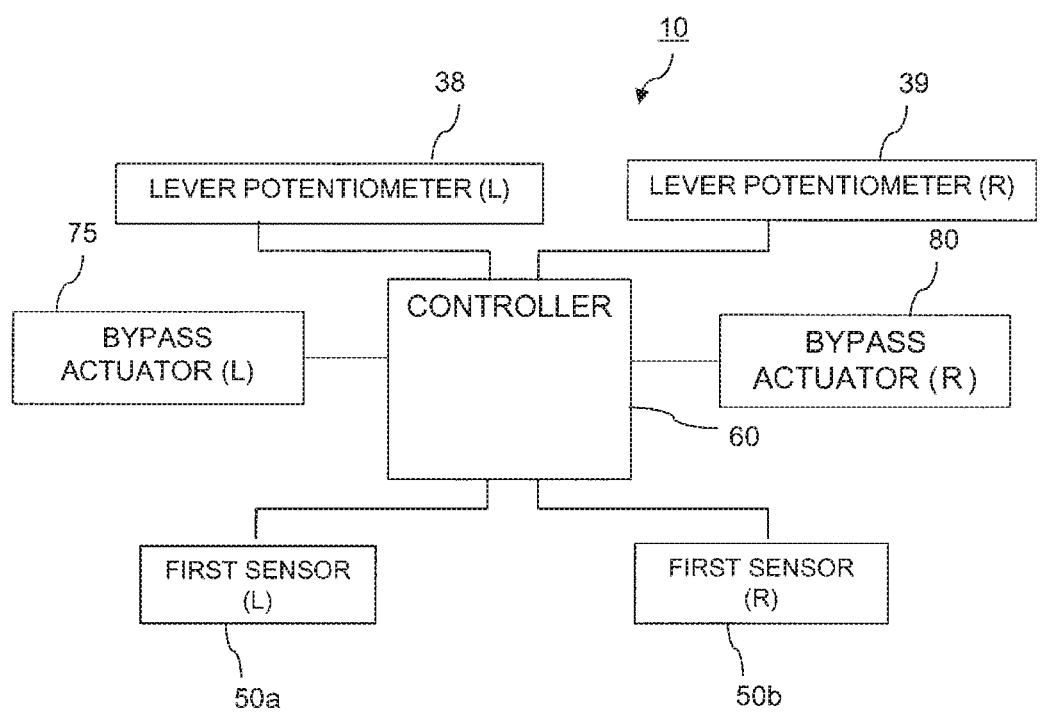
FIG. 17 is a block diagram showing the characteristic configuration of a riding type vehicle in another example of an embodiment of the present invention.

FIG. 17 is a block diagram showing the characteristic configuration of the vehicle 10 in another example of an embodiment. In the configuration of FIG. 13, the vehicle 10 of FIG. 17 includes left and right bypass actuators 79, 80. The left and right bypass actuators 79, 80 respectively drive the bypass valves 28a, 29a connected between the main oil paths S1, S2 of the hydraulic circuits 28, 29 of the left and right power generation units 26, 29, and the oil reservoir E, by referring to FIG. 4B. The bypass valves 28a, 29a cause oil of the main oil paths S1, S2 to be discharged to the oil reservoir E, in an opened state, namely, in a connection state between the main oil paths S1, S2 and the oil reservoir E. On the other hand, the bypass valves 28a, 29a cause oil to circulate to the main oil paths S1, S2 in a closed state, namely, in a disconnection state between the main oil paths S1, S2 and the oil reservoir E. For example, the left bypass actuator 79 includes a left solenoid that electrically switches the opening and closing of the left bypass valve 28a, and the right bypass actuator 80 includes a right solenoid that electrically switches the opening and closing of the right bypass valve 29a. Each of the bypass actuators 79, 80 is controlled by the controller 60. Also, the controller 60 stops the supply of oil to the hydraulic motors 30, 31, even during the driving of the hydraulic pumps 32, 33, by setting the left and right bypass valves 28a, 29a to an opened state at the same time by controlling the driving of the left and right bypass actuators 79, 80. As a result, since the hydraulic motors 30, 31 are in an idling state, a rapid turn to the rear of the vehicle 10 will be stopped, or a stop of a rapid turn will be maintained. Note that at this time, the vehicle 10 will be stopped by inertia, and therefore there is the possibility of making contact with an obstacle target during travel. However, driving power is not provided to the hydraulic motors 30, 31 in this case, and therefore an applied force at the time of contact can be significantly reduced. Configurations and actions other than these will be the same as the configurations of FIG. 1 to FIG. 9, or the configuration of FIG. 13. Even in the configuration of FIG. 17, similar to the configurations of FIG. 15 and FIG. 16, reverse switches can be included as an assistance. Reverse switches can be similarly included in each of the configurations shown in FIG. 1 to FIG. 13.

Figure 18:
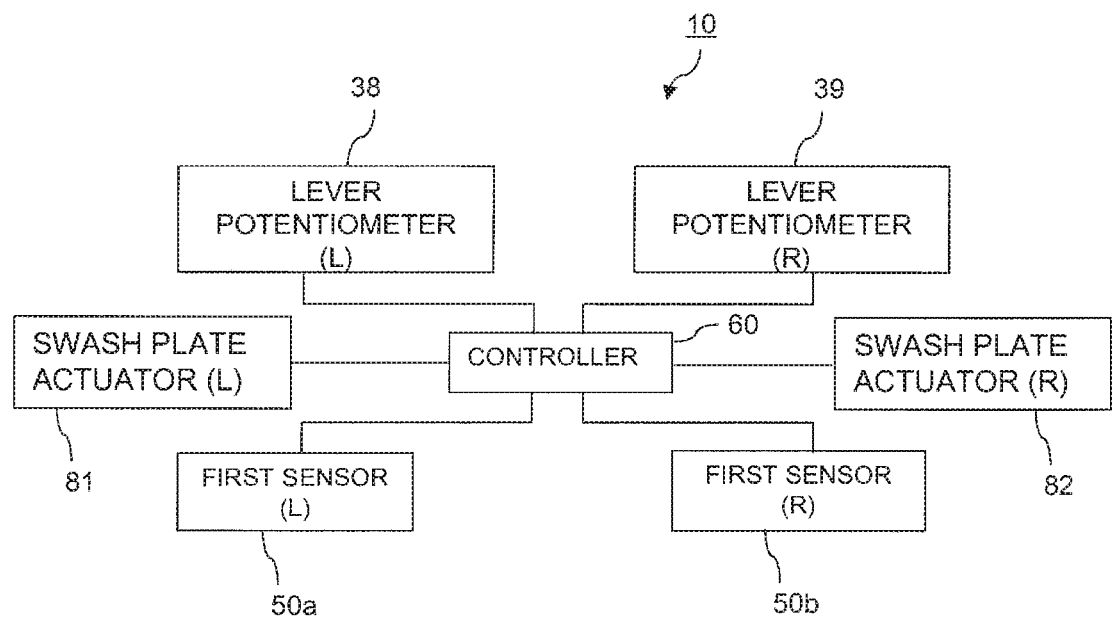
FIG. 18 is a block diagram showing the characteristic configuration of a riding type vehicle in another example of an embodiment of the present invention.
Figure 19:
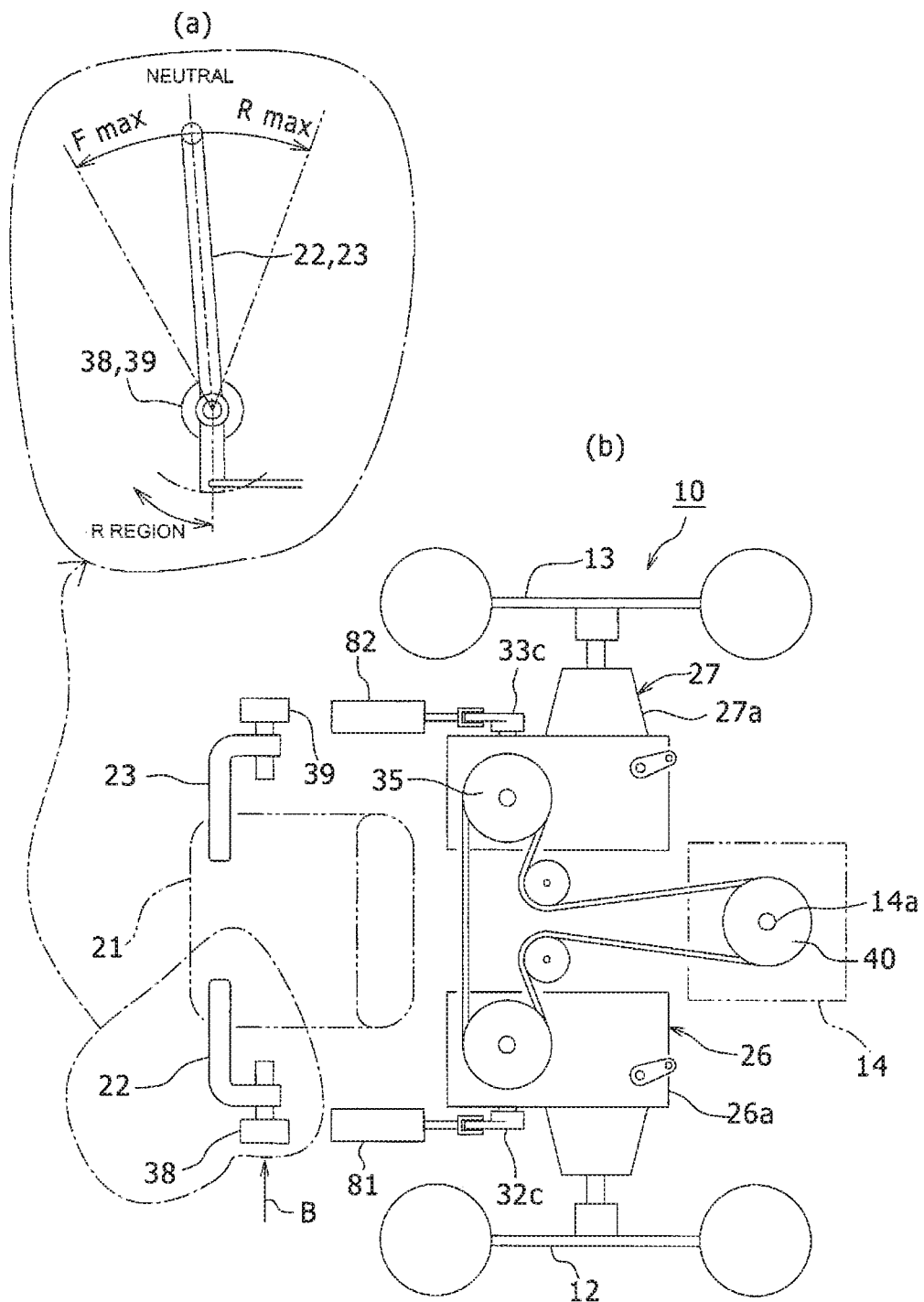
FIG. 19 (a) is a view corresponding to FIG. 4A, in the configuration shown in FIG. 18, and FIG. 19 (b) is a view seen from an arrow B direction of FIG. 19 (a)

FIG. 18 is a block diagram showing the characteristic configuration of the vehicle 10 in another example of an embodiment. FIG. 19 (a) is a view corresponding to FIG. 4A, in the configuration shown in FIG. 18, and FIG. 19 (b) is a view seen from an arrow B direction of FIG. 19 (a). The vehicle 10 of FIG. 18 and FIG. 19 does not have the swash plate operation levers 32c, 33c of the left and right power generation units 26, 27, in the configuration of FIG. 13, connected via the operation levers 22, 23 and a link. Instead of this, the vehicle 10 includes left and right swash plate actuators 81, 82. The swash plate actuators 81, 82 drive the swash plate operation levers 32c, 33c connected to the swash plate operation shafts 32b, 33b (FIG. 4B) of the hydraulic pumps 32, 33 (FIG. 4B) of the corresponding sides, and are controlled by the controller 60. The swash plate actuators 81, 82 include a piston cylinder mechanism, or a motor, for example, which rotates the swash plate operation levers 32c, 33c of the corresponding sides.

The controller 60 drives the left and right swash plate operation levers 32c, 33c by controlling the driving of the left and right swash plate actuators 81, 82, in accordance with detection signals from the left and right lever potentiometers 38, 39. For example, in the case where the left and right operation levers 22, 23 have been lowered to the front, the controller 60 drives the swash plate operation levers 32c, 33c in one direction by controlling the swash plate actuators 81, 82, in accordance with detection signals from the lever potentiometers 38, 39. As a result, the discharge amounts of the left and right hydraulic pumps 32, 33 will change, and the movable swash plates of each of the hydraulic pumps 32, 33 will tilt, so that the discharge amounts of each of the hydraulic pumps 32, 33 increase at the advancing side. In the case where the left and right operation levers 22, 23 have been lowered to the rear, the controller 60 drives the swash plate operation levers 32c, 33c in the other direction by controlling the swash plate actuators 81, 82. As a result, the discharge amounts of the left and right hydraulic pumps 32, 33 will change, and the movable swash plates of each of the hydraulic pumps 32 and 33 will tilt, so that the discharge amounts of each of the hydraulic pumps 32, 33 increase in a direction of a rotation of the reversing side. Accordingly, the controller 60 causes the movable swash plates of the left and right hydraulic pumps 32, 33 to tilt, and causes the discharge amounts of the hydraulic pumps 32 and 33 to change, by controlling the driving of the left and right swash plate actuators 81, 82 in accordance with detection signals of the left and right lever potentiometers 38, 39.

In addition, the controller 60 sets the discharge amounts of each of the hydraulic pumps 32, 33 to substantially zero, by setting the tilting angles of the movable swash plates of the left and right hydraulic pumps 32, 33 to approximately a neutral state, by controlling the driving of the left and right swash plate actuators 81, 82. As a result, a rapid turn to the rear of the vehicle is stopped, or a stop of a rapid turn is maintained. Configurations and actions other than these will be the same as the configurations of FIG. 1 to FIG. 9, or the configuration of FIG. 13. Even in the configurations of FIG. 18 and FIG. 19, similar to the configurations of FIG. 15 and FIG. 16, reverse switches can be included as assistance.

Figure 20:
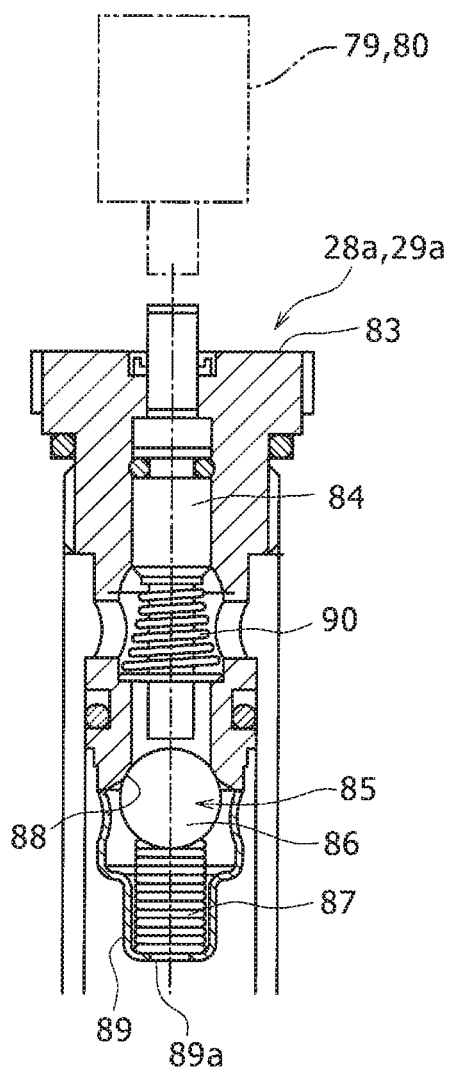
FIG. 20 is a sectional view showing bypass valves operated by bypass actuators mounted in a riding type vehicle in another example of an embodiment of the present invention.

FIG. 20 is a sectional view showing the bypass valves 28a, 29a operated by the bypass actuators 79, 80 mounted in a vehicle in another example of an embodiment. The bypass valves 28a, 29a of FIG. 20 are used as opening-closing valves for switching the connection and disconnection between the main oil paths S1, S2 of the hydraulic circuits 28, 29, and the oil reservoir E, of FIG. 4B. Specifically, the bypass valves 28a, 29a include a housing 83, and a piston 84 and check valve 85 arranged inside this housing. At the time of closing the bypass valves 28a, 29a, the connection between the main oil paths S1, S2 and the oil reservoir E is disconnected, by having a ball 86 of the check valve 85 energized at a valve seat 88 by a spring 87. The spring side of the ball 86 passes through the oil reservoir E via a hole 89a of a spring pressing part 89, and the valve seat side of the ball passes through the main oil paths S1, S2. Also, one end (the lower end in FIG. 20) of the piston 84 opposes the ball 86, and the piston 84 is energized by a second spring 90 so as to separate from the ball 86. The other end (the upper end in FIG. 20) of the piston 84 protrudes from the housing 83. The bypass valves 28a, 29a are opened by causing the bypass actuators 79, 80, which are advancing-and-backing controlled by the controller 60, to operate by protruding in the lower orientation of FIG. 20. Specifically, at the time of opening the bypass valves 28a, 29a, namely, at the time of connecting the main oil paths and the oil reservoir, the bypass valves are opened, by having the portions protruding at the other end of the piston 84 pressed to the ball 86 side by the bypass actuators. Configurations and actions other than these will be the same as the configurations of FIG. 1 to FIG. 9, the configuration of FIG. 13, or the configuration of FIG. 17.

Figure 21:
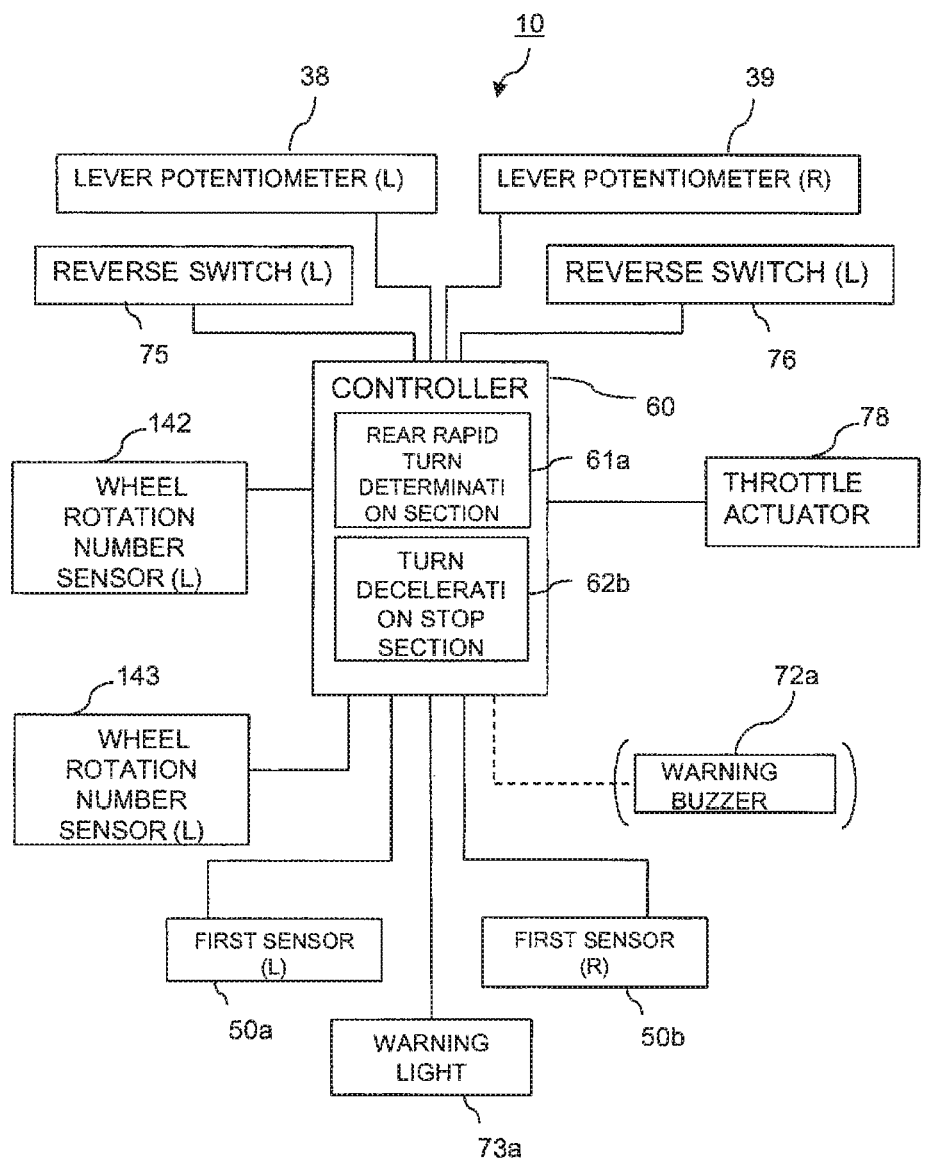
FIG. 21 is a block diagram showing the characteristic configuration of a riding type vehicle in another example of an embodiment of the present invention.
Figure 22:
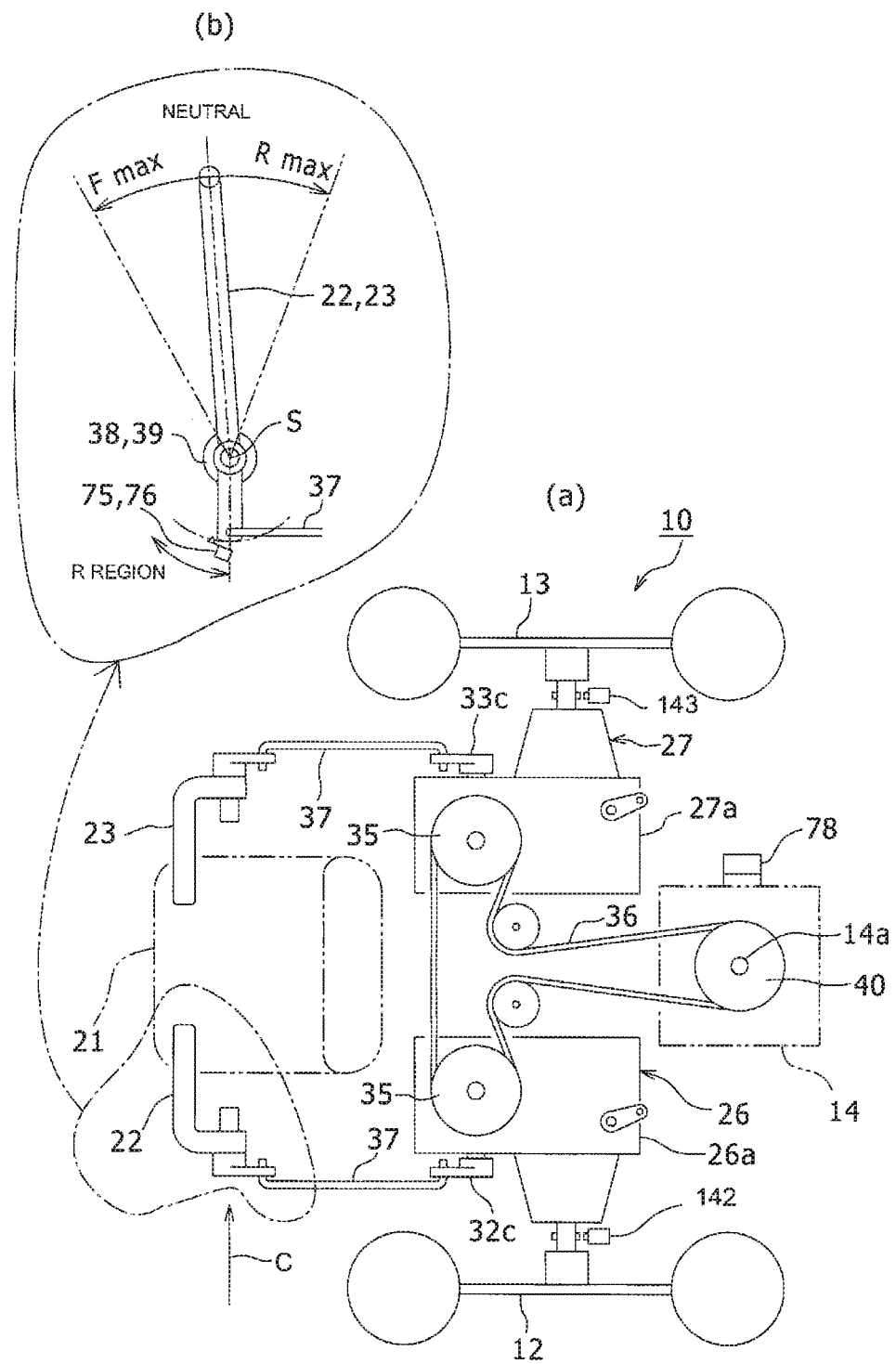
FIG. 22 (a) is a view, seen from the upper side of the vehicle, of a power transmission structure between power generation units for the left wheel and the right wheel, and an engine, in another example of an embodiment, and FIG. 22 (b) is a view seen from an arrow C direction of FIG. 22 (b)

FIG. 21 is a block diagram showing the characteristic configuration of a riding type vehicle in another example of an embodiment according to the present invention. FIG. 22 (*a*) is a view, seen from the upper side of a vehicle, of a power transmission structure between power generation units for the left wheel and the right wheel, and an engine, in another example of an embodiment, and FIG. 22 (*b*) is a view seen from an arrow C direction of FIG. 22 (*a*). In the configuration of this example, the vehicle 10, in the configurations of FIG. 1 to FIG. 9, includes the warning light 73*a* (FIG. 21) corresponding to a warning section, arranged near the driver's seat 21 of the vehicle. The operation of the warning light 73*a* is controlled by the controller 60, and warns if an approach to an obstacle target by turning on or flashing a light.

Moreover, as shown in FIG. 22, the vehicle 10 includes the left reverse switch 75 arranged in the surrounding part of the lower end part of the left operation lever 22, and the right reverse switch 76 arranged in the surrounding part of the lower end part of the right operation lever 23. The left and right reverse switches 75, 76 detect whether or not the left and right operation levers 22, 23 have been swung to regions (the R regions of FIG. 22) indicating reversing, centered on shafts S in the left-right direction of the lower end part. Also, in the case where it is detected that the left and right operation levers 22, 23 have been swung to the regions for indicating reversing, the left and right reverse switches 75, 76 transmit these detection signals to the controller 60. For example, in the case where the front end parts of the reverse switches 75, 76 have been pressed downward, by the front end of the lower end parts of the operation levers 22, 23, it is detected that reversing has been instructing by the operation levers 22, 23 lowering from a neutral state to the rear. By using detection signals of the left and right lever potentiometers 38, 39, the controller 60 will determine whether or not the vehicle is rapidly turning to the rear. At this time, by having detection signals of the reverse switches 75, 76 used as assistance, it can be determined with stability whether or not the vehicle is rapidly turning to the rear.

The left and right operation levers 22, 23 are capable of being displaced, from a maximum displacement position Fmax of a region indicating advancing to a maximum displacement position Rmax of a region indicating reversing, centered on the neutral position of FIG. 22. The left and right lever potentiometers 38, 39 are arranged near shafts S of the left and right operation levers 22, 23. An illustration of the left and right lever potentiometers 38, 39 is omitted in FIG. 22 (*a*).

Moreover, the vehicle 10 of FIG. 21 and FIG. 22 includes a throttle actuator 78. The configuration of the throttle actuator 78 is the same as the configuration described using FIG. 15 and FIG. 16. The throttle actuator 78 is controlled by the controller 60 (FIG. 21). When at least one of obstacle targets T1, T2, and T3 (FIG. 2) has been detected by the first sensors 50*a*, 50*b*, the controller 60 controls the driving of the throttle actuator 78. As a result, the controller 60 causes a turn of the vehicle 10 to decelerate by gradually bringing the throttle valve near to a closed state, and causes a turn to the rear to stop by closing the valve. Accordingly, it will become difficult for the vehicle 10 to collide with the obstacle target at the time of a turn.

Similar to the configuration shown in FIG. 2, the two first sensors 50*a*, 50*b* are arranged, in the vehicle 10, separated on both the left and right sides of the vehicle 10. The first sensors 50*a*, 50*b* are capable of measuring a distance up to an obstacle target.

Moreover, the vehicle 10 includes a left wheel rotation number sensor 142, which detects the number of rotations per unit time (for example, per minute) of the left wheel 12 in electromagnetism, and a right wheel rotation number sensor 143, which detects the number of rotations per unit time (for example, per minute) of the right wheel 13 in electromagnetism. The left and right wheel rotation number sensors 142, 143 correspond to left and right wheel rotation number detection sections. The controller 60 calculates the orientation of the vehicle in accordance with detection signals from the left and right wheel rotation number sensors 142, 143. For example, the controller 60 calculates a change in orientation of the vehicle with respect to a standard state, by calculating a change in the number of rotations of the left and right wheels 12, 13 from a standard state determined beforehand.

As shown in FIG. 21, the controller 60 has a rear rapid turn determination section 61*a*, and a turn deceleration stop section 62*b*. The rear rapid turn determination section 61*a* determines whether or not the vehicle 10 is rapidly turning to the rear from detection signals of the left and right lever potentiometers 38, 39. For example, the rotation directions and rotation angles of the left and right wheels 12, 13 are calculated from these detection signals. In the case where the left and right wheels 12, 13 rotate to the rear, and the rotation speeds of the left and right wheels 12, 13 differ, it is determined that the vehicle 10 is turning to the rear.

In addition, in the case where only one wheel of the left and right wheels 12, 13 rotates to the rear, it is determined that the vehicle 10 is rapidly turning to the rear. Moreover, in the case where the left and right wheels 12, 13 rotate in opposite directions, and an absolute value of a ground movement speed of a rear rotating wheel, which is the wheel rotating to the rear, is larger than an absolute value of a ground movement speed of a front rotating wheel, which is the wheel rotating to the front, it is also determined that the vehicle 10 is rapidly turning to the rear. Such a rapid turn is as described using FIG. 17. At the time when the respective absolute values of the ground movement speeds of the rear rotating wheel and the front rotating wheel are larger than zero, and a difference of both absolute values is zero, the rapid turn will be a zero-turn.

When an obstacle target has been detected by at least one of the first sensors 50*a*, 50*b*, in the case where it is determined that the vehicle 10 is rapidly turning to the rear by the rear rapid turn determination section 61*a*, the turn deceleration stop section 62*b* causes the turn to the rear of the vehicle 10 to decelerate. Also, the turn deceleration stop section 62*b* causes the turn to stop prior to the vehicle colliding with the obstacle target. At this time, the turn deceleration stop section 62*b* causes the turn of the vehicle to decelerate by gradually bringing the throttle valve near to a closed state and causes the turn of the vehicle to the rear to stop by closing the valve, by controlling the driving of the throttle actuator 78.

It will be necessary for a turn stop of the vehicle to be performed prior to the vehicle colliding with the obstacle target. Accordingly, the controller 60 calculates a first orientation of the vehicle at the point in time when the obstacle target has been detected by the first sensors 50*a*, 50*b*, and a second orientation of the vehicle when the vehicle collides with the obstacle target. The first sensors 50*a*, 50*b* are capable of measuring a distance up to the obstacle target. Accordingly, the controller 60 can calculate the number of rotations of the left and right wheels 12, 13 until the obstacle target collides at the left-right direction side end of the vehicle, from a distance from the first sensor to the obstacle target at the time when the obstacle target begins to fall into the detection regions of the first sensors 50a, 50b at the time of a turn of the vehicle. At this time, for example, a rectangular parallelepiped vehicle simulation model including the vehicle 10 and simulating the vehicle 10 may be set, and a second orientation may be calculated at the time when the vehicle simulation model collides with an obstacle target. For example, the vehicle simulation model may be in contact with the outside of the vehicle, or may have a shape slightly larger than the vehicle. By setting such a vehicle simulation model, it will be easy to prevent an obstacle target colliding with the vehicle.

The second orientation may be calculated by assuming that the swing positions of the left and right operation levers 22, 23 are constant, from a point in time when an obstacle target has been detected by the first sensors 50a, 50b. Also, in the case where the actual swing positions of the left and right operation levers 22, 23 change after the first orientation, the second orientation may be corrected in accordance with this change.

Also, the controller 60 sets a third orientation prior to changing from the first orientation to the second orientation, and controls the rotation state of the left and right wheels 12, 13, so as to cause a turn to decelerate until the vehicle changes to the third orientation, and cause the turn to stop at the third orientation. At this time, the controller 60 can control the throttle actuator 78, and can cause the left and right wheels 12, 13 to stop in the third orientation, by closing the throttle valve.

Straight travel, turning travel, a pivot turn, and an ultra-pivot turn of the vehicle 10 are the same as the travelling or turning described using FIG. 5 and FIG. 6A to FIG. 6C.

By referring to FIG. 14, a state will be described, in the vehicle 10, where a collision of the vehicle to an obstacle target P is avoided, at the time of rapidly turning to the rear, centered on the ground position of the right wheel 13, which is one wheel of the left and right wheels 12, 13. At this time, from a state where the vehicle 10 is the dash-dotted line G1, there will be cases where only the left wheel 12, which is the other wheel of the left and right wheels 12, 13, rotates in the backward direction, and the stopping of the right wheel 13, which is the one wheel, is maintained. In this case, as shown by the dotted line G2, the vehicle 10 turns rapidly to the rear as shown by the arrow α direction, by setting the ground position of the right wheel 13 to the turn center position 70. Also, in the state of the dash-dotted line G1, there will be cases where there is an obstacle target, shown by P, more to front than the rear end of the vehicle 10, and nearer to the outer side than the left side surface. At this time, there will be times where the obstacle target P can not be seen by the driver of the driver's seat 21, or the driver fails to notice the obstacle target P. At this time, since the vehicle 10 continues to turn while extending in the left-right direction outer side at the front side, there is the possibility that the vehicle 10 will collide with the obstacle target P, in the state of the dotted line G2. In the vehicle 10 of an embodiment shown in FIG. 21 and FIG. 22, it is calculated by the controller 60 that the vehicle 10 will change from the first orientation of the dash-dotted line G1 to the second orientation of the dotted line G2. Also, the controller 60 controls the driving of the left and right wheels 12, 13, so that the vehicle is stopped at the third orientation prior to the second orientation, after the first orientation of the vehicle. As a result, at the time of a rapid turn to the rear, it will become easy to detect an obstacle target at an early stage by at least one of the first sensors 50a, 50b, from among the two first sensors 50a, 50b, and it will be easy to cause a turn to stop prior to the vehicle colliding with the obstacle target. Moreover, since the turn decelerates from the point in time when an obstacle target has been detected by one of the first sensors 50a, 50b, additional deceleration to the driver can be reduced compared to the case where a turn is stopped suddenly, and therefore the burden on the driver can be reduced.

Moreover, in order to release this stop, after a turn to the rear is stopped, for example, the driver causes the vehicle 10 to travel to the front or the like, and the obstacle target will fall outside the detection regions of the first sensors 50a, 50b. Also, in this state, the controller 60 may be configured to perform a reset, for example, by returning the left and right operation levers 22, 23 to a neutral state. This reset is to make the controller 60 permit a turn to the rear of the vehicle.

Moreover, when an obstacle target has been detected by at least one of the first sensors 50a, 50b, the controller 60 causes the warning light 73a to operate, along with causing a rapid turn to the rear of the vehicle 10 to decelerate. As a result, the driver can recognize an approach to an obstacle target. Note that the warning buzzer 72a, which corresponds to a warning section, can be arranged near the driver's seat 21 of the vehicle, instead of the warning light 73a, or together with the warning light 73a. The operation of the warning buzzer 72a is controlled by the controller 60, and warns of an approach to an obstacle target using a sound. When an obstacle target has been detected by one or both of the left and right first sensors 50a, 50b, the controller 60 causes the warning buzzer 72a to operate. The driver can recognize an approach to an obstacle target, as a result of operation of the warning buzzer 72a.

According to the above described vehicle 10, in a configuration where the left and right wheels 12, 13 are independently travel-driven by the hydraulic motors 30, 31, it will be easy to automatically avoid a collision of the vehicle 10 with an obstacle target at the time of rapid turning travel to the rear. In this case, different to the case where sensors capable of detecting the rear are arranged only on the rear end of the vehicle 10, similar to the configurations of FIG. 1 to FIG. 9, it will be easy to detect an obstacle target positioned more on the outer side than both left and right ends of the vehicle 10 and more to the front than the rear end of the vehicle 10. Also, a turn of the vehicle 10 can be automatically stopped by the detection of an obstacle target.

Further, as shown by T3, referring to FIG. 2, there will be cases where an obstacle target is not in either of the detection ranges of the left and right first sensors 50a, 50b, in a stop state of the vehicle. However, when the vehicle 10 turns rapidly, by means of a zero-turn or the like, to the rear in the arrow α direction, such as shown in FIG. 2 and FIG. 8, the obstacle target T3 will be detected by the first sensor 50b of the left side in the state of FIG. 8. As a result, the vehicle 10 is prevented from colliding with the obstacle target T3, by having the rapid turn of the vehicle 10 decelerate, and thereafter stopped.

In this way, when the left and right wheels 12, 13 rotate in opposite directions, and an absolute value of the ground movement speed of the wheel rotating to the rear is equal to or higher than an absolute value of the ground movement speed of the wheel rotating to the front, a rapid turn to the rear of the vehicle 10 will occur. Moreover, as shown in FIG. 14, in the case where only one wheel of the left and right wheels 12, 13 rotates in the backward direction, and the other wheel is stopped, a rapid turn to the rear will occur. In this way, at the time when the vehicle 10 turns rapidly to the rear, it will become easy for the vehicle to approach an obstacle target positioned in a difficult-to-confirm position. Moreover, in the case where the vehicle rapidly turns in a zero-turn, the vehicle will significantly deflect in the left-right direction at this location, and therefore it will become easy for the vehicle to approach an obstacle target positioned in a difficult-to-confirm position. Also, considerable attention will be required by the driver in order to prevent the vehicle colliding with the obstacle target. In an embodiment, when the obstacle target has been detected by the first sensors 50a, 50b, the effect achieved by a configuration where the controller 60 causes a rapid turn to the rear to decelerate, and thereafter stop, will be remarkable. Configurations and actions other than these will be the same as the configurations of FIG. 1 to FIG. 9, or the configuration of FIG. 13.

Figure 23:
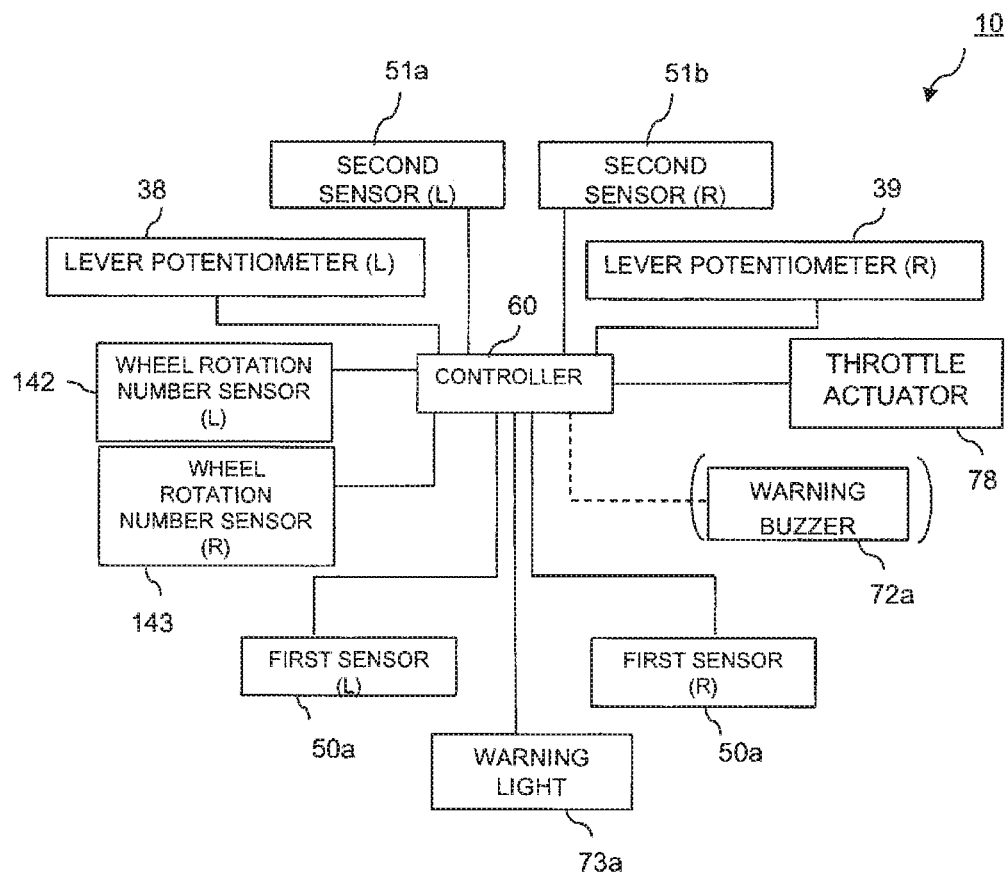
FIG. 23 is a block diagram showing the characteristic configuration of a riding type vehicle in another example of an embodiment of the present invention.

FIG. 23 is a block diagram showing the characteristic configuration of the vehicle 10 in another example of an embodiment. In the configuration of this example, the two second sensors 51a, 51b are arranged more to the rear of the vehicle 10 than the first sensors 50a, 50b, in the configuration of FIG. 21 and FIG. 22. The arrangement positions of each of the sensors 50a, 50b, 51a, and 51b are the same as the configurations of FIG. 10 and FIG. 11. Moreover, the controller 60 has the turn deceleration stop section 62b (FIG. 21). When an obstacle target has been detected by at least one of the first sensors 50a, 50b and the second sensors 51a, 51b, the turn deceleration stop section 62b causes a rapid turn to the rear of the vehicle 10 to decelerate, and causes the vehicle 10 to stop prior to colliding with the obstacle target.

According to the above described configuration, since the range in which detection of an obstacle target is possible is extended, it will be easier to automatically detect an obstacle target that approaches the vehicle 10 at the time of turning travel to the rear. For example, even at the time when obstacle targets T3 and T4 (FIG. 11) are positioned near the vehicle 10 at the rear of the vehicle 10, and these obstacle targets can not be detected by the first sensors 50a, 50b, it will be easy to detect the obstacle targets T3 and T4 with the second sensors 51a, 51b. As a result, it will be easy to automatically and effectively avoid a collision of the vehicle 10 with an obstacle target at the time of rapid turning travel to the rear. Configurations and actions other than these will be the same as the configurations of FIG. 1 to FIG. 9, the configurations of FIG. 10 and FIG. 11, or the configurations of FIG. 21 and FIG. 22.

Figure 24:
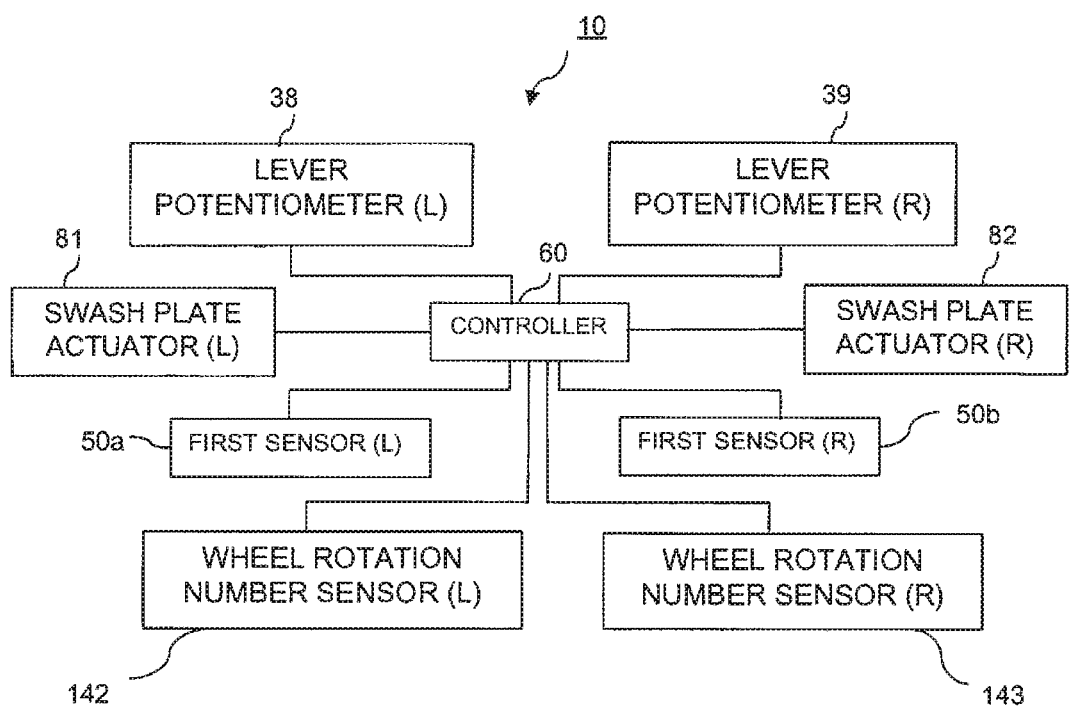
FIG. 24 is a block diagram showing the characteristic configuration of a riding type vehicle in another example of an embodiment of the present invention.
Figure 25:
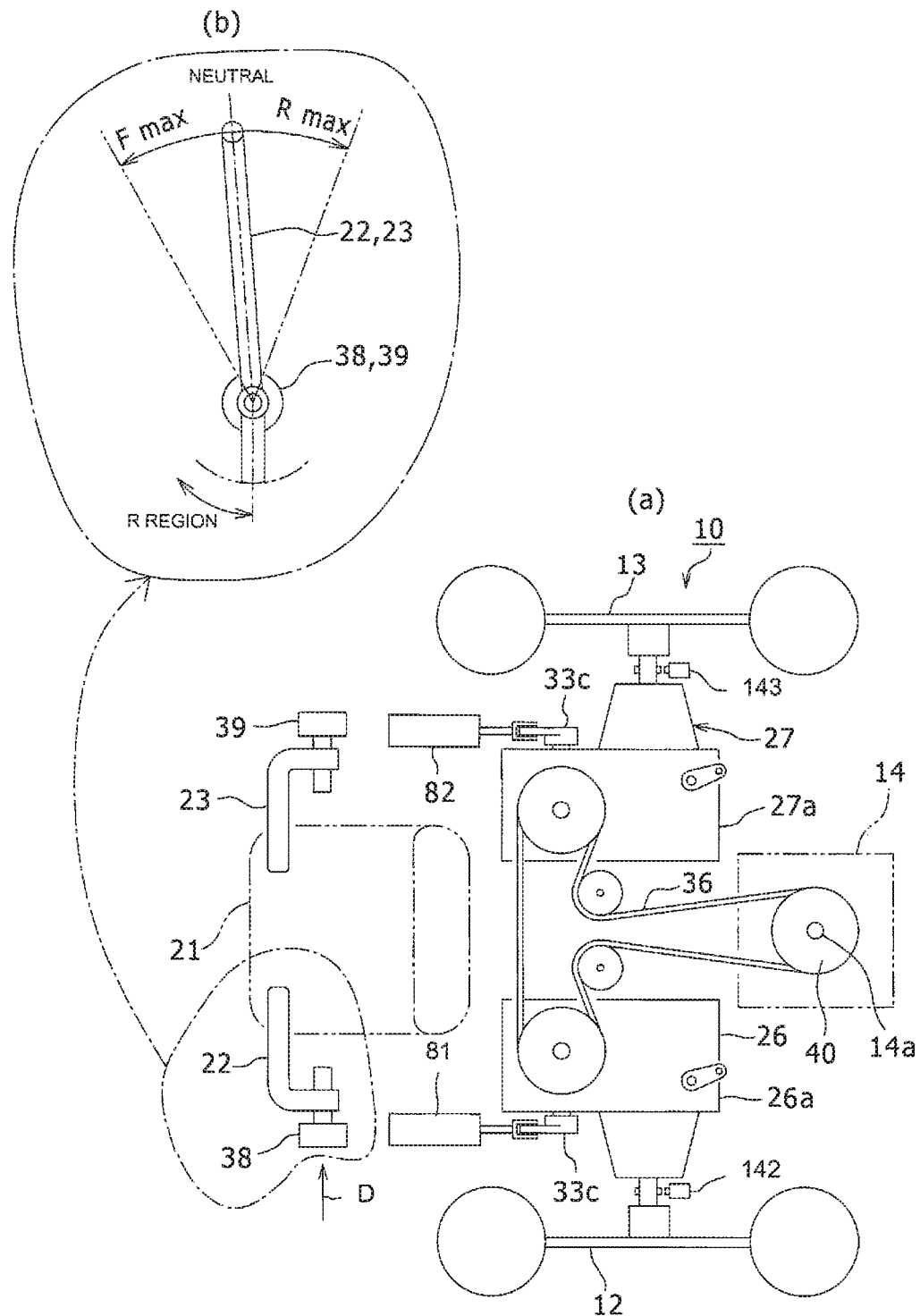
FIG. 25 (a) is a view corresponding to FIG. 4A, in the configuration shown in FIG. 24, and FIG. 25 (b) is a view seen from an arrow D direction of FIG. 25(a)

FIG. 24 is a block diagram showing the characteristic configuration of the vehicle 10 in another example of an embodiment. FIG. 25 (a) is a view corresponding to FIG. 4A, in the configuration shown in FIG. 24, and FIG. 25 (b) is a view seen from an arrow D direction of FIG. 25 (a). The vehicle 10 of FIG. 24 and FIG. 25 has the swash plate operation levers 32c, 33c of each of the left and right power generation units 26, 27, in the configurations of FIG. 21 and FIG. 22, not connected via the operation levers 22, 23 and a link. Instead of this, the vehicle 10 includes the left and right swash plate actuators 81, 82. The swash plate actuators 81, 82 drive the swash plate operation levers 32c, 33c connected to the swash plate operation shafts 32b, 33b (FIG. 4B) of the hydraulic pumps 32, 33 (FIG. 4B) of the corresponding sides, and are controlled by the controller 60. The swash plate actuators 81, 82 include a piston cylinder mechanism, or a motor, for example, which rotates the swash plate operation levers 32c, 33c of the corresponding sides.

The controller 60 drives the left and right swash plate operation levers 32c, 33c by controlling the driving of the left and right swash plate actuators 81, 82, in accordance with detection signals from the left and right lever potentiometers 38, 39. For example, in the case where the left and right operation levers 22, 23 have lowered to the front, the controller 60 drives the swash plate operation levers 32c, 33c in one direction by the control of the swash plate actuators 81, 82, in accordance with detection signals from the lever potentiometers 38, 39. As a result, the discharge amounts of the left and right hydraulic pumps 32, 33 will change, and the movable swash plates of each of the hydraulic pumps 32, 33 will tilt, so that the discharge amounts of each of the hydraulic pumps 32, 33 increase at the advancing side. In the case where the left and right operation levers 22, 23 have lowered to the rear, the controller 60 drives the swash plate operation levers 32c, 33c in the other direction by control of the swash plate actuators 81, 82. As a result, the discharge amounts of the left and right hydraulic pumps 32, 33 will change, and the movable swash plates of each of the hydraulic pumps 32, 33 will tilt, so that the discharge amounts of each of the hydraulic pumps 32, 33 increase in a direction of a rotation of the reversing side. Accordingly, the controller 60 causes the movable swash plates of the left and right hydraulic pumps 32, 33 to tilt, and causes the discharge amounts of the hydraulic pumps 32, 33 to change, by controlling the driving of the left and right swash plate actuators 81, 82 in accordance with detection signals of the left and right lever potentiometers 38, 39.

In addition, the controller 60 brings the discharge amounts of each of the hydraulic pumps 32, 33 near to zero, by setting the tilting angles of the movable swash plates of the left and right hydraulic pumps 32, 33 to a neutral state, by controlling the driving of the left and right swash plate actuators 81, 82. As a result, a rapid turn to the rear of the vehicle decelerates. Also, the controller 60 sets the discharge amounts of each of the hydraulic pumps 32, 33 to substantially zero, by setting the tilting angles of the movable swash plates of the left and right hydraulic pumps 32, 33 to approximately a neutral state. As a result, a turn to the rear of the vehicle is stopped. Configurations and actions other than these will be the same as the configurations of FIG. 21 and FIG. 22. Even in the configurations of FIG. 24 and FIG. 25, similar to the configurations of FIG. 21 and FIG. 22, reverse switches can be included as assistance.

Figure 26:
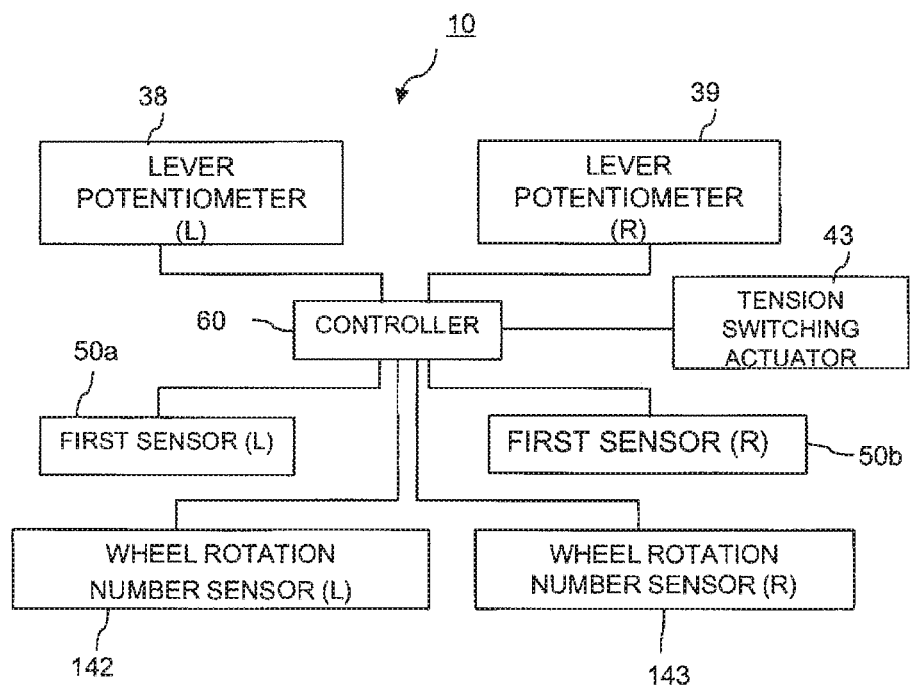
FIG. 26 is a block diagram showing the characteristic configuration of a riding type vehicle in another example of an embodiment of the present invention.
Figure 27:
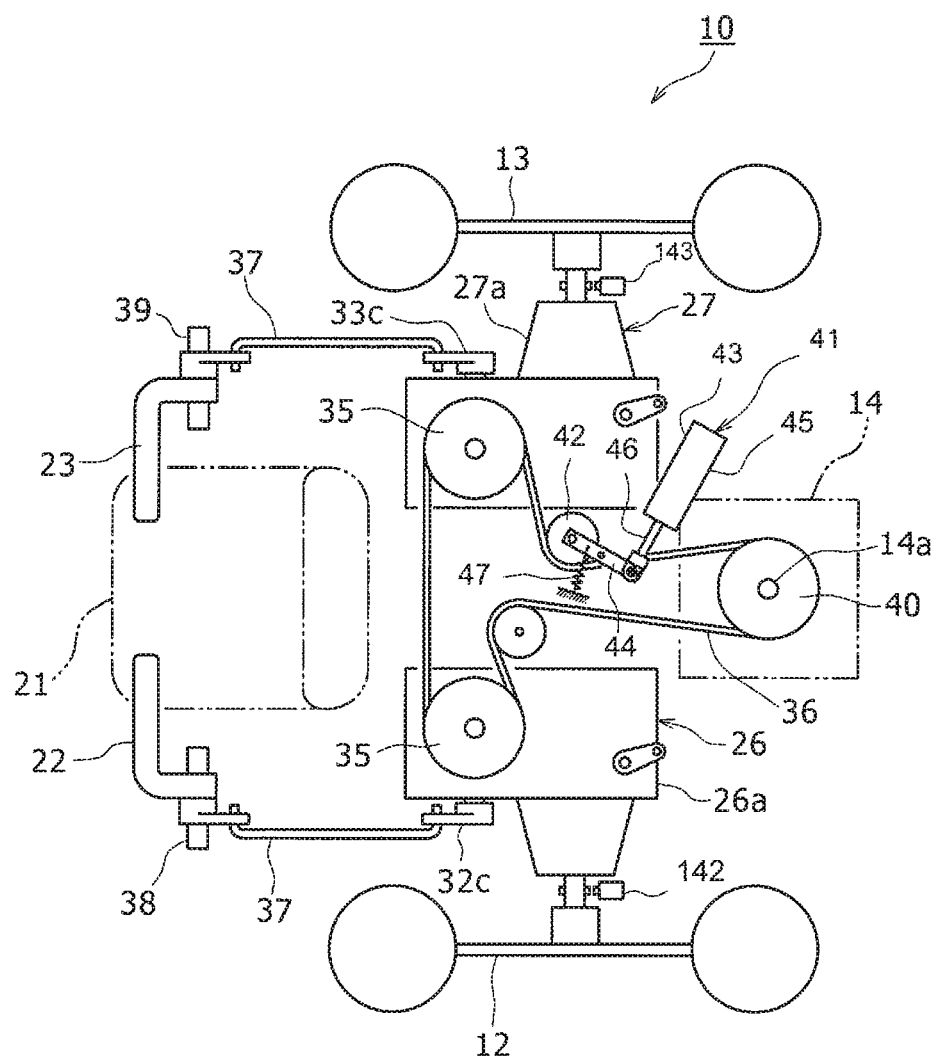
FIG. 27 is a view corresponding to FIG. 4A, in the configuration shown in FIG. 26.

FIG. 26 is a block diagram showing the characteristic configuration of the vehicle 10 in another example of an embodiment. FIG. 27 is a view corresponding to FIG. 4A, in the configuration shown in FIG. 26. The vehicle 10 of FIG. 26 and FIG. 27 has the belt 36 (FIG. 27) including the belt tension switching mechanism 41, in the configurations of FIG. 21 and FIG. 22, to function as a clutch arranged between an output section of the driving source and an input section of the transmission 11. As a result, the presence or absence of tension can be switched. The belt tension switching mechanism 41 includes a pressing force pulley 42, and a tension switching actuator 43. The configuration of the belt tension switching mechanism 41 is the same as the configurations of FIG. 1 to FIG. 9. Such a tension switching actuator 43 is controlled by the controller 60, and engages/disengages the above described clutch.

In addition, the turn deceleration stop section 62b (FIG. 21) of the controller 60 sets the power transmission in the clutch to a half-transmission state by causing the tension of the belt 36 to gradually reduce by controlling the driving of the tension switching actuator 43. As a result, a turn of the vehicle decelerates. Also, by setting the tension of the belt 36 to zero, the drive transmission in the clutch is set to zero, namely, is cut. As a result, a turn to the rear of the vehicle is stopped. Configurations and actions other than these will be the same as the configurations of FIG. 21 and FIG. 22, or the configurations of FIG. 1 to FIG. 9. Even in the configurations of FIG. 26 and FIG. 27, similar to the configurations of FIG. 21 and FIG. 22, reverse switches can be included as assistance.

Note that while illustration is omitted, the configurations in each example shown in FIG. 13 to FIG. 27 may be configurations that include hydraulic sensors for respectively detecting pressurized oil in the two main oil paths S1, S2 of the left and right hydraulic circuits, instead of the lever potentiometers. Also, the controller may be configured to have either of the main oil paths of each of the hydraulic circuits as a high pressure side, and to calculate absolute values of the speed directions and speeds of each of the wheels 12, 13, in accordance with detection signals of each of the hydraulic sensors. Also, the controller may determine whether or not the vehicle is rapidly turning to the rear, in accordance with this calculation result.

Moreover, the configurations in each of the above described examples can have two left and right direction indication lights fixed at positions separated in the left-right direction of the front end part of the vehicle 10, such as at positions near a supporting part of the caster wheels 15, 16, for example, along with attaching direction indication switches to the left and right operation levers 22, 23. Each of the direction indication lights is constituted to be capable of flashing a light in the case where the direction indication switch of the corresponding left or right side has been pressed. In such a configuration, since the vehicle 10 turning to the front or the rear side can be notified to a person in the surroundings by the flashing of the direction indication lights, it becomes possible to perform safer travelling. Moreover, the direction indication light may be used as the above described warning section. Specifically, when an obstacle target has been detected by one or both of the left and right first sensors 50a, 50b, the controller causes the left and right direction indication lights to turn on or flash at the same time.

Figure 28:
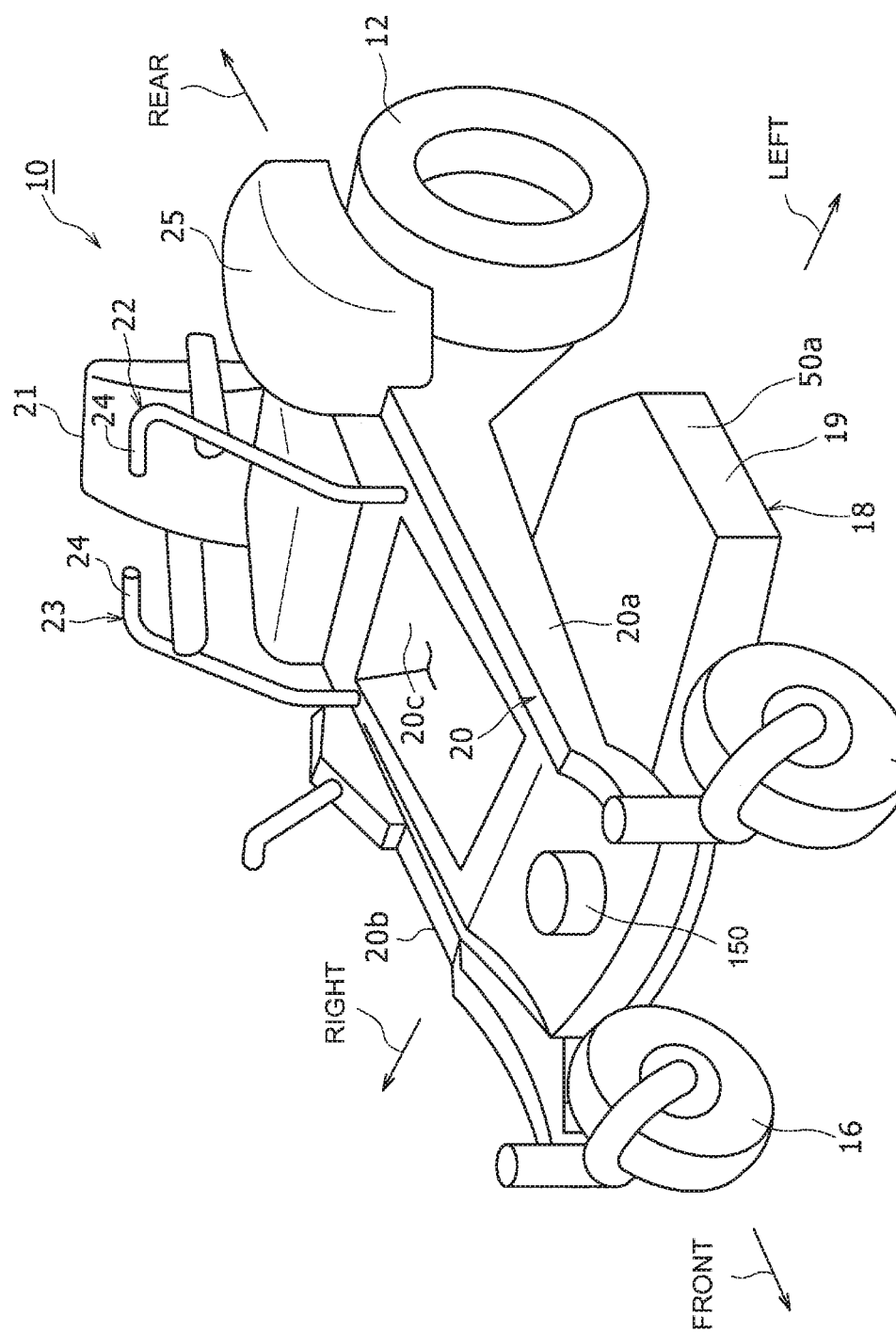
FIG. 28 is a perspective illustration of a riding type vehicle in another example of an embodiment of the present invention.
Figure 29:
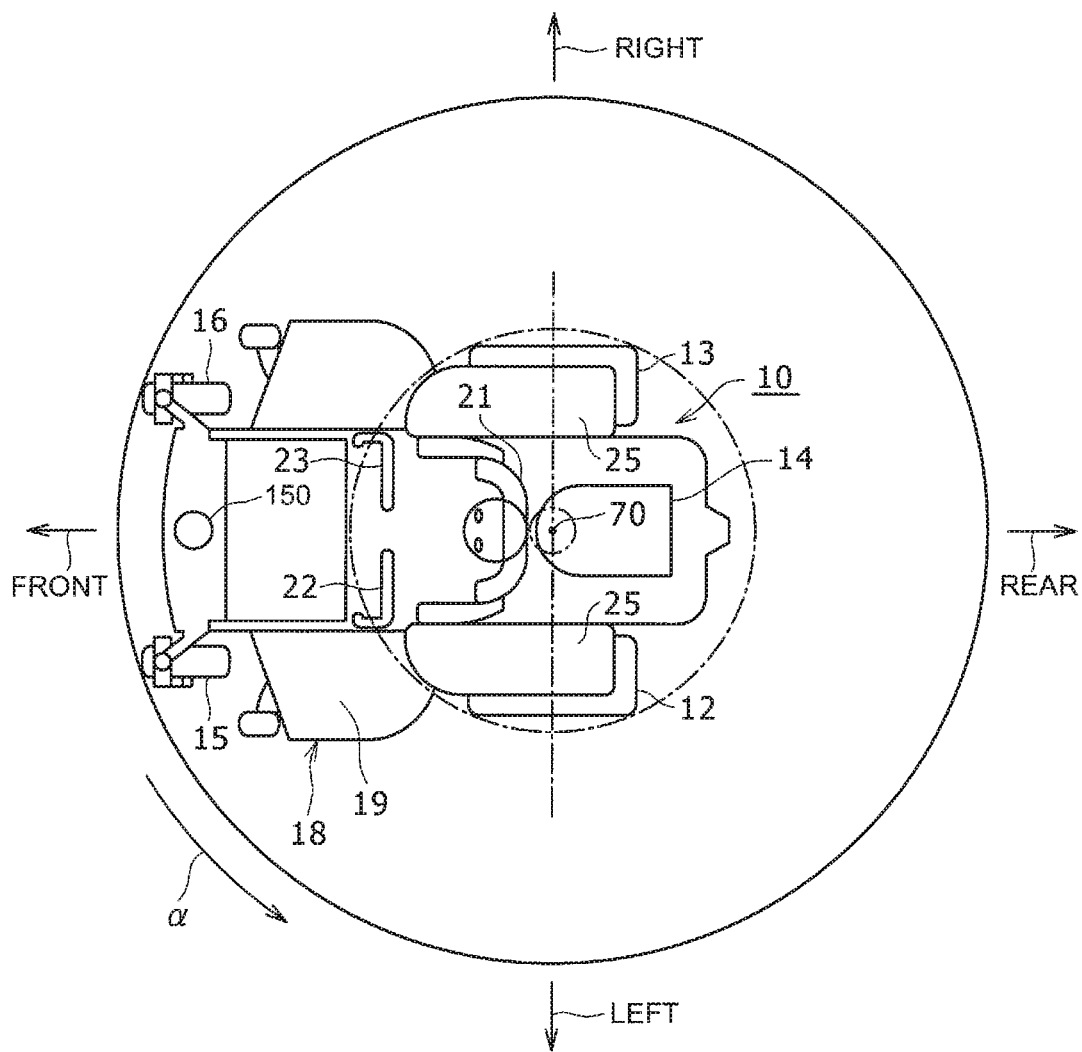
FIG. 29 is a view, when the vehicle is seen from above, showing a circumscribed circle of the caster wheels, in the case where rapidly turning centered on the center between the left and right wheels, in an embodiment.
Figure 30:
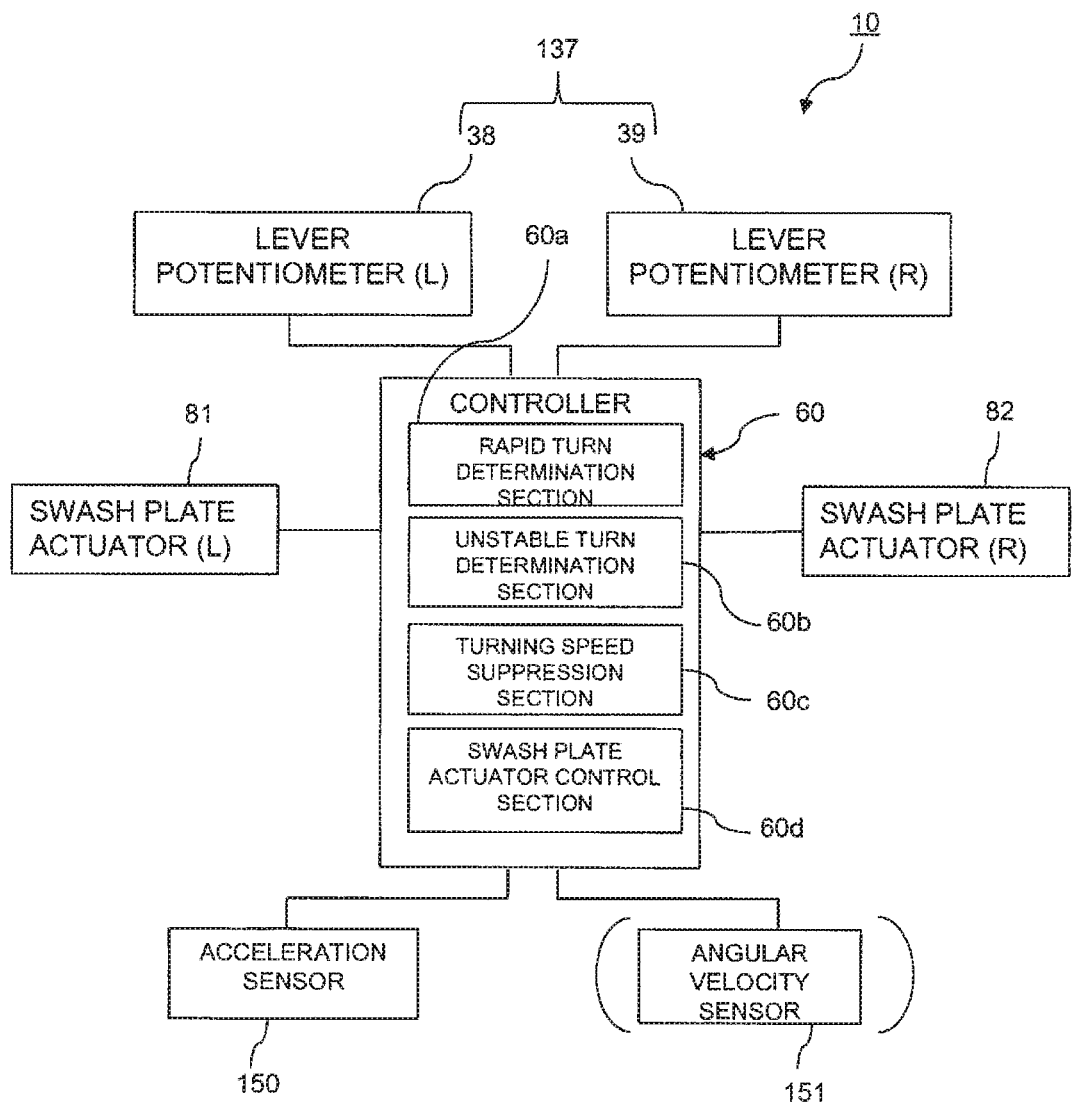
FIG. 30 is a block diagram showing the characteristic configuration of a vehicle in another example of an embodiment.

FIG. 28 to FIG. 31D show a riding type vehicle according to another example of an embodiment. FIG. 28 is a perspective illustration of the vehicle 10. FIG. 29 is a view, when the vehicle 10 is seen from above, showing a circumscribed circle of the caster wheels, in the case of rapidly turning centered on the center between the left and right wheels. FIG. 30 is a block diagram showing the characteristic configuration of the vehicle 10.

The configuration of this example has the left and right operation levers 22, 23 of both left and right sides, in the configurations of FIG. 1 to FIG. 9, supported on surrounding parts of the driver's seat 21 in the main frame 20.

Moreover, the view, seen from the upper side of the vehicle, of a power transmission structure between power generation units for the left wheel and the right wheel, and an engine, is the same as that of FIG. 19. As shown in FIG. 30, the vehicle includes two left and right swash plate actuators 81, 82.

By referring to FIG. 19, the two left and right swash plate actuators 81, 82 drive the swash plate operation levers 32c, 33c of the left and right corresponding sides, and the driving is controlled by the controller 60, which is a control device. The swash plate actuators 81, 82 include a piston cylinder mechanism, or a motor, for example, which rotates the swash plate operation levers 32c, 33c of the corresponding sides.

Moreover, the vehicle 10 includes the two left and right lever potentiometers 38, 39, which are swing angle detection sections. The left lever potentiometer 38 detects a swing angle position of the left operation lever 22, and the right lever potentiometer 39 detects a swing angle position of the right operation lever 23. Detection signals of each of the lever potentiometers 38, 39 are transmitted to the controller 60 (FIG. 30).

The left and right operation levers 22, 23 are capable of being displaced, from a maximum displacement position Fmax of a region indicating advancing to a maximum displacement position Rmax of a region indicating reversing, centered on the neutral position of FIG. 19. The left and right lever potentiometers 38, 39 are arranged near shafts S of the left and right operation levers 22, 23.

Referring to FIG. 4B, the controller 60 causes the swash plate operation shafts 32b, 33b to rotate, in accordance with the swing of the front-rear direction of the operation levers 22, 23. Specifically, as described below, the controller 60 drives the left and right swash plate operation levers 32c, 33c by controlling the driving of the left and right swash plate actuators 81, 82, in accordance with detection signals from the left and right lever potentiometers 38, 39. The swash plate operation shafts 32b, 33b will rotate due to the rotation of the swash plate operation levers 32c, 33c. Also, the tilting angles and orientations of the movable swash plates of the hydraulic pumps 32, 33 will change. The discharge amounts of the hydraulic pumps 32, 33 change, in accordance with the change of tilting angles of the movable swash plates. By lowering the operation levers 22, 23 significantly to the front or the rear, the discharge amounts of the hydraulic pumps 32, 33 will increase. The left hydraulic motor 30 is driven by a pressurized oil supply from the left hydraulic pump 32. The right hydraulic motor 31 is driven by a pressurized oil supply from the right hydraulic pump 33. By lowering the operation levers 22, 23 more to the front than a neutral state, discharge directions will be prescribed so that the hydraulic pumps 32, 33 cause the hydraulic motors 30, 31 to rotate to one side. By lowering the operation levers 22, 23 more to the rear than a neutral state, discharge directions will be prescribed so that the hydraulic pumps 32, 33 cause the hydraulic motors 30, 31 to rotate to the other side. A neutral state is a state where there is no discharge of oil at a position the operation levers 22, 23 automatically return to in a state of not being gripped by the driver. For the rotation directions of the hydraulic motors 30, 31, one side corresponds to the rotation of a forward direction of the wheels 12, 13, and the other side corresponds to the rotation of a backward direction of the wheels 12, 13.

In addition, at the time a rapid turn has been performed, and it is determined to be an unstable turn, the controller 60 controls the driving of the left and right swash plate actuators 81, 82, as described below. As a result, the discharge amounts of each of the hydraulic pumps 32, 33 approach zero as a result of bringing the tilting angles of the movable swash plates of the left and right hydraulic pumps 32, 33 close to an approximately neutral state, and as a result this, the turning speed of the vehicle is reduced. Alternatively, the discharge amounts of each of the hydraulic pumps 32, 33 are substantially set to zero by setting the tilting angles of the movable swash plates of the left and right hydraulic pumps 32, 33 to an approximately neutral state, and as a result of this, the turning speed of the vehicle is suppressed. Specifically, the turning speed is reduced, or the turning speed is set to zero. In the case where the tilting angles of the movable swash plates are in an approximately neutral state, the movable swash plates will be in an approximately neutral position. At this time, the hydraulic motors 30, 31 will not be driven.

Moreover, by referring to FIG. 4B, in the hydraulic circuits 28, 29 where each of the power generation units 26, 27 are included, a charge oil path C1 is connected, respectively at the left and right, to the two main oil paths S1, S2 connecting the hydraulic pumps 32, 33 and the hydraulic motors 30, 31. The charge oil path C1 connects each of the main oil paths S1, S2, and the oil reservoir E, via check valves F1, F2. Specifically, the hydraulic circuit 28 of the left power generation unit 26 includes the first main oil path 51, which is a first oil path, and the second main oil path S2, which is a second oil path. The first main oil path 51 connects one port P1 from among the two ports P1, P2 of the left hydraulic pump 32, and one port Q1 from among the two ports Q1, Q2 of the left hydraulic motor 30. The second main oil path S2 connects the other port P2 from among the two ports P1, P2 of the left hydraulic pump 32, and the other port Q2 from among the two ports Q1, Q2 of the left hydraulic motor 30. On the other hand, the hydraulic circuit 29 of the right power generation unit 27 includes a third main oil path S3, which is a third oil path, and a fourth main oil path S4, which is a fourth oil path. The third main oil path S3 connects one port P3 from among the two ports P3, P4 of the right hydraulic pump 33, and one port Q3 from among the two ports Q3, Q4 of the right hydraulic motor 31. The fourth main oil path S4 connects the other port P4 from among the two ports P3, P4 of the right hydraulic pump 33, and the other port Q4 from among the two ports Q3, Q4 of the right hydraulic motor 31.

The charge oil path C1 is for replenishing oil from the oil reservoir E to the main oil path of a low pressure side, from among each of the main oil paths S1, S2, S3, and S4. Moreover, a bypass valve 28*a* is connected between both the first main oil path 51 and the second main oil path S2, and the oil reservoir E. A bypass valve 29*a* is connected between both the third main oil path S3 and the fourth main oil path S4, and the oil reservoir E. The bypass valves 28*a*, 29*a* are configured to be capable of switching between opening, which is a connection between the main oil paths S1, S2, S3, and S4 and the oil reservoir E, and closing, which is a disconnection, manually.

As shown in FIG. 28 and FIG. 29, an acceleration sensor 150 is arranged near the center between the two caster wheels 15, 16, on the main frame 20, or on a member with high rigidity fixed to the main frame 20, at the front end part of the vehicle 10. The acceleration sensor 50 is called a G sensor, and detects the acceleration in the left-right direction of the vehicle 10, as a turn stability relationship amount, which is a physical quantity related to turn stability. The acceleration sensor 150 corresponds to a turn stability relationship sensor.

Figure 31A:
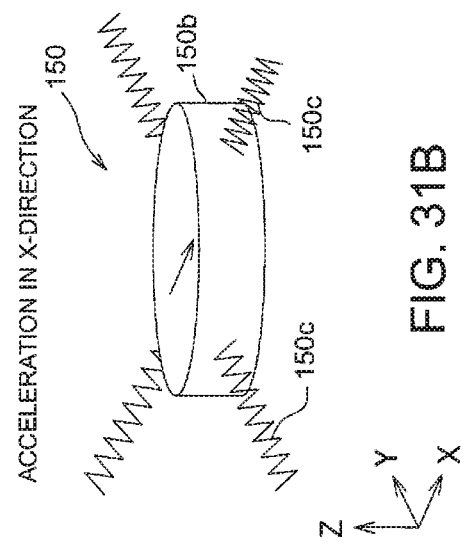
FIG. 31A is a view showing the principles of an acceleration sensor, and is a view at the time when a weight of the acceleration sensor is at a neutral position.
Figure 31B:
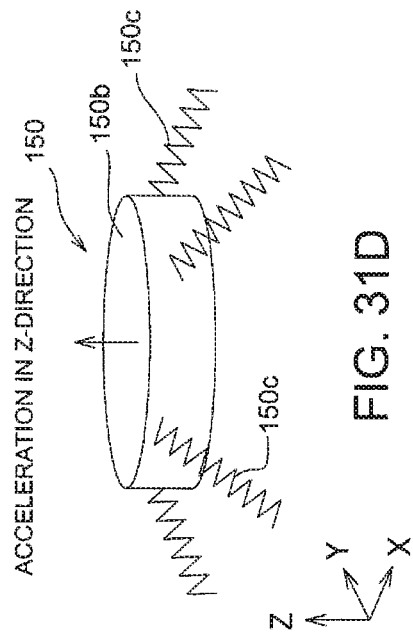
FIG. 31B is a view showing the principles of an acceleration sensor, and is a view at the time when a weight of the acceleration sensor is displaced in an X-direction.
Figure 31C:
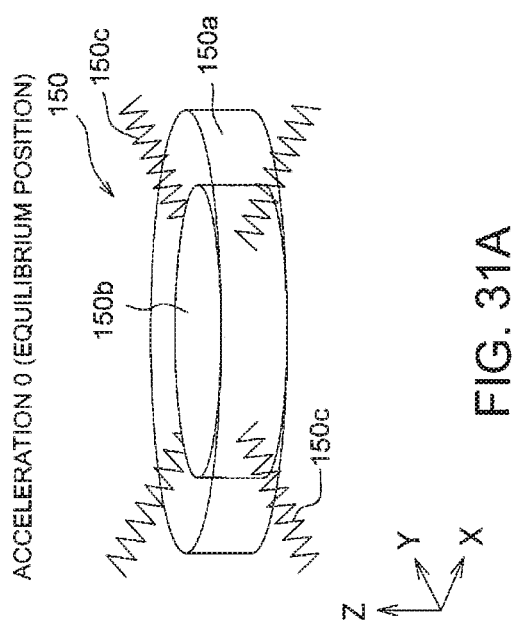
FIG. 31C is a view showing the principles of an acceleration sensor, and is a view at the time when a weight of the acceleration sensor is displaced in a Y-direction.
Figure 31D:
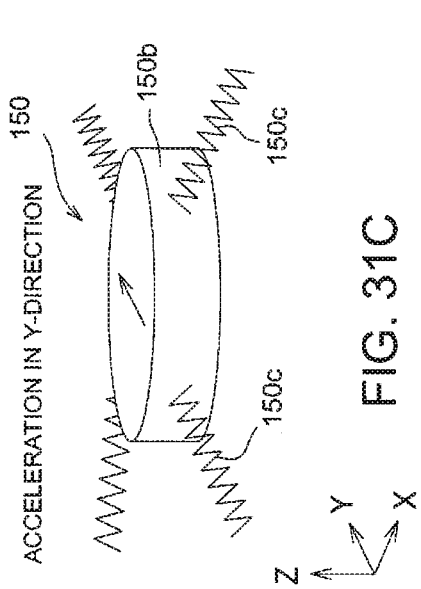
FIG. 31D is a view showing the principles of an acceleration sensor, and is a view at the time when a weight of the acceleration sensor is displaced in a Z-direction.

FIG. 31A, FIG. 31B, FIG. 31C, and FIG. 31D are views showing the principles of the acceleration sensor 150. FIG. 31A is a view at the time when a weight 150*b* of the acceleration sensor 150 is at a neutral position. FIG. 31B is a view at the time when the weight 150*b* is displaced in an X-direction. FIG. 31C is a view at the time when the weight 150*b* is displaced in a Y-direction. FIG. 31D is a view at the time when the weight 150*b* is displaced in a Z-direction. For example, as shown in FIG. 31A, the acceleration sensor 150 includes the weight 150*b* arranged on the inner side of a case 150*a*, and springs 150*c* joined to multiple positions of the surroundings of the weight 150*b*, and is supported within the case 150*a* in a state where the weight 150*b* is balanced and steady at a neutral position. At this time, the acceleration can be measured by detecting a displacement of the weight 150*b*. For example, in the case where X, Y, and Z-directions are considered as orthogonal 3-axis directions such as shown in FIG. 31B, a displacement amount will be obtained at the time when the weight 150*b* is displaced from the neutral position in the X-direction. As a result, an acceleration in the X-direction can be detected. Moreover, as shown in FIG. 31C and FIG. 31D, a displacement amount will be obtained at the time when the weight 150*b* is displaced from the neutral position in the Y-direction or the Z-direction. Based on this displacement amount, an acceleration in the Y-direction or the Z-direction can be detected. The acceleration sensor 150 has a configuration based on such principles, and the acceleration sensor 150 is arranged in the vehicle 10 so that the X-direction of the acceleration sensor 150, for example, is along the left-right direction of the vehicle 10. A semiconductor system such as an electrostatic capacitance type, piezo resistance type, distortion gauge detection type, or gas temperature distribution type semiconductor system may be included in the acceleration sensor 150.

In the case where such a detection value of the acceleration sensor 150 is excessively high, it can be determined to be an unstable turn where the front end part of the vehicle 10 is drastically turning to the left or right. Detection signals of the acceleration sensor 150 are transmitted to the controller 60 (FIG. 30).

As shown in FIG. 30, the controller 60 has a rapid turn determination section 60*a*, an unstable turn determination section 60*b*, a turning speed suppression section 60*c*, and a swash plate actuator control section 60*d*. The rapid turn determination section 60*a* determines whether or not the vehicle 10 is rapidly turning from detection signals from the left and right lever potentiometers 38, 39. For example, the rotation directions and rotation angles of the left and right wheels 12, 13 are calculated from these detection signals. In the case where the left and right wheels 12, 13 rotate in the same direction, and the rotation speeds of the left and right wheels 12, 13 differ, it is determined that the vehicle 10 is turning moderately to the front or the rear. A rapid turn detection section 137 is constituted by the left and right lever potentiometers 38, 39 and the rapid turn determination section 60*a*. The rapid turn detection section 137 detects that the vehicle 10 is turning rapidly. Performing a rapid turn, which is any one of a pivot turn, a zero-turn, and a turn between a pivot turn and a zero-turn, which are described next, is detected by the rapid turn detection section 137. Also, the turning speed will increase as the values of each of the left and right detection signals from the lever potentiometers 38, 39 increase.

For example, in the case where only one wheel of the left and right wheels 12, 13 rotates, it is determined that the vehicle 10 is rapidly turning, which is called a pivot turn, which is a turn centered on the ground position of the one wheel of the left and right wheels 12, 13. Moreover, in the case where the left and right wheels 12, 13 rotate in opposite directions, it is determined that the vehicle 10 is rapidly turning with a reduced turning radius. In particular, in the case where the left and right wheels 12, 13 rotate in opposite directions, and the absolute values of the rotation speeds of the left and right wheels 12, 13 are the same, it is determined that the vehicle 10 is turning rapidly, which is called a zero-turn or an ultra-pivot turn, which is a turn centered on the center between the left and right wheels 12, 13. As a result, it can be detected that the vehicle is turning rapidly. Such a rapid turn is as described using FIG. 6B and FIG. 6C.

When the detection value of the acceleration sensor 150 is equal to or higher than a threshold determined beforehand for the acceleration, the unstable turn determination section 60*b* determines that it is an unstable turn. The swash plate actuator control section 60*d* causes the movable swash plate of the left hydraulic pump 32 to tilt by controlling the driving of the left swash plate actuator 81 in accordance with a detection signal of the left lever potentiometer 38. Moreover, the swash plate actuator control section 60*d* causes the movable swash plate of the right hydraulic pump 33 to tilt by controlling the driving of the right swash plate actuator 82 in accordance with a detection signal of the right lever potentiometer 39.

In addition, when a rapid turn has been performed, and it is determined to be an unstable turn, the turning speed suppression section 60*c* reduces the turning speed, in the vehicle 10, in accordance with a determination result of the rapid turn determination section 60*a* and the unstable turn determination section 60*b*. Specifically, the turning speed suppression section 60*c* brings the tilting angles of the swash plates of the left hydraulic pump 32 and the right hydraulic pump 33 to a neutral state by controlling the driving of the left swash plate actuator 81 and the right swash plate actuator 82. As a result, the turning speed of the vehicle 10 is reduced, by bringing the discharge amounts of the left hydraulic pump 32 and the right hydraulic pump 33 close to zero. Moreover, the turning speed suppression section 60*c* may set the turning speed to zero by setting the discharge amounts of the left hydraulic pump 32 and the right hydraulic pump 33 to substantially zero, by setting the tilting angles of the swash plates of the left hydraulic pump 32 and the right hydraulic pump 33 to an approximately neutral state. As a result, the vehicle is stopped. While the portions that execute each of the functions of the rapid turn determination section 60*a*, the unstable turn determination section 60*b* or the like of the controller 60 may be integrated into one controller, multiple controllers may be connected by cables, and multiple functions may be separately executed by the multiple controllers.

Straight travel, turning travel, a pivot turn, and an ultra-pivot turn of the vehicle 10 are the same as the travelling or turning described by using FIG. 5 and FIG. 6A to FIG. 6C.

According to the above described vehicle 10, in a configuration where the left and right wheels 12, 13 are independently travel-driven by the left and right hydraulic motors 30, 31, an unstable turn can be automatically suppressed. For example, at the time when the turning speed is low, in the case where the vehicle turns rapidly using a zero-turn such as in FIG. 29, the acceleration in the left-right direction detected by the acceleration sensor 150 will be less than a threshold, and therefore the rapid turn will not be suppressed. On the other hand, when the turning speed is excessively high, in the case where the vehicle turns rapidly using a zero-turn, the acceleration in the left-right direction detected by the acceleration sensor 150 will be equal to or higher than a threshold. In this case, it is determined to be an unstable turn, and therefore the vehicle decelerates or stops as a result of the operation of the swash plate actuators 81, 82. As a result, the turning speed is suppressed, and therefore an unstable turn is automatically suppressed. In addition, in a configuration where the turning speed of the vehicle is gradually lowered by the turning speed suppression section 60*c*, different to the configuration where the vehicle rapidly stops, an additional impact to the driver can be eased by deceleration. Moreover, by having the turning speed suppressed, it will become easy for the driver to recognize a person or object present in the surroundings, and therefore safety can be improved.

Moreover, the front end part of the vehicle 10 will move significantly in the left-right direction, in a rapid turn where the turning center is positioned between the ground positions of the left and right wheels 12, 13, or the ground position of one wheel of the left and right wheels 12, 13. As a result, in the case where the acceleration sensor 150 is arranged on the front end part of the vehicle 10, such as in an embodiment, the detection accuracy of turning stability will improve. Note that the arrangement position of the acceleration sensor 150 is not limited to the configuration of being arranged on the front end part of the vehicle 10, and can be arranged at various positions, as long as it is arranged on a member with high rigidity in the vehicle 10. For example, the acceleration sensor 150 may be arranged near the center of gravity of the vehicle 10. Moreover, in the case where the front wheels are driving wheels, and the rear wheels are caster wheels, the rear end part of the vehicle will move significantly in the left-right direction, and therefore the detection accuracy of turning stability can be improved, by arranging the acceleration sensor on the rear end part of the vehicle.

Moreover, a case has been described, heretofore, where the acceleration sensor 150 is used as a turning stability relationship sensor that detects a turning stability amount related to turning stability. On the other hand, an angular velocity sensor 151 (FIG. 30) can be used instead of an acceleration sensor, as a turning stability relationship sensor. The angular velocity sensor 151 can be arranged at a position similar to the arrangement position of the acceleration sensor 150 of FIG. 28, on the front end part of the vehicle, or can be arranged on a member with high rigidity such as the rear end part of the vehicle near the center position between the left and right wheels 12, 13, in the vehicle. The angular velocity sensor 151 detects an angular velocity of the vehicle around an axis in a vertical direction. A gyro sensor can be used, for example, in the angular velocity sensor 151.

When a rapid turn has been performed, and a detection value of the angular velocity sensor 151 is equal to or higher than a threshold, the turning speed suppression section 60*c* of the controller 60 reduces the turning speed, by decelerating or stopping the vehicle by the operation of the swash plate actuators 81, 82. In the case of such a configuration, an unstable turn can also be automatically suppressed similar to the case of using the acceleration sensor 150. For example, when the turning speed is low, in the case where the vehicle turns rapidly, the angular velocity detected by the angular velocity sensor 151 will be less than a threshold, and therefore the rapid turn will not be suppressed. On the other hand, at the time when the turning speed is excessively high, in the case where the vehicle turns rapidly, the angular velocity detected by the angular velocity sensor 151 will be equal to or higher than a threshold, and therefore the rapid turn will be suppressed. As a result, unstable turning can be automatically suppressed. Configurations and actions other than these will be the same as the configurations of FIG. 1 to FIG. 9.

Figure 32:
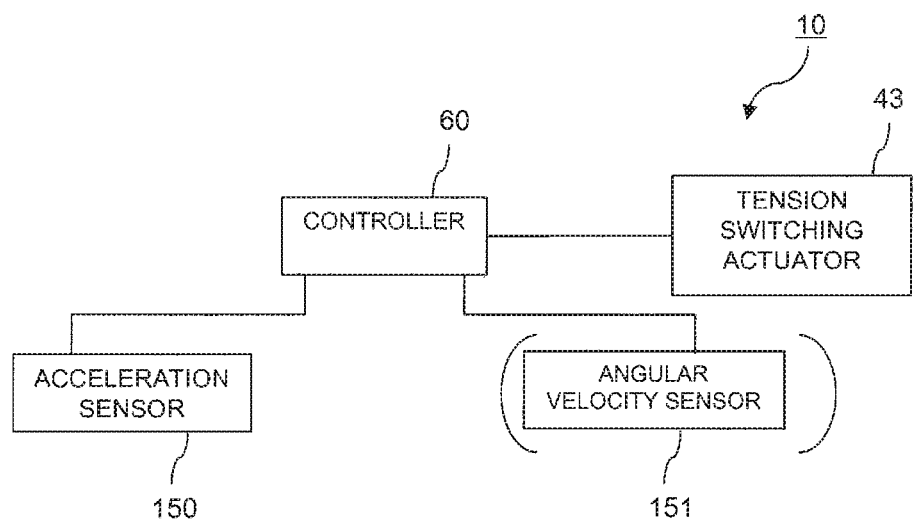
FIG. 32 is a block diagram showing the characteristic configuration of a riding type vehicle in another example of an embodiment of the present invention.

FIG. 32 is a block diagram showing the characteristic configuration of the vehicle 10 in another example of an embodiment. In the configuration of FIG. 32, the view, seen from the upper side of the vehicle, of a power transmission structure between power generation units for the left wheel and the right wheel, and an engine, is the same as that of FIG. 4A. In the configuration shown in FIG. 32, the vehicle 10, in the configurations of FIG. 28 to FIG. 31D, includes the tension switching actuator 43, instead of the swash plate actuators. Specifically, by referring to FIG. 4A, the lower end parts of the operation levers 22, 23 of the left and right corresponding sides are respectively connected, via a link 37, to the left and right swash plate operation levers 32c, 33c. As a result, by having the operation levers 22, 23 swing in the front-rear direction, the swash plate operation shafts 32b, 33b will rotate. Also, the tilting angles and orientations of the movable swash plates of the hydraulic pumps 32, 33 (refer to FIG. 4B) will change.

Moreover, referring to FIG. 4A, a belt 36 is suspended between a drive pulley 40 fixed to a drive shaft 14a of the engine 14, and driven pulleys 35 fixed to driven shafts of the hydraulic pumps 32, 33. This belt 36 can include a belt tension switching mechanism 41, to function as a clutch arranged between an output section of the driving source and an input section of the transmission 11, and as a result, the presence or absence of tension can be switched. The belt tension switching mechanism 41 includes a pressing force pulley 42, and a tension switching actuator 43. The configuration of the belt tension switching mechanism 41 is the same as that of the configurations of FIG. 1 to FIG. 9. The driving of the tension switching actuator 43 is controlled by the controller 60 (FIG. 30), and engages/disengages the above described clutch.

In addition, when a rapid turn has been performed, and a detection value of the acceleration sensor 150 or the angular velocity sensor 151 is equal to or higher than a threshold, the turning speed suppression section 60c (refer to FIG. 30) of the controller 60 controls the driving of the tension switching actuator 43. Also, the turning speed is reduced by bringing the tension of the belt 36 close to zero, or setting to zero. In the case where there is no energization of a solenoid, tension is generated in the belt 36, and power is transmitted from the engine 14 to the hydraulic pumps 32, 33, and therefore power transmission in the clutch, between the engine 14 and the transmission 11, will be in a connection state. Configurations and actions other than these will be the same as the configurations of FIG. 1 to FIG. 9, or the configurations of FIG. 28 to FIG. 31D.

Another example of an embodiment will be described, by referring to FIG. 16. The vehicle 10 in another example of an embodiment, in the configurations of FIG. 28 to FIG. 31D, includes left and right reverse switches 75, 76 respectively arranged in the surrounding parts of the lower end parts of the left and right operation levers 22, 23. In the case where it is detected that the left and right operation levers 22, 23 have been swung to regions where reversing will be instructed, the left and right back switches 75, 76 transmit these detection signals to the controller 60. By using not only the left and right lever potentiometers 38, 39, but also the detection signals of the reverse switches 75, 76 as assistance, the controller 60 will more stably determine whether or not the vehicle is turning rapidly.

Moreover, the vehicle 10 includes a throttle actuator 78 that mechanically or electrically adjusts the opening of the throttle valve of the engine 14. The controller 60 (refer to FIG. 30) controls the motor of the throttle actuator 78, so that the engine 14 is driven at a constant rotation speed determined beforehand, by having a start switch (not illustrated) set to ON by a user. The controller 60 controls the throttle actuator 78 so as cause the throttle valve to close, by having the start switch set to OFF by the user.

Moreover, when a rapid turn has been performed, and a detection value of the acceleration sensor 150 (FIG. 30) or the angular velocity sensor 151 (FIG. 30) is equal to or higher than a threshold, the turning speed suppression section 60c (FIG. 30) of the controller 60 controls the driving of the throttle actuator 78. Also, a turn of the vehicle decelerates or is stopped, or the turning speed is reduced, by bringing the throttle valve close to a closed state, or closing. Configurations and actions other than these will be the same as the configurations of FIG. 15 to FIG. 16, or the configurations of FIG. 28 to FIG. 31D. The reverse switches 75, 76 can be used in the configurations of FIG. 28 to FIG. 31D, or the configuration of FIG. 32.

Figure 33:
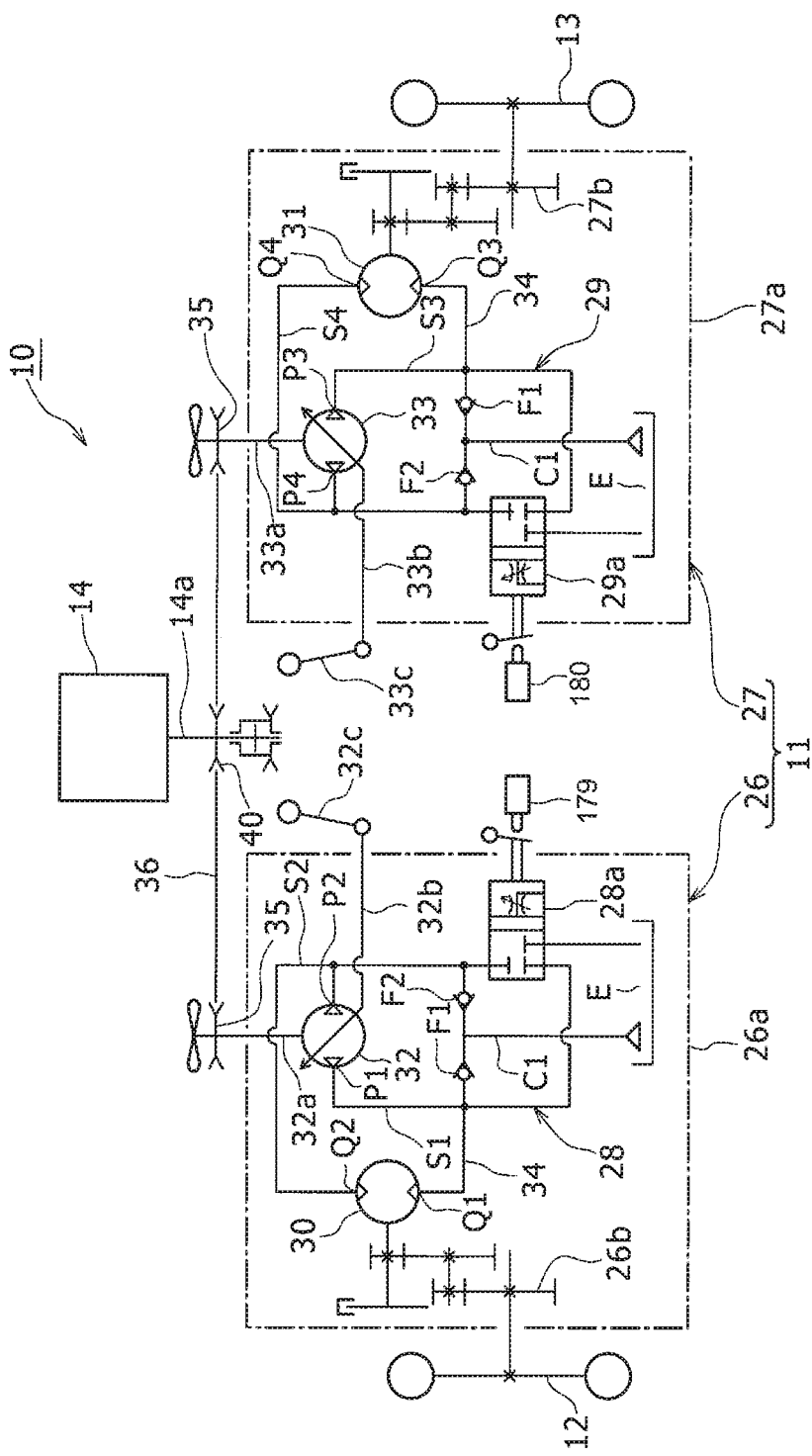
FIG. 33 is a view corresponding to FIG. 4B, in a riding type vehicle in another example of an embodiment of the present invention.

FIG. 33 is a view corresponding to FIG. 4B, in the vehicle 10 in another example of an embodiment. The vehicle 10 of FIG. 33 includes left-right bypass actuators 179, 180, in the configurations of FIG. 28 to FIG. 31D. The left and right bypass actuators 179, 180 open-close drive the bypass valves 28a, 29a connected between the main oil paths S1, S2, S3, S4 of the hydraulic circuits 28, 29 of the left and right power generation units 26, 27, and the oil reservoir E, at the same time. The bypass valves 28a, 29a discharge oil of the main oil paths S1, S2, S3, S4 to the oil reservoir E, in an opened state, namely, in a connection state between the main oil paths S1, S2, S3, S4 and the oil reservoir E. On the other hand, the bypass valves 28a, 29a circulate oil to the main oil paths S1, S2, S3, S4 in a closed state, namely, in a disconnection state between the main oil paths S1, S2, S3, S4 and the oil reservoir E. For example, the left bypass actuator 179 includes a left solenoid that electrically switches the closing and opening of the left bypass valve 28a, and the right bypass actuator 180 includes a right solenoid that electrically switches the closing and opening of the right bypass valve 29a. Each of the bypass actuators 179, 180 is controlled by the controller 60 (refer to FIG. 3). Also, the controller 60 stops the supply of oil to the hydraulic motors 30, 31, even during the driving of the hydraulic pumps 32, 33, by setting the left and right bypass valves 28a, 29a to an opened state at the same time by controlling the driving of the left and right bypass actuators 179, 180. As a result, since the hydraulic motors 30, 31 are in an idling state, a turn of the vehicle 10 will be stopped. Note that at this time, the hydraulic pumps 32, 33 will not stop rapidly, and will be stopped by inertia, and therefore the vehicle 10 will also be stopped by inertia. Configurations and actions other than these will be the same as the configurations of FIG. 28 to FIG. 31D. In the configuration of FIG. 33 also, reverse switches can be included as assistance.

FIG. 34 is a view corresponding to FIG. 4B, in the vehicle 10 in another example of an embodiment. In the vehicle 10, a first pressure sensor 181, a second pressure sensor 182, a third pressure sensor 183, and a fourth pressure sensor 184 are included, as turning stability relationship sensors. The first pressure sensor 181 detects the pressure of the first main oil path S1 connecting one port P1 of the left hydraulic pump 32 and one port Q1 of the left hydraulic motor 30. The second pressure sensor 182 detects the pressure of the second main oil path S2 connecting the other port P2 of the left hydraulic pump 32 and the other port Q2 of the left hydraulic motor 30.

Moreover, the third pressure sensor 183 detects the pressure of the third main oil path S3 connecting one port P3 of the right hydraulic pump 33 and one port Q3 of the right hydraulic motor 31. In addition, the fourth pressure sensor 184 detects the pressure of the fourth main oil path S4 connecting the other port P4 of the right hydraulic pump 33 and the other port Q4 of the right hydraulic motor 31. Detection signals of each of the pressure sensors 181, 182, 183, 184 are transmitted to the controller 60 (FIG. 30). Also, when a rapid turn has been performed, and an absolute value of a detection value of at least one of the pressure sensors of each of the pressure sensors 181, 182, 183, 184 is equal to or higher than a threshold, the turning speed suppression section 60c (FIG. 30) of the controller 60 suppresses the turning speed. Specifically, the turning speed is reduced, or is set to zero.

FIG. 35A is a view showing two of the conditions for suppressing the turning speed by using a relationship between an operation amount of the left operation lever 22 (FIG. 29) and pressure detection values of the first main oil path S1 and the second main oil path S2, in the configuration shown in FIG. 34. FIG. 35B is a view showing two of the conditions for suppressing the turning speed using a relationship between an operation amount of the right operation lever 23 and pressure detection values of the third main oil path S3 and the fourth main oil path S4, in the configuration shown in FIG. 34.

For example, the region of the shaded part U1 of FIG. 35A shows a condition where the operation amount of the left operation lever 22, that has been operated to a front side F corresponding to advancing rotation, is equal to or more than a prescribed amount close to a maximum value Max, and the pressure of the first main oil path S1 of the left hydraulic pump 32 side is equal to or higher than a prescribed value close to a maximum value Max. The region of the shaded part U2 of FIG. 35A shows a condition where the operation amount of the left operation lever 22, that has been operated to a rear side R corresponding to reversing rotation, is equal to or higher than a prescribed amount close to a maximum value Max, and the pressure of the second main oil path S2 of the left hydraulic pump 32 side is equal to or higher than a prescribed value close to a maximum value Max.

Moreover, the region of the shaded part U3 of FIG. 35B shows a condition where the operation amount of the right operation lever 23, that has been operated to a front side F corresponding to advancing rotation, is equal to or higher than a prescribed amount close to a maximum value Max, and the pressure of the third main oil path S3 of the right hydraulic pump 33 side is equal to or higher than a prescribed value close to a maximum value Max. The region of the shaded part U4 of FIG. 35B shows a condition where the operation amount of the right operation lever 23, that has been operated to a rear side R corresponding to backing rotation, is equal to or higher than a prescribed amount close to a maximum value Max, and the pressure of the fourth main oil path S4 of the right hydraulic pump 33 side is equal to or higher than a prescribed value close to a maximum value Max.

For example, combining the two conditions shown by arrow J1 means pressure of the first main oil path S1 increasing and the left operation lever 22 being operated significantly to the front, and additionally the pressure of the fourth main oil path S4 increasing and the right operation lever 23 being operated significantly to the rear. In the case where this combination is established, the vehicle 10 will turn rapidly in the state of a zero-turn or near to a zero-turn to the left side, and will have a high speed. At this time, by determining that a rapid turn has been performed, and that it is an unstable turn, the controller 60 (FIG. 30) will reduce the turning speed using the swash plate actuators 81, 82 (FIG. 30).

On the other hand, combining the two conditions shown by arrow J2 means the pressure of the second main oil path S2 increasing and the left operation lever 22 being operated significantly to the rear, and additionally the pressure of the third main oil path S3 increasing and the right operation lever 23 being operated significantly to the front. In the case where this combination is established, the vehicle will turn rapidly in the state of a zero-turn or near to a zero-turn to the right side, and will have a high speed. At this time, by determining that a rapid turn has been performed, and that it is an unstable turn, the controller will reduce the turning speed by the swash plate actuators. Configurations and actions other than these will be the same as the configurations of FIG. 28 to FIG. 31D. Note that in the configurations of each of the examples of FIG. 28 to FIG. 33, and the configurations in another example described by referring to FIG. 16, the pressure sensors 181, 182, 183, 184 such as in the configurations of FIG. 34 and FIG. 35A and FIG. 35B can be used as sensors that detect an unstable turning amount. Even in the configuration of FIG. 34, the reverse switches 75, 76 (refer to FIG. 16) can be included as an assistance. Note that in FIG. 35A and FIG. 35B, a combination of conditions is shown in the case of turning rapidly in the state of a zero-turn or near to a zero-turn, and having a high speed. On the other hand, even in the case where the combination of conditions of FIG. 35A and FIG. 35B are not established, the turning speed suppression section 60c (FIG. 30) may be configured to reduce the turning speed at the time when a rapid turn has been performed, and an absolute value of a detection value of at least one pressure sensor of each of the pressure sensors 181, 182, 183, 184 is equal to or higher than a threshold. The configuration of FIG. 34 is not limited to a configuration that reduces the turning speed using the swash plate actuators 81, 82 (FIG. 30), and can be combined with a configuration that reduces the turning speed in the configurations of each of the examples shown in FIGS. 32 to 33, and the configuration in another example described by referring to FIG. 16.

FIG. 36A is a view corresponding to FIG. 4A, in the vehicle 10 in another example of an embodiment, and FIG. 36B is a view seen from an arrow H direction of FIG. 36A. In the vehicle 10 shown in FIG. 36A, one of the acceleration sensor 150 (FIG. 30) and the angular velocity sensor 151 (FIG. 30), in the configurations of FIG. 28 to FIG. 31D, may not be included. Instead of this, the vehicle 10 uses a left lever swing angle centered on a left lever neutral position of the left operation lever 22, as a first turning stability relationship amount, and uses a right lever swing angle centered on a right lever neutral position of the right operation lever 23, as a second turning stability relationship amount. Also, at the time when it is determined that at least one of the left lever swing angle and the right lever swing angle is equal to or higher than a threshold, and it is determined that a rapid turn has been performed from a determination result of the rapid turn determination section 60a, the turning speed suppression section 60c (FIG. 3) of the controller 60 suppresses the turning speed. Specifically, the turning speed suppression section 60c suppresses the turning speed by controlling the driving of the left and right swash plate actuators 81, 82. For example, in the case where both the left lever swing angle and the right lever swing angle are within the range of arrow A1 or arrow A2 near a lever neutral position, such as shown in FIG. 36B, from the detection values of each of the lever potentiometers 38, 39, a rapid turn, such as a pivot turn or a zero-turn, will be permitted. On the other hand, in the case where at least one of the left lever swing angle and the right lever swing angle is within the range of arrow A3 or arrow A4, which is a range far from a lever neutral position, a rapid turn will be restricted. At this time, the driving of the swash plate actuators 81, 82 is controlled, and the turning speed is reduced, by bringing the tilting angles of the swash plates of the left hydraulic pump 32 and the right hydraulic pump 33 close to a neutral state, or setting to a neutral state. The ranges of the arrows A1 and A2 shown in FIG. 36 are rapid turn allowable ranges, and the ranges of the arrows A3 and A4 are rapid turn restriction ranges. According to the above described configuration, it is not necessary to include either of the acceleration sensor 150 and the angular velocity sensor 151, and therefore a cost reduction is achieved. Configurations and actions other than these will be the same as the configurations of FIG. 28 to FIG. 31D. The configuration of FIG. 36A and FIG. 36B are not limited to a configuration that suppresses the turning speed using the swash plate actuators 81, 82, and can be combined with a configuration that suppresses the turning speed in the configurations of each of the examples shown in FIGS. 32 to 33, and the configuration in another example described by referring to FIG. 16.

Note that while a case has been described, in each of the above described embodiments, where the riding type vehicle is a riding lawnmower vehicle that includes a lawnmower, the present invention is not limited to such a configuration, and the riding type vehicle may be a vehicle that does not include a lawnmower. For example, each of the above described embodiments may be a vehicle capable of travelling on uneven ground or a road, by omitting the lawnmower. A forklift, wheelchair or the like driven by left and right electric motors can be included, as specific examples.

At least one riding type vehicle of each of the above described embodiments has the configuration of the above described first riding type vehicle. Accordingly, in a configuration where the left and right wheels are capable of being independently driven, with regard to a rotation direction and a rotation speed, it will be easy to automatically detect an obstacle target that approaches the vehicle at the time of turning travel to the rear. In particular, since each of the two first sensors are arranged on both the left and right sides, more to the front than the rear end of the vehicle, and are configured to detect an obstacle target positioned on the rear side, different to the case where sensors capable of detecting the rear are arranged on the rear end of the vehicle, it will be easy to detect an obstacle target positioned more on the outer side than both left and right ends of the vehicle and more to the front than the rear end of the vehicle.

At least one riding type vehicle of each of the above described embodiments has the configuration of the above described second riding type vehicle or third riding type vehicle. Accordingly in a configuration where the left and right wheels are capable of being independently driven, with regard to a rotation direction and a rotation speed, it will be easy to automatically avoid a collision with an obstacle target at the time of a rapid turn to the rear.

At least one riding type vehicle of each of the above described embodiments has the configuration of the above described fourth riding type vehicle. Accordingly, in a configuration where the left and right wheels are capable of being independently driven, with regard to a rotation direction and a rotation speed, an unstable turn can be automatically suppressed.

What is claimed is:

1. A riding vehicle having
    a driving source,
    a left wheel and a right wheel,
    a transmission configured to receive power from the driving source to independently operate and drive the left wheel and the right wheel with regard to a rotation direction and a rotation speed, and
    caster wheels separately provided in a front-rear direction with respect to the left wheel and the right wheel, wherein
    the riding vehicle is capable of a rapid turn where only one of the left wheel and the right wheel rotates, or the left wheel and the right wheel rotate in opposite directions, the riding vehicle comprising:
    a rapid turn detection section for detecting the vehicle performing the rapid turn; and
    a turning speed suppression section for suppressing a turning speed, when the rapid turn is being performed, and a turning stability relationship amount, which is a physical quantity related to turning stability, is equal to or higher than a threshold.

2. The riding vehicle according to claim 1, further comprising:
    a turning stability relationship sensor for detecting the turning stability relationship amount, wherein
    the turning speed suppression section suppresses the turning speed, at a time when the rapid turn has been performed, and a detection value of the turning stability relationship amount is equal to or higher than the threshold.

3. The riding vehicle according to claim 2, wherein
    the turning stability relationship sensor is an acceleration sensor for detecting an acceleration in a left-right direction, and
    the turning speed suppression section suppresses the turning speed, at the time when the rapid turn has been performed, and a detection value of the acceleration sensor is equal to or higher than the threshold.

4. The riding vehicle according to claim 2, wherein
    the turning stability relationship sensor is an angular velocity sensor for detecting an angular velocity of the vehicle around an axis in a vertical direction, and
    the turning speed suppression section suppresses the turning speed, at the time when the rapid turn has been performed, and a detection value of the angular velocity sensor is equal to or higher than is the threshold.

5. The riding vehicle according to claim 2, wherein
    the transmission includes
    a left hydraulic motor driven by a pressurized oil supply from a variable-capacity swash-plate left hydraulic pump, and a right hydraulic motor driven by a pressurized oil supply from a variable-capacity swash-plate right hydraulic pump,
    the turning stability relationship sensor is a first pressure sensor, a second pressure sensor, a third pressure sensor, and a fourth pressure sensor,
    the first pressure sensor detects a pressure of a first oil path connecting one port from among two ports of the left hydraulic pump, and one port from among two ports of the left hydraulic motor,
    the second pressure sensor detects a pressure of a second oil path connecting another port from among two ports of the left hydraulic pump, and another port from among two ports of the left hydraulic motor,
    the third pressure sensor detects a pressure of a third oil path connecting one port from among two ports of the right hydraulic pump, and one port from among two ports of the right hydraulic motor,
    the fourth pressure sensor detects a pressure of a fourth oil path connecting another port from among two ports of the right hydraulic pump, and another port from among two ports of the right hydraulic motor, and
    the turning speed suppression section suppresses the turning speed, at the time when the rapid turn has been performed, and an absolute value of a detection value of at least one pressure sensor from among the first pressure sensor, the second pressure sensor, the third pressure sensor, and the fourth pressure sensor is equal to or higher than the threshold.

6. The riding vehicle according to claim 1, wherein the transmission includes
- a left hydraulic motor driven by a pressurized oil supply from a variable-capacity swash-plate left hydraulic pump, and a right hydraulic motor driven by a pressurized oil supply from a variable-capacity swash-plate right hydraulic pump,
- a left adjustment shaft for adjusting a hydraulic discharge amount of the left hydraulic pump,
- a right adjustment shaft for adjusting a hydraulic discharge amount of the right hydraulic pump,
- a left swing angle detection section for detecting a swing angle position of a left operation lever,
- a right swing angle detection section for detecting a swing angle position of a right operation lever,
- a left actuator, for driving a left swash plate operation lever, connected to the left adjustment shaft,
- a right actuator, for driving a right swash plate operation lever, connected to the right adjustment shaft, and
- a swash plate actuator control section for causing the discharge amount of the left hydraulic pump to change by controlling driving of the left actuator in accordance with a detection signal of the left swing angle detection section, and causes the discharge amount of the right hydraulic pump to change by controlling driving of the right actuator in accordance with a detection signal of the right swing angle detection section, and
- the turning speed suppression section suppresses the turning speed by bringing the discharge amounts of the left hydraulic pump and the right hydraulic pump near to zero, or setting to substantially zero, by controlling driving of the left actuator and the right actuator.

7. The riding vehicle according to claim 1, further comprising:
- a clutch arranged between an output section of the driving source and an input section of the transmission; and
- a switching mechanism including a switching actuator for engaging/disengaging power transmission through the clutch, wherein
- the turning speed suppression section suppresses the turning speed by setting power transmission through the clutch to a half-transmission state, or cutting power transmission, by controlling driving of the switching actuator.

8. The riding vehicle according to claim 1, wherein the driving source is an engine, and the riding vehicle further comprises a throttle actuator for adjusting an opening of a throttle valve of the engine, and
- the turning speed suppression section suppresses the turning speed by bringing the throttle valve near to a closed state, or closing a valve, by controlling driving of the throttle actuator.

9. The riding vehicle according to claim 1, wherein the transmission includes
- a left hydraulic motor driven by a pressurized oil supply from a left hydraulic pump, and a right hydraulic motor driven by a pressurized oil supply from a right hydraulic pump,
- a left main oil path connecting the left hydraulic motor and the left hydraulic pump, and a left bypass valve connected between the left main oil path and an oil reservoir,
- a left bypass actuator for switching a closing and opening of the left bypass valve,
- a right main oil path connecting the right hydraulic motor and the right hydraulic pump, and a right bypass valve connected between the right main oil path and an oil reservoir, and
- a right bypass actuator for switching a closing and opening of the right bypass valve, and
- the turning speed suppression section suppresses the turning speed by setting the left bypass valve and the right bypass valve to an opened state at the same time by controlling driving of the left bypass actuator and the right bypass actuator.

10. The riding vehicle according to claim 1, further comprising:
- a left operation lever and a right operation lever arranged separately on both left and right sides and supported to be capable of swinging forward and backward, on surrounding parts of a driver's seat, wherein
- the rapid turn detection section has a left swing angle detection section for detecting a swing angle position of the left operation lever, a right swing angle detection section for detecting a swing angle position of the right operation lever, and a rapid turn determination section for determining whether or not the rapid turn is performed from detection values of the left swing angle detection section and the right swing angle detection section, and
- the turning speed suppression section suppresses the turning speed, at a time when at least one of a swing angle centered on a left lever neutral position of the left operation lever and a swing angle centered on a right lever neutral position of the right operation lever, which are turning stability relationship amounts, is equal to or higher than the threshold, and the rapid turn determination section determines that the rapid turn has been performed.

* * * * *